(12) United States Patent
Mizuhashi et al.

(10) Patent No.: US 9,916,033 B2
(45) Date of Patent: Mar. 13, 2018

(54) LIQUID CRYSTAL DISPLAY DEVICE

(71) Applicant: Japan Display Inc., Tokyo (JP)

(72) Inventors: Hiroshi Mizuhashi, Tokyo (JP); Koji Noguchi, Tokyo (JP); Toshiaki Fukushima, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/422,146

(22) Filed: Feb. 1, 2017

(65) Prior Publication Data

US 2017/0205945 A1 Jul. 20, 2017

Related U.S. Application Data

(63) Continuation of application No. 14/742,344, filed on Jun. 17, 2015, now Pat. No. 9,594,453.

(30) Foreign Application Priority Data

Jun. 18, 2014 (JP) ................................. 2014-124964

(51) Int. Cl.
   *G06F 3/041* (2006.01)
   *G06F 3/044* (2006.01)
   *G02F 1/1333* (2006.01)

(52) U.S. Cl.
   CPC ........ *G06F 3/0416* (2013.01); *G02F 1/13338* (2013.01); *G06F 3/044* (2013.01);
   (Continued)

(58) Field of Classification Search
   None
   See application file for complete search history.

(56) References Cited

U.S. PATENT DOCUMENTS 8,952,913 B2  2/2015 Lee et al.
9,001,080 B2  4/2015 Okayama et al.
             (Continued)

FOREIGN PATENT DOCUMENTS

CN   102236464 A   11/2011
CN   103777827 A    5/2014
             (Continued)

OTHER PUBLICATIONS

Taiwanese Office Action dated Aug. 8, 2016, for corresponding Taiwanese Application No. 104113099.
             (Continued)

*Primary Examiner* — Seokyun Moon
(74) *Attorney, Agent, or Firm* — Michael Best & Friedrich LLP

(57) ABSTRACT

To provide a liquid crystal display device with a touch detection function in which any drive method can be adopted. The liquid crystal display device is provided with: a liquid crystal element arrangement that has a plurality of liquid crystal display elements arranged in a matrix shape; a plurality of scanning lines that are arranged in each row of the liquid crystal element arrangement, and supply scanning signals to a plurality of liquid crystal display elements arranged in a corresponding row; a plurality of signal lines that are arranged in each column of the liquid crystal element arrangement, and supply an image signal to a plurality of liquid crystal display elements arranged in a corresponding column; a plurality of touch detection drive electrodes which are arranged in a column of the liquid crystal element arrangement, and to which a drive signal for detecting a touch is supplied; and a touch control part that specifies a touch detection drive electrode from the a plurality of touch detection drive electrodes. Here, the drive (Continued)

signal is supplied to the touch detection drive electrode specified by the touch control part.

14 Claims, 20 Drawing Sheets

(52) U.S. Cl.
CPC .. *G06F 3/0412* (2013.01); *G06F 2203/04101* (2013.01); *G06F 2203/04808* (2013.01)

(56) References Cited

U.S. PATENT DOCUMENTS

| | | | |
|---|---|---|---|
| 9,378,699 B2 | 6/2016 | Matsumoto et al. | |
| 9,535,278 B2 | 1/2017 | Tokita et al. | |
| 9,639,191 B2 | 5/2017 | Takeuchi et al. | |
| 2011/0085122 A1* | 4/2011 | Fu | G02F 1/13338 349/149 |
| 2011/0267293 A1 | 11/2011 | Noguchi et al. | |
| 2012/0050659 A1 | 3/2012 | Nakanishi et al. | |
| 2012/0105338 A1* | 5/2012 | Lin | G11C 19/28 345/173 |
| 2013/0082954 A1* | 4/2013 | Azumi | G06F 3/041 345/173 |
| 2014/0139757 A1 | 5/2014 | Tamanaga et al. | |
| 2014/0152616 A1 | 6/2014 | Kida et al. | |
| 2015/0002421 A1* | 1/2015 | Kim | G06F 3/041 345/173 |
| 2015/0185941 A1 | 7/2015 | Lee et al. | |
| 2016/0266714 A1 | 9/2016 | Matsumoto et al. | |
| 2016/0283039 A1 | 9/2016 | Tokita et al. | |
| 2017/0185221 A1 | 6/2017 | Takeuchi et al. | |

FOREIGN PATENT DOCUMENTS

| | | |
|---|---|---|
| JP | 2011-233018 A | 11/2011 |
| JP | 2012-047807 A | 3/2012 |
| JP | 2012-221485 A | 11/2012 |
| JP | 2012-230657 A | 11/2012 |
| JP | 2013-077276 A | 4/2013 |
| JP | 2013-101427 A | 5/2013 |
| KR | 20130138142 A | 12/2013 |
| KR | 20140073431 A | 6/2014 |
| TW | 201421336 A | 6/2014 |
| WO | 2013-069289 A1 | 5/2013 |

OTHER PUBLICATIONS

Korean Office Action dated Dec. 28, 2016, for corresponding Korean Application No. 10-2015-0086714.

Japanese Office Action dated Jul. 4, 2016, for corresponding Japanese Application No. 2014-124964.

* cited by examiner

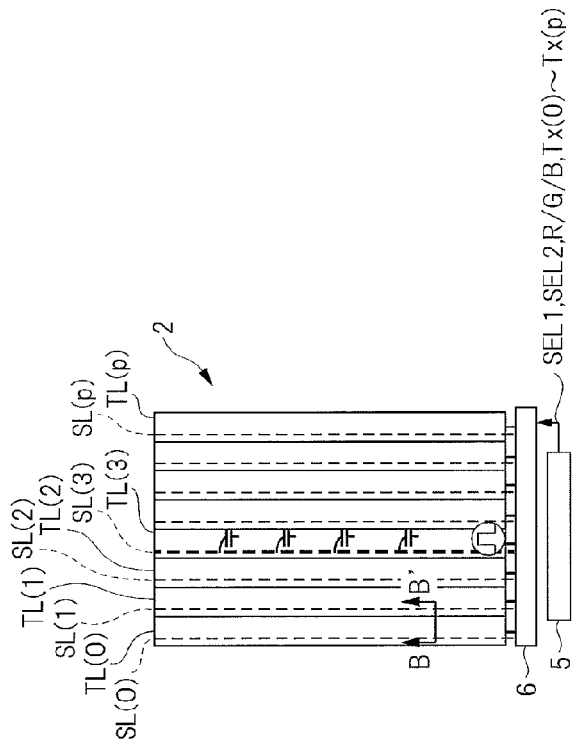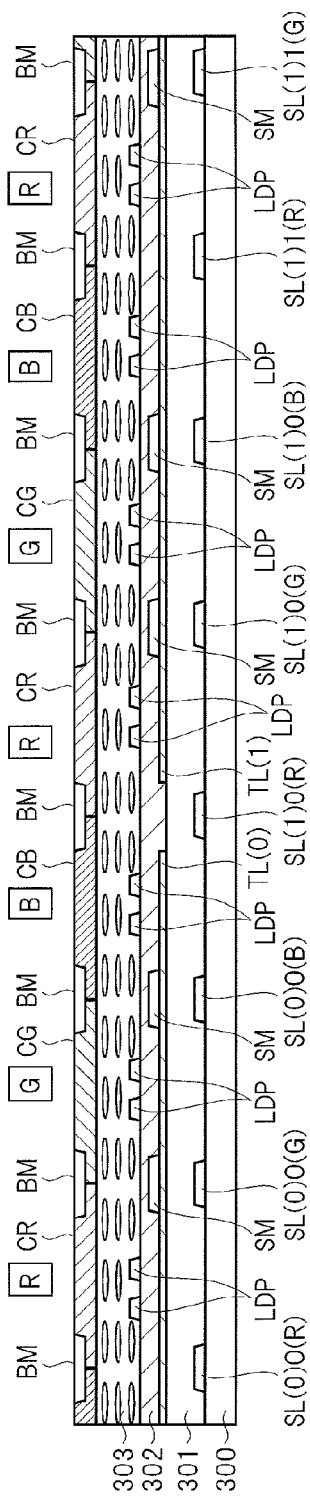

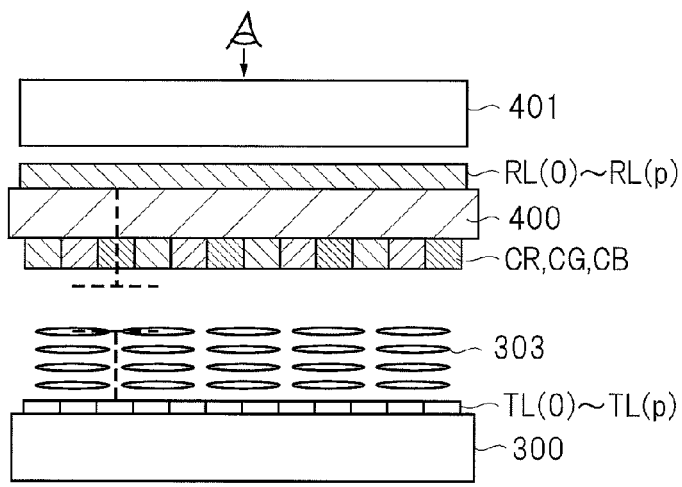
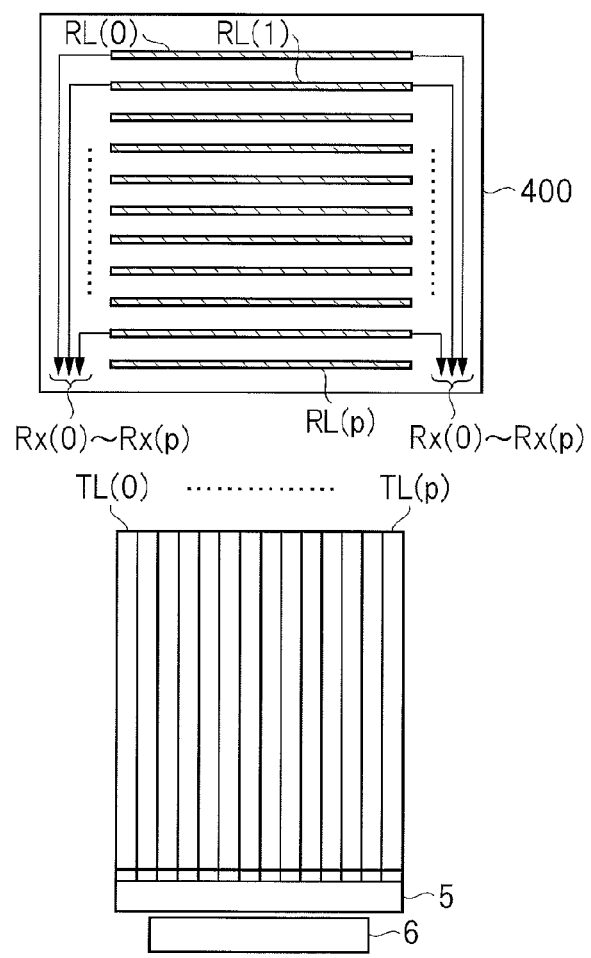
FIG. 4A
FIG. 4B
FIG. 4C

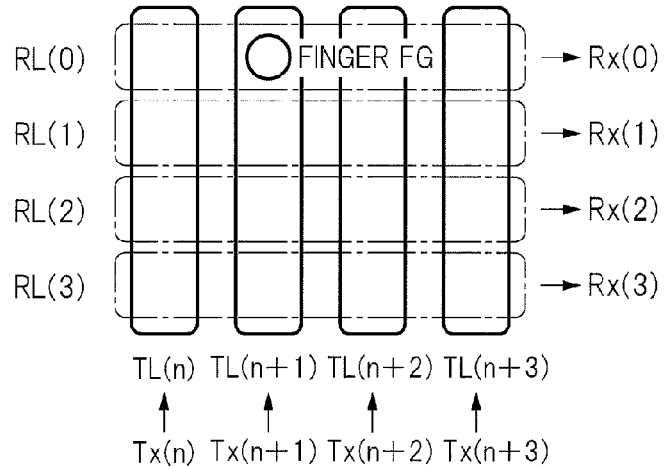
FIG. 12A
FIG. 12B
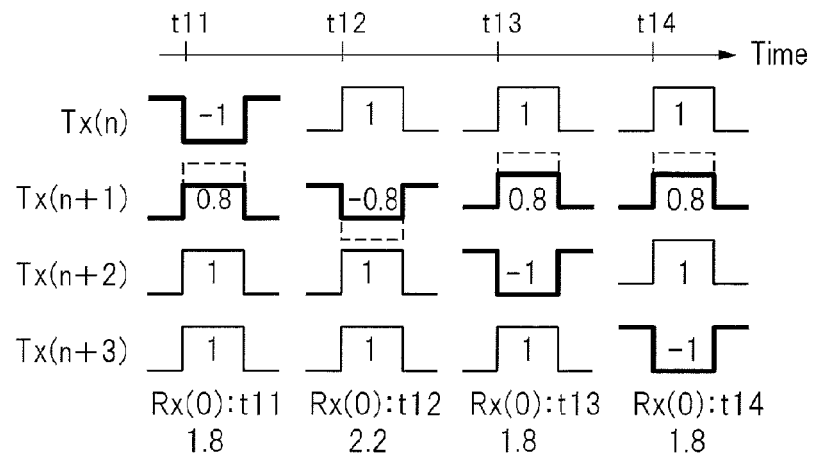
FIG. 12C

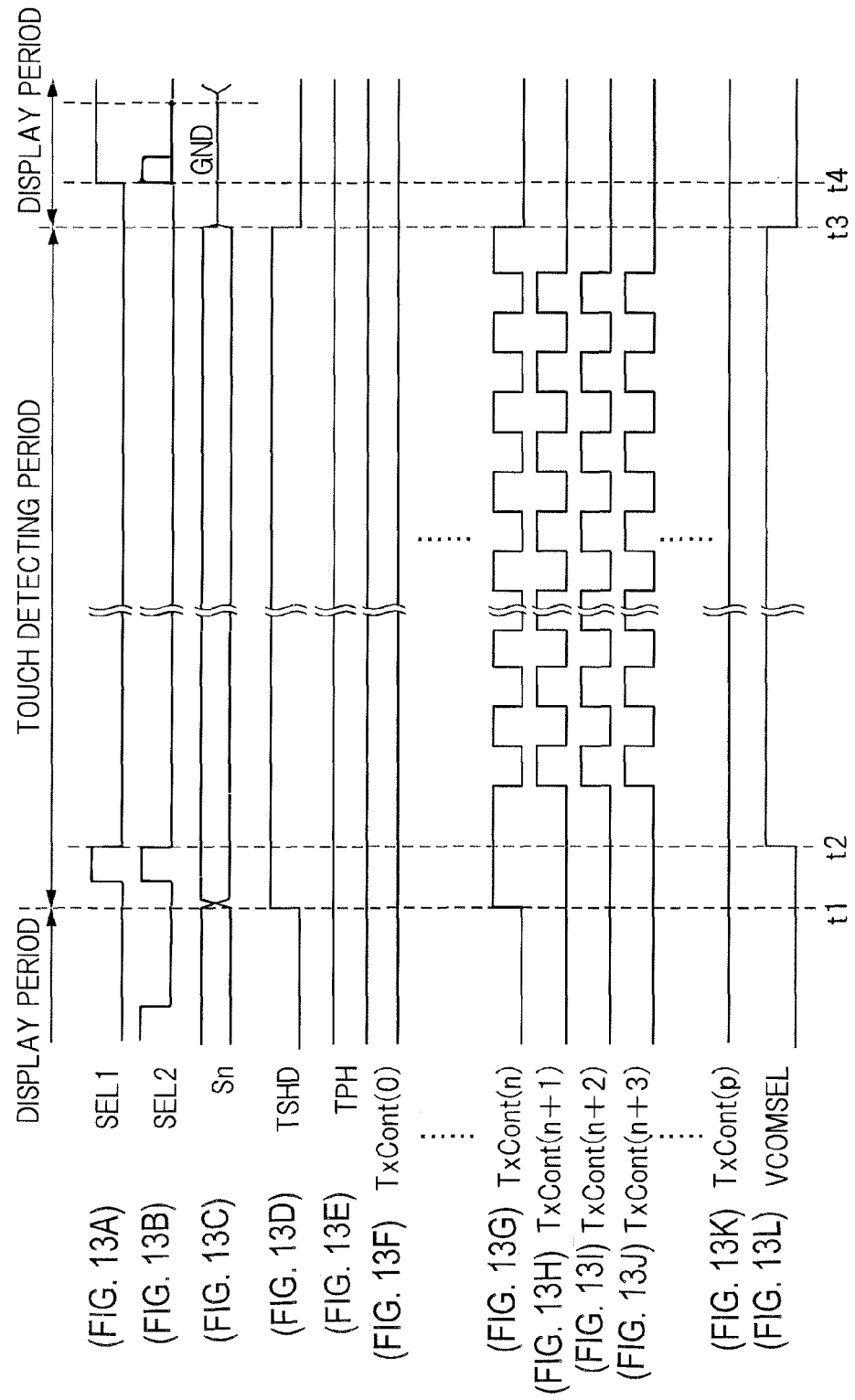

FIG. 14

|  | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Tx(0) | P | P | P | P | P | P | P | P | P | P | P | P | P | P | P | P |
| Tx(1) | P | N | P | N | P | N | P | N | P | N | P | N | P | N | P | N |
| Tx(2) | P | P | N | P | P | N | N | N | P | P | N | N | P | P | N | N |
| Tx(3) | P | N | N | P | N | P | N | P | P | N | P | N | N | P | N | P |
| Tx(4) | P | P | P | P | N | N | N | N | P | P | P | P | N | N | N | N |
| Tx(5) | P | N | P | N | N | P | N | P | P | N | P | N | N | P | N | P |
| Tx(6) | P | P | N | N | N | N | P | P | P | P | N | N | N | N | P | P |
| Tx(7) | P | N | N | P | P | N | P | N | P | N | N | P | N | P | P | N |
| Tx(8) | P | P | P | P | P | P | P | P | N | N | N | N | N | N | N | N |
| Tx(9) | P | N | P | N | P | N | P | N | N | P | N | P | N | P | N | P |
| Tx(10) | P | P | N | N | P | P | N | N | N | N | P | P | N | N | P | P |
| Tx(11) | P | N | N | P | N | P | N | P | N | P | P | N | P | N | P | N |
| Tx(12) | P | P | P | P | N | N | N | P | N | N | N | P | P | P | P | P |
| Tx(13) | P | N | P | N | N | P | N | P | N | P | N | P | P | N | N | N |
| Tx(14) | P | P | N | N | N | N | P | P | N | N | P | P | P | N | N | P |
| Tx(15) | P | N | N | P | N | P | P | N | N | P | P | N | P | N | N | P |
| P | 16 | 8 | 8 | 8 | 8 | 8 | 8 | 8 | 8 | 8 | 8 | 8 | 8 | 8 | 8 | 8 |
| N | 0 | 8 | 8 | 8 | 8 | 8 | 8 | 8 | 8 | 8 | 8 | 8 | 8 | 8 | 8 | 8 |

LIQUID CRYSTAL DISPLAY DEVICE

CROSS-REFERENCE TO RELATED APPLICATION

This is a Continuation application of U.S. patent application Ser. No. 14/742,344, filed on Jun. 17, 2015, which claims priority from Japanese Patent Application No. 2014-124964 filed on Jun. 18, 2014, the content of which is hereby incorporated by reference into this application.

TECHNICAL FIELD OF THE INVENTION

The present invention relates to a liquid crystal display device, and in particular, relates to a liquid crystal display device with a touch detection function capable of detecting an external proximity object based on a change of an electrostatic capacitance.

BACKGROUND OF THE INVENTION

Recent years, a touch detection device capable of detecting an external proximity object, which is referred to as so-called a touch panel has attracted an attention. The touch panel is mounted or integrated on a display device such as a liquid crystal display device. In this way, a liquid crystal display device where a touch panel is mounted or integrated on a display device, i.e., a liquid crystal display device with a touch detection function makes various kinds of button images displayed on the display device, and the touch panel detects for an external object to have been close to the button image. Thereby, it makes it possible to use a touch panel as a device for information inputting with the touch panel as a substitute of a usual mechanical button. Since such a liquid crystal display device with a touch detection function does not necessarily need a device for information inputting like a keyboard or a mouse, the usage is in an expanding trend also in a portable information terminal etc., like a mobile phone other than a computer.

As a detection method of a touch detection device, there exist several methods such as an optical type, a resistance type and an electrostatic capacitance type. Among these, a touch detection device of the electrostatic capacitance type has a comparatively simple structure, and is low in the power consumption, and therefore, has been used for a portable information terminal etc. In Japanese Patent Laid-Open Patent Publication No. 2011-233018 and Japanese Patent Laid-Open Patent Publication No. 2012-047807, a touch detection device of an electrostatic capacitance type has been described.

SUMMARY OF THE INVENTION

In a touch detection device of an electrostatic capacitance type, proximity of an external object is detected using a fact that a value of a capacitance in an intersection part in which a drive electrode and a detection electrode intersect with each other changes due to an external object such as a finger coming close (contacting is included), for example. That is, when a drive signal is supplied to a drive electrode, the proximity of the external object is detected based on a detection signal generated in the detection electrode. In a touch detection device, a plurality of drive electrodes and detection electrodes like these are each provided, and the plurality of drive electrodes are arranged one by one in a column direction, and the plurality of detection electrodes are arranged one by one in a row direction so as to intersect with the plurality of drive electrodes.

In Japanese Patent Laid-Open Patent Publication No. 2011-233018 and Japanese Patent Laid-Open Patent Publication No. 2012-047807, when a drive signal is supplied to a plurality of drive electrodes, supplying the drive signal one by one in a column direction is disclosed, and supplying the drive signal to any of drive electrodes is not taken into consideration.

An object of the present invention is to provide a liquid crystal display device with a touch detection function in which any drive method can be adopted.

A liquid crystal display device according to an aspect of the present invention is provided with: a liquid crystal element arrangement that has a plurality of liquid crystal display elements arranged in a matrix shape; a plurality of scanning lines that are arranged in each row of the liquid crystal element arrangement, and supply a scanning signal to the plurality of liquid crystal display elements arranged in a corresponding row; a plurality of signal lines that are arranged in each column of the liquid crystal element arrangement, and supply an image signal to the plurality of liquid crystal display elements arranged in a corresponding column; a plurality of touch detection drive electrodes that are arranged in a column of the liquid crystal element arrangement, and to which a drive signal for detecting a touch is supplied; and a touch control part that specifies a touch detection drive electrode from the plurality of touch detection drive electrodes, where the drive signal is supplied to the touch detection drive electrode specified by the touch control part.

In addition, as another aspect, the liquid crystal display device is provided with: a signal line driving part that is arranged in one side along rows of the liquid crystal element arrangement, and supplies the image signal to the plurality of signal lines; and a drive electrode driving part that is arranged in the one side, and supplies the drive signal to the specified touch detection drive electrode, and the plurality of signal lines and the plurality of touch detection drive electrodes may extend in parallel.

In addition, as another aspect, the drive electrode driving part is provided with a plurality of unit drive electrode driving parts corresponding to each of the plurality of touch detection drive electrodes, and each of the plurality of unit drive electrode driving parts is provided with: a first switch connected between a corresponding touch detection drive electrode and a first voltage wiring; a second switch connected between a second voltage wiring to which a common drive signal whose voltage changes periodically is supplied and the corresponding touch detection drive electrode; and a control circuit that switch-controls the first switch and the second switch, and the touch control part forms a drive region specifying signal corresponding to each of the plurality of touch detection drive electrodes, and supplies a drive region specifying signal to the control circuit of the unit drive electrode driving part corresponding to the touch detection drive electrode, and in a period to detect a touch, the touch control part makes a second switch in a unit drive electrode driving part corresponding to the touch detection drive electrode to be specified come into an ON state by a drive region specifying signal corresponding to the touch detection drive electrode to be specified, and the common drive signal may be made to be supplied to the touch detection drive electrode to be specified as a drive signal via the second switch.

In addition, as another aspect, drive electrode driving part is provided with a plurality of unit drive electrode driving parts corresponding to each of the plurality of touch detection drive electrodes, and each of the plurality of unit drive electrode driving parts is provided with: a first switch connected between a corresponding touch detection drive electrode and a first voltage wiring; a second switch connected between the corresponding touch detection drive electrode and a second voltage wiring; and a control circuit that switch-controls the first switch and the second switch, and the touch control part forms a drive region specifying signal corresponding to each of the plurality of touch detection drive electrodes, and supplies a drive region specifying signal to a control circuit of a unit drive electrode driving part corresponding to a touch detection drive electrode, and in a period to detect a touch, the touch control part makes the first switch and the second switch in a unit drive electrode driving part corresponding to the touch detection drive electrode to be specified come into an ON state complementarily by a drive region specifying signal corresponding to the touch detection drive electrode to be specified, and a first voltage in the first voltage wiring and a second voltage in the second voltage wiring may be made to be supplied to the touch detection drive electrode to be specified as a voltage of the drive signal.

In addition, as another aspect, the touch control part may be made to form a plurality of drive region specifying signals such that the first switch and the second switch in the plurality of unit drive electrode driving parts may come into an ON state complementarily.

In addition, as another aspect, the touch control part forms the plurality of drive region specifying signals in accordance with a specific code, and a unit drive electrode driving part corresponding to one drive region specifying signal among the plurality of drive region specifying signals supplies a drive signal whose voltage changes from the first voltage to the second voltage periodically to a corresponding touch detection drive electrode, and a unit drive electrode driving part corresponding to the other drive region specifying signal among the plurality of drive region specifying signals may be made to supply a drive signal whose voltage changes periodically from the second voltage to the first voltage to a corresponding touch detection drive electrode.

In addition, as another aspect, the touch control part may be provided with a determination part that determines a detection signal generated in the specified touch detection drive electrode by a drive signal being supplied to the specified touch detection drive electrode.

In addition, as another aspect, the drive electrode driving part is provided with a plurality of unit drive electrode driving parts corresponding to each of the plurality of touch detection drive electrodes, and each of the plurality of unit drive electrode driving parts is provided with: a first switch connected between a corresponding touch detection drive electrode and a first voltage wiring; a second switch connected between the corresponding touch detection drive electrode and a second voltage wiring; and a control circuit that switch-controls the first switch and the second switch, and the liquid crystal display device is provided with a plurality of third switches that are connected between each of the plurality of touch detection drive electrodes and the touch control part, and are made to be in an ON state in a period to detect a touch, and the touch control part forms a drive region specifying signal corresponding to each of the plurality of touch detection drive electrodes, and supplies a drive region specifying signal to a control circuit of a unit drive electrode driving part corresponding to a touch detection drive electrode, and in the period to detect a touch, the touch control part makes the first switch and the second switch in a unit drive electrode driving part corresponding to the touch detection drive electrode to be specified come into an ON state complementarily by a drive region specifying signal corresponding to the touch detection drive electrode to be specified, and a first voltage in the first voltage wiring and a second voltage in the second voltage wiring are supplied to the touch detection drive electrode to be specified as a voltage of the drive signal, and to the touch control part, a detection signal in the specified touch detection drive electrode may be made to be supplied via the third switch.

In addition, as another aspect, the liquid crystal display device is provided with: a first assist circuit that is arranged in the one side of the liquid crystal element arrangement, and is provided with a plurality of fourth switches which connect electrically each of the plurality of touch detection drive electrodes and each of a plurality of signal lines in a period to detect a touch; a second assist circuit that is arranged in the other side opposed to the one side of the liquid crystal element arrangement, and is provided with a plurality of fifth switches which connect electrically each of the plurality of touch detection drive electrodes and each of a plurality of signal lines in a period to detect a touch; and a drive circuit that is arranged at the one side of the liquid crystal element arrangement, and includes the drive electrode driving part and a plurality of terminals electrically connected to the plurality of signal lines, and the drive electrode driving part includes a plurality of unit drive electrode driving parts each corresponding to the plurality of touch detection drive electrodes, and each of the plurality of unit drive electrode driving parts includes; a sixth switch that is connected between a first voltage wiring and a terminal connected to this signal line among the plurality of terminals when a corresponding touch detection drive electrode is connected to a signal line by the first assist circuit and the second assist circuit; a seventh switch connected between the terminal and a second voltage wiring; and a control circuit that switch-controls the sixth switch and the seventh switch in accordance with a drive region specifying signal in a period to detect a touch, and the touch control part forms the drive region specifying signal corresponding to each of the plurality of touch detection drive electrodes, and a touch detection drive electrode and a signal line are electrically connected by the first assist circuit and the second assist circuit in a period to detect a touch, and to a terminal connected to this signal line, a unit drive electrode driving part may be made to supply a first voltage in the first voltage wiring and a second voltage in the second voltage wiring alternately in accordance with the drive region specifying signal.

In addition, as another aspect, the liquid crystal display device is provided with a plurality of detection wirings that correspond to each of the plurality of touch detection drive electrodes, and supply a detection signal to the touch control part, and each of the plurality of unit drive electrode driving parts is provided with an eighth switch that is connected between the terminal and the detection wiring and is made to be in an ON state in a period to detect a touch, and a signal in a touch detection drive electrode that is generated by supplying the first voltage and the second voltage to a touch detection drive electrode alternately may be made to be supplied to the touch control part as the detection signal via the detection wiring.

In addition, as another aspect, the liquid crystal display device has a driver that supplies a scanning signal to each of the plurality of scanning lines, and an output of the driver is made to be in an high impedance state in a period to detect a touch, and the first voltage and the second voltage may be made to be supplied alternately to each of the plurality of touch detection drive electrodes in a period to detect a touch.

In addition, as another aspect, the liquid crystal display device is provided with a signal line selector connected between each terminal of the drive circuit and the plurality of signal lines, and the signal line selector is provided with a ninth switch connected between the terminal and a first signal line among the plurality of signal lines, and a tenth switch connected between the terminal and a second signal line among the plurality of signal lines, and in a display period, the ninth switch and the tenth switch are made to be in an ON state complementarily, and in a period to detect a touch, both the ninth switch and the tenth switch may be made to be in an ON state.

In addition, as another aspect, the liquid crystal display device is provided with a plurality of detection electrodes arranged in rows of the liquid crystal element arrangement, and the touch control part may be made to be provided with a determination part that determines a detection signal generated in the detection electrode by a drive signal being supplied to the specified touch detection drive electrode.

In addition, as another aspect, the touch control part may specify a touch detection drive electrode based on detection region information.

BRIEF DESCRIPTIONS OF THE DRAWINGS

FIGS. 3A and 3B are a plan view and a sectional view illustrating an outline of a module in which the liquid crystal display device with the touch detection function according to the first embodiment has been implemented;

FIGS. 4A to 4C are a plan view and a sectional view illustrating an outline of the module in which the liquid crystal display device with the touch detection function according to the first embodiment has been implemented;

FIGS. 12A to 12C are an explanatory view for describing a principle of CODE Division Multiplexing according to the second embodiment;

FIGS. 13A to 13L are a waveform chart of the liquid crystal display device with the touch detection function according to the second embodiment;

FIG. 14 illustrates other codes used for CODE Division Multiplexing according to the second embodiment;

DESCRIPTIONS OF THE PREFERRED EMBODIMENTS

Figure 1:
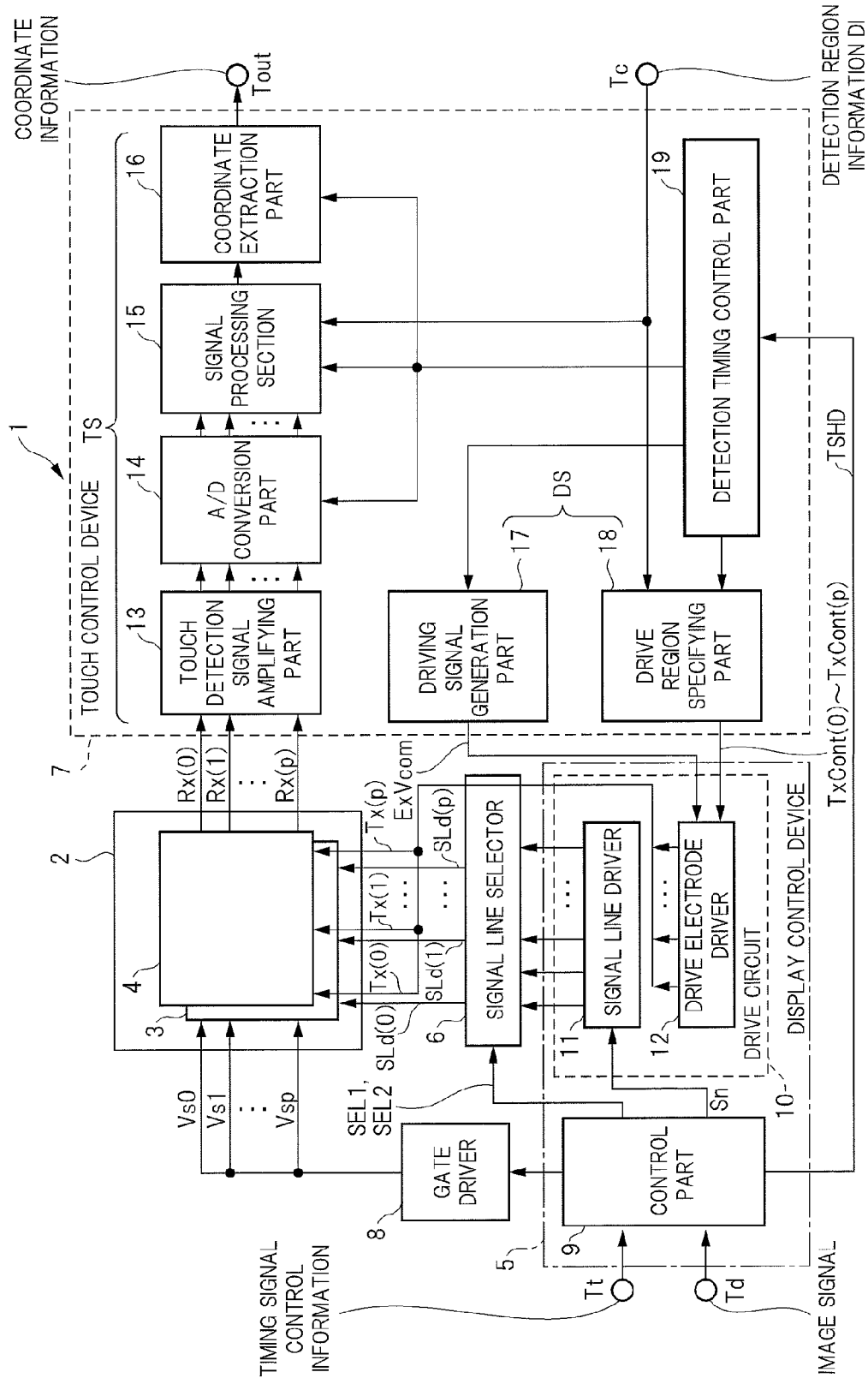
FIG. 1 is a block diagram illustrating a configuration of a liquid crystal display device with a touch detection function according to a first embodiment.

Hereinafter, each embodiment of the present invention will be described with reference to drawings. Note that, disclosure is only an example persistently, and in a person skilled in the art, one which can be thought out easily with respect to an appropriate change which maintains purport of the invention is included in the scope of the present invention as a matter of course. In addition, although there is a case where drawings may be expressed schematically with respect to a width, a thickness and a shape, etc. of each part as compared with an actual mode for making descriptions more clearly, it is an example persistently, and construe of the present invention is not limited.

In addition, in the present specification and each figure, the same reference numeral may be given to the same element as what is mentioned above with respect to a figure which has been already referred to, and detailed descriptions thereof may be omitted suitably.

First Embodiment

As a first embodiment, an example where a touch detection device is applied to an in-cell type liquid crystal display device with a touch detection function which is united with a display device will be described. Here, the in-cell type liquid crystal display device with a touch detection function means a liquid crystal display device with a touch detection function where at least any of a drive electrode and a detection electrode which are included in the touch detection device is provided between a pair of substrates opposed to each other via a liquid crystal of a display device. In the first embodiment, a case where the drive electrode included in the touch detection device is used also as a drive electrode which drives a liquid crystal will be described.

<Entire Configuration>

First, an entire configuration of a liquid crystal display device 1 with a touch detection function will be described using FIG. 1. FIG. 1 is a block diagram illustrating a configuration of the liquid crystal display device 1 with the touch detection function. The liquid crystal display device 1 with the touch detection function is provided with a liquid crystal panel (display panel) 2, a display control device 5, a signal line selector 6, a touch control device 7 and a gate driver 8. In FIG. 1, for making a drawing easy to be seen, the liquid crystal panel 2 is drawn schematically, and is provided with a liquid crystal panel part (display panel part) 3 and a touch detection panel part 4. A configuration of the liquid crystal panel 2 will be described using FIGS. 3 to 6 later.

The liquid crystal panel 2 is provided with the liquid crystal panel part 3 and the touch detection panel part 4. Although described later, these liquid crystal panel part 3 and touch detection panel part 4 share a part of configuration of the drive electrode etc. To the liquid crystal panel part 3, scanning signals Vs0 to Vsp are supplied from the gate driver 8, and image signals SLd(0) to SLd(p) are supplied further from the display control device 5 via the signal line selector 6, and an image in accordance with the image signals SLd(0) to VLd(p) is displayed. The touch detection panel part 4 is supplied driving signals Tx(0) to Tx(p) from the display control device 5, and outputs detection signals Rx(0) to Rx(p) to the touch control device 7.

The display control device 5 has a control part 9 and a drive circuit 10, and the drive circuit 10 has a signal line driver (signal line driving part) 11 which outputs image signals, and a drive electrode driver (drive electrode driving part) 12 which outputs drive signals Tx(0) to Tx(p). The control part 9 receives a timing signal and a control signal which are supplied to a control terminal Tt, and an image signal supplied to an image terminal Td, and supplies an image signal Sn in accordance with the image signal supplied to the image terminal Td to the signal line driver 11. The signal line driver 11 multiplexes the image signal Sn supplied from the control part 9 in terms of time although not restricted in particular, and outputs it to the signal line selector 6. That is, when one output terminal of the signal line driver 11 is seen, two image signals are outputted from one terminal while shifted in terms of time.

In addition, the control part 9 supplies to the signal line selector 6 selection signals SEL1 and SEL2 to distribute image signals multiplexed in terms of time to mutually different signal lines in the signal line selector 6. The signal line selector 6 distributes image signals supplied while multiplexed to signal lines different from each other with the selection signal SEL1 and SEL2, and supplies them to the liquid crystal panel part 3 as the image signals SLd(0) to SLd(p). The signal line selector 6 is arranged near the liquid crystal panel part 3. In this way, by multiplexing image signals in terms of time, it becomes possible to reduce the number of wirings which electrically connects the display control device 5 and the liquid crystal panel part 3. In other words, it become possible to make wide a width of wirings which connects between the display control device 5 and the liquid crystal panel parts 3, and reduce a delay of image signals.

The control part 9 supplies a timing signal to the gate driver 8 based on a timing signal and a control signal which are supplied to the control terminal Tt. The gate driver 8 generates the scanning signals Vs0 to Vsp, and supplies them to the liquid crystal panel part 3 based on the supplied timing signal. The scanning signals Vs0 to Vsp generated by the gate driver 8 are pulse signals which will be in a high level from the scanning signal Vs0 toward Vsp one by one, for example.

The drive electrode driver 12 in the drive circuit 10 receives a common drive signal ExVcom and drive region specifying signals TxCont(0) to TxCont(p) which are supplied from the touch control device 7, and selects a drive electrode TL(i) specified by the drive region specifying signals TxCont(0) to TxCont(p) from a plurality of drive electrodes TL(i, i=0 to p: refer to FIG. 3 etc.) included in the liquid crystal panel 2, and supplies the common drive signal ExVcom as the drive signal Tx(i) to the selected drive electrode TL(i).

The liquid crystal display device 1 with the touch detection function according to the present first embodiment is an in-cell type, and the drive electrode TL(i) is used in common in driving of touch detection and driving of a liquid crystal. That is, the drive electrode TL(i), at the time of image-displaying, functions so as to form an electric field for driving a liquid crystal from/to a picture element electrode described later, and at the time of touch detection, functions so as to transfer a drive signal for touch detection. Therefore, in the present specification, hereinafter, a drive electrode TL(i) is referred to as a common electrode TL(i). In addition, when the common electrode TL(i) functions for touch detection, the common electrode TL(i) may be referred to as one for touch detection in order to clearly specify that it is for touch detection.

In FIG. 1, only the drive signal Tx(i) used for driving for touch detection is illustrated among signals supplied to the common electrode TL(i). Image-displaying of a liquid crystal in the liquid crystal panel part 3 and touch-detecting in the touch detection panel part 4 are performed in a time-division manner so that they may not be overlapped in terms of time. Here, a period in which an image is displayed is referred to as a display period, and a period in which touch-detecting is performed is referred to as a touch detection period.

The drive electrode driver 12 supplies a drive signal for driving a liquid crystal to the common electrode TL(i) in the liquid crystal panel 2 in the display period in which image displaying is performed, and supplies the drive signal Tx(i) for touch detection to the common electrode TL(i) in the liquid crystal panel 2 in the detection period in which touch-detecting is performed. Although a drive signal for driving the liquid crystal is supplied from the control part 9 to the drive electrode driver 12 in the display period, it is omitted for avoiding a drawing from becoming complicated in FIG. 1. As a matter of course, in the drive circuit 10, a drive electrode driver for touch detection and a drive electrode driver for driving the liquid crystal may be made to be provided separately. In addition, the control part 9 outputs a touch-display synchronizing signal TSHD which discriminates the display period and the touch detection period.

The touch control device (touch control part) 7 is provided with a detection signal processing part (determination part) TS in which the detection signal Rx(0) to Rx(p) from the touch detection panel part 4 are processed, a drive processing part DS in which the common electrode TL(i) is controlled and a detection timing control part 19 in which the detection signal processing part TS and the drive processing part DS are controlled. Here, the detection signal processing part TS detects whether the touch detection panel part 4 is touched, and in the case of having been touched, performs processing to calculate a coordinate of the touched position. In addition, the drive processing part DS performs processing to specify a region in which a touch is detected in the touch detection panel part 4.

First, when the detection signal processing part TS is described, this detection signal processing part TS receives the detection signals Rx(0) to Rx(p) from the touch detection panel part 4, and includes a touch detection signal amplifying part 13 which amplifies the received detection signal Rx(0) to Rx(p), and an analog-to-digital conversion part (hereafter, referred to as an A/D conversion part) 14 which converts into a digital signal an analog detection signal amplified by the touch detection signal amplifying part 13.

Here, the touch detection signal amplifying part 13 removes a high frequency component (noise component) from the received detection signals Rx(0) to Rx(p), and performs amplifying operation. In addition, the detection signals Rx(0) to Rx(p), although described later using FIG. 2, are generated in response to the drive signal Tx(i) supplied to the common electrode TL(i). Therefore, the A/D conversion part 14, in synchronization with the drive signal Tx(i) or the common drive signal ExVcom, samples the amplified signal from the touch detection signal amplifying part 13, and converts them into a digital signal.

In addition, the detection signal processing part TS has a signal processing section 15 which receives the digital signal acquired by the conversion operation by the A/D conversion part 14 and performs signal processing for this digital signal, and a coordinate extraction part 16 which extracts a coordinate of the touched position from the signal acquired by processing of the signal processing section 15. As the signal processing performed in the signal processing section 15, included is processing to remove a noise component having a frequency higher than a frequency of sampling which has been performed in the A/D conversion part 14, and to detect an existence of a touch in the touch detection panel part 4. The coordinate of the touched position extracted by the coordinate extraction part 16 is outputted as coordinate information from an output terminal Tout.

The drive processing part DS has a driving signal generation part 17 which generates the common drive signal ExVcom for driving the common electrode TL(i) in response to a control signal from the detection timing control part 19, and a drive region specifying part 18 which generates drive region specifying signals TxCont(0) to TxCont(p) based on a detection region information DI supplied from a control terminal Tc and the control signal from the detection timing control part 19. The drive region specifying part 18 determines (specify) the common electrode TL(i) to which supplied is the common drive signal ExVcom among a plurality of common electrodes TL(i) based on the detection region information DI supplied from the control terminal Tc, and generates the drive region specifying signals TxCont(0) to TxCont(p).

The detection timing control part 19 receives the touch-display synchronizing signal TSHD which has been outputted from the control part 9 of the display control device 5, and carries out control so that the drive processing part DS carries out processing when this touch-display synchronizing signal TSHD indicates the touch detection period. In addition, in the touch detection period, the detection timing control part 19 carries out the conversion of the detection signals Rx(0) to Rx(p) which the touch detection signal amplifying part 13 has received, and controls the A/D conversion part 14, the signal processing section 15 and the coordinate extraction part 16 so that the touched coordinate may be extracted.

In addition, to the signal processing section 15, the detection region information DI is supplied from the control terminal Tc. This is because when the common drive signal ExVcont is supplied only to the common electrode TL(i) specified (identified) by the drive region specifying signals TxCont(0) to TxCont(p) among a plurality of common electrodes TL(i) included in the liquid crystal panel 2, an existence of a touch is made to be detected in the signal processing section 15 only with respect to a detection signal generated when the common drive signal ExVcont is supplied to the specified common electrode TL(i). The configuration to carry out processing only for a detection signal corresponding to the specified common electrode TL(i) is not limited to this. For example, in the A/D conversion part 14, it may be applicable that sampling of only the detection signal corresponding to the specified common electrode TL(i) is carried out, and the conversion into a digital signal is carried out.

<Basic Principle of Electrostatic Capacitance Type Touch Detection (Mutual Capacitance Method)>

Figure 2A:
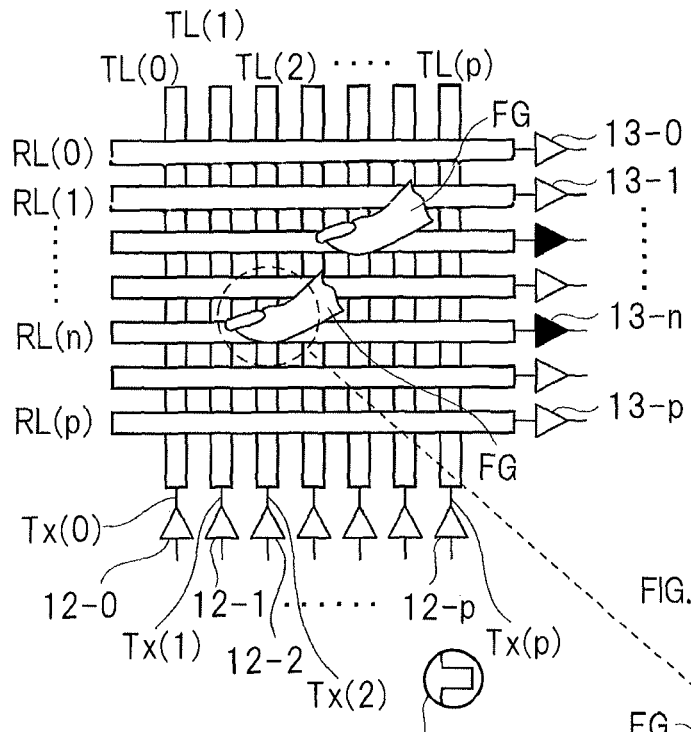
FIGS. 2A to 2C are an explanatory view for describing a basic principle of electrostatic capacitance type touch detection (mutual capacitance method)
Figure 2B:
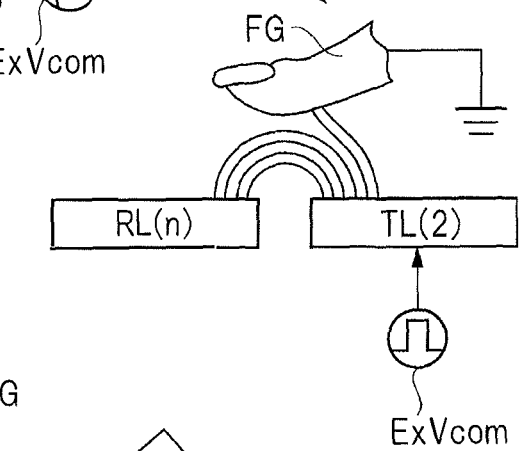
Figure 2C:
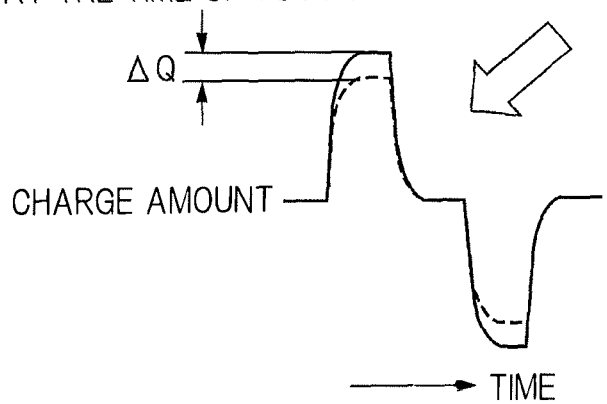

FIGS. 2A to 2C are a schematic diagram illustrating a basic principle of a electrostatic capacitance type touch detection used in the first embodiment. In FIG. 2A, each of TL(0) to TL(p) is the common electrode provided in the liquid crystal panel 2, and each of RL(0) to RL(p) is the detection electrode provided in the touch detection panel part 4. In FIG. 2A, each of the common electrodes TL(0) to TL(p) extends in a column direction, and is arranged in a row direction in parallel with each other. In addition, each of the detection electrodes RL(0) to RL(p) extends in a row direction so as to intersect with the common electrodes TL(0) to TL(p), and is arranged in a column direction in parallel with each other. The detection electrodes RL(0) to RL(p) are formed above the common electrodes TL(0) to TL(p) so that a space may arise between the detection electrodes RL(0) to RL(p) and the common electrodes TL(0) to TL(p).

In FIG. 2A, each of 12-0 to 12-$p$ indicates a unit drive electrode driver provided in the drive electrode driver 12. That is, the drive signals Tx(0) to Tx(p) are outputted from the unit drive electrode drivers 12-0 to 12-P. In addition, each of 13-0 to 13-$p$ indicates a unit amplifying part in the touch detection signal amplifying part 13. In FIG. 2A, a pulse signal enclosed by a circle of a solid line indicates a waveform of the common drive signal ExVcom. As an external object, a finger is indicated as FG in the same figure.

The common drive signal ExVcom is supplied as the drive signal Tx(2) from the drive electrode driver 12 to the common electrode specified by the drive region specifying signals TxCont 0) to TxCont(p), which is the common electrode TL(2) in this example. By supplying the common drive signal ExVcom which is a pulse signal to the common electrode TL(2), an electric field is generated between the common electrode TL(2) and the detection electrodes RL(n) which intersects with the common electrode TL(2) as illustrated in FIG. 2B. At this time, when a finger FG touches a position close to the common electrode TL(2) of the liquid crystal panel 2, an electric field is generated also between the finger FG and the common electrode TL(2), and an electric field which is generated between the common electrode TL(2) and the detection electrode RL(n) decreases. Thereby, a charge amount between the common electrode TL(2) and the detection electrode RL(n) decreases. As the result, as illustrated in FIG. 2C), a charge amount generated in response to a supply of the common drive signal ExVcom decreases by $\Delta\Omega$ in a case of the finger FG touching as compared with the case where the finger FG does not touch. The charge amount difference appears in the detection signal Rx(n) as a voltage difference, and is supplied to the unit amplifying part 13-$n$ in the touch detection signal amplifying part 13, and is amplified.

Note that, in FIG. 2C, a horizontal axis indicates time, and a vertical axis indicates charge amount. In response to rising of the common drive signal ExVcom, i.e. rising of a voltage of the drive signal Tx(2), a charge amount increases (increases toward an upper side in the same figure), and in response to falling of a voltage of the drive signal Tx(2), a charge amount increases (increases toward an lower side in the same figure). At this time, an increased charge amount changes depending on an existence of a touch of a finger FG.

In addition, in this figure, after a charge amount increases toward an upper side, reset is performed before increasing toward a lower side, and in the same way, after a charge amount increases toward a lower side, reset of the charge amount is performed before increasing toward an upper side. In this way, a charge amount varies up and down on the basis of the reset charge amount.

By supplying the common drive signal ExVcom to the common electrode TL(0) to TL(p) specified by the drive region specifying signals TxCont(0) to TxCont(p), from each of a plurality of the detection electrodes RL(0) to RL(p) which intersect with the specified common electrode, the detection signals Rx(0) to Rx(p) which have a voltage value in accordance with whether a finger FG has touched a position close to each intersection part will be outputted. The A/D conversion part 14 (FIG. 1) samples each of the detection signals Rx(0) to Rx(p) at the time of a difference ΔΩ having been generated in a charge amount in accordance with whether a finger FG has carried out touching, and carries out conversion thereof into a digital signal.

<Module>

FIG. 3A is a plan view illustrating an outline of a module in which the liquid crystal display device 1 with the touch detection function according to the first embodiment has been implemented. In addition, FIG. 3B is a sectional view of B-B' in FIG. 3A.

The liquid crystal panel 2 is provided with signal lines SL(0) to SL(p) which extend in a longitudinal direction in the same figure, and are arranged in parallel in a horizontal direction, and a plurality of the common electrodes TL(0) to TL(p) which extend in the same direction as the extending direction of these signal lines SL(0) to SL(p). That is, also each of the common electrodes TL(0) to TL(p) extends in a longitudinal direction in the same figure, and is arranged in parallel in a horizontal direction. Note that, although scanning lines to which selection signals Vs0 to Vsp are supplied and the detection electrodes RL(0) to RL(p) which transfer the detection signals Rx(0) to Rx(p) extend in a horizontal direction and are arranged in parallel in a longitudinal direction in the same figure, these have been omitted in FIG. 3A.

The display control device 5 and the signal line selector 6 which have been described in FIG. 1 are arranged in the side of a short side of the liquid crystal panel 2. That is, the display control device 5 and the signal line selector 6 extend in a direction orthogonal to the signal lines SL(0) to SL(p) and the common electrodes TL(0) to TL(p). Although described later using FIG. 6, the signal line selector 6 is formed in the same substrate as the liquid crystal panel 2, and each of the signal lines SL(0) to SL(p) and the common electrodes TL(0) to TL(p) is connected to the signal line selector 6, and image signals and drive signals which are outputted from the display control device 5 are supplied to the signal lines SL(0) to SL(p) and the common electrodes TL(0) to TL(p) of the liquid crystal panel 2 via the signal line selector 6. Here, signals supplied to the signal line selector 6 from the display control device 5 are image signals, drive signals and selection signals. Since the liquid crystal panel 2 performs color displaying, image signals supplied to the signal line selector 6 from the display control device 5 are image signals of R (red), G (green) and B (blue) corresponding to the three primary colors, and are illustrated as R/G/B in the same figure. In addition, in the same figure, the drive signal is indicated as Tx(0) to Tx(p), and the selection signal is indicated as SEL1 and SEL2.

Each of signal lines SL(0) to SL(p) is formed in one principal surface of a TFT substrate 300 which is a glass substrate. In the module illustrated in FIG. 3, a plurality of signal lines (for example, signal lines SL(0)0 and SL(0)1) correspond to one common electrode (for example, common electrode TL(0)), and each signal line SL(0)0 and SL(0)1 includes three signal lines corresponding to image signals R, G and B. In FIG. 3B, illustrated are the signal lines SL(0)0(R), SL(0)0(G) and SL(0)0(B) corresponding to image signals R, G and B included in the signal line SL(0) 0, and the signal line SL(1)0(R), SL(1)0(G) and SL(1)0(B) corresponding to image signals R, G and B included in the signal line SL(1).

Here, a notation method of a signal line used in the present specification will have been described. When the signal line SL(0)0(R) and the signal line SL(1)0(R) will be described as an example, first, a number in ( ) denotes a number of a corresponding common electrode, and the following number denotes a number of a pixel in a corresponding common electrode, and an alphabetic character in ( ) denotes a three primary colors (R, G, B) of a pixel. That is, the signal line SL(0)0(R) denotes a signal line corresponding to the common electrode TL(0), and denotes a signal line to transfer an image signal corresponding to the 0th pixel and the red of the three primary colors. In the same way, the signal line SL(1)0(R) denotes a signal line corresponding to the common electrode TL(1) arranged next to the common electrode TL(0), and denotes a signal line to transfer an image signal corresponding to the 0th pixel and the red of the three primary colors. Therefore, each of SL(1)1(R) and SL(1)1(G) illustrated in FIG. 3B denotes a signal line corresponding to the common electrode TL(1), and will denote a signal line to transfer an image signal corresponding to the three primary colors red and green of the first pixel.

In FIG. 3B, on one principal surface of signal lines SL(0)0(R), SL(0)0(G) and SL(0) (B), etc. corresponding to the image signals R, G and B, and one principal surface of the TFT substrate 300, an insulating layer 301 is formed further, and the common electrodes TL(0) to TL(p) are formed on the insulating layer 301. On each of these common electrodes TL(0) to TL(p), an auxiliary electrode SM is formed, and the auxiliary electrode SM is electrically connected with the common electrode, and reduction of an electric resistance of the common electrode is achieved. On the upper surfaces of the common electrodes TL(0) to TL(p) and the auxiliary electrode SM, an insulating layer 302 is formed, and on the upper surface of the insulating layer 302, a picture element electrode LDP is formed. In FIG. 3(B), each of CR, CB and CG is a color filter, and a liquid crystal layer 303 is inserted between the color filters CR (red), CG (green) and CB (blue) and the insulating layer 302. Here, the picture element electrode LDP is provided on an intersection point between a scanning line and a signal line, and in the upper part of each picture element electrode LDP, the color filters CR, CG or CB corresponding to each picture element electrode LDP are provided. Between each color filters CR, CG and CB, a black matrix BM is provided.

FIG. 4 is a schematic diagram illustrating a relation between the detection electrodes RL(0) to RL(p) and the common electrodes TL(0) to TL(p). As illustrated in FIG. 4A, on the upper surface of the color filters CR, CG and CB, a CF glass substrate 400 which is a glass substrate is provided, and on the upper surface of the CF glass substrate 400, the detection electrodes RL(0) to RL(p) are formed. In addition, on the upper part of the detection electrodes RL(0) to RL(p), a polarizing plate 401 is formed. Note that, here, as illustrated in FIG. 4A, although description has been carried out as the upper surface because a case of being viewed from the upper side in the same figure is made to be an example, it is needless to say that the upper surface is turned into a lower surface or a side surface by the direction of viewing changing. In addition, in FIG. 4A, an electrode of a capacitive element formed between the detection electrodes RL(0) to RL(p) and the common electrodes TL(0) to TL(p) is drawn with a dashed line.

As illustrated in FIGS. 3A and 4C, each of the signal lines SL(0) to SL(p) and the common electrodes TL(0) to TL(p) extends in a longitudinal direction, i.e., in a long side direction, and is arranged in parallel in a horizontal direction, i.e., in a short side direction. In contrast with this, the detection electrodes RL(0) to RL(p) are provided on the CF glass substrate 400 as illustrated in FIG. 4B, and are arranged so as to intersect with the common electrodes TL(0) to TL(p). That is, in FIG. 4B, the detection electrodes RL(0) to RL(p) extend in a horizontal direction (short side), and are arranged in parallel in a longitudinal direction (long side). The detection signals Rx(0) to Rx(p) from each of the detection electrodes RL(0) to RL(p) are supplied to the touch control device 7.

When seen by a plane view, as illustrated in FIG. 3A, it can be regarded that the signal lines SL(0) to SL(p) and the common electrodes TL(0) to TL(p) extend in parallel. Note that, here, "in parallel" is referred to as extending without intersecting mutually from one end up to the other end, and even when a part or all of one line has been provided in a inclined state against the other line, this state is assumed to be "being parallel" if these lines do not intersect with each other from one end to the other end.

In addition, when an arrangement of the common electrodes TL(0) to TL(p) is grasped with the signal line selector 6 and the display control device 5 as a base point, it can be regarded that each of the common electrodes TL(0) to TL(p) extends in a direction going away from the signal line selector 6 and the display control device 5 which are the base point. In this case, it can be regarded that also the signal lines SL(0) to SL(p) extend in a direction going away from the signal line selector 6 and the display control device 5 which are the base point.

Note that, in FIG. 4A, the signal lines and the picture element electrodes LDP illustrated in FIG. 3B have been omitted.

(Entire Configuration of Module)

Figure 5:
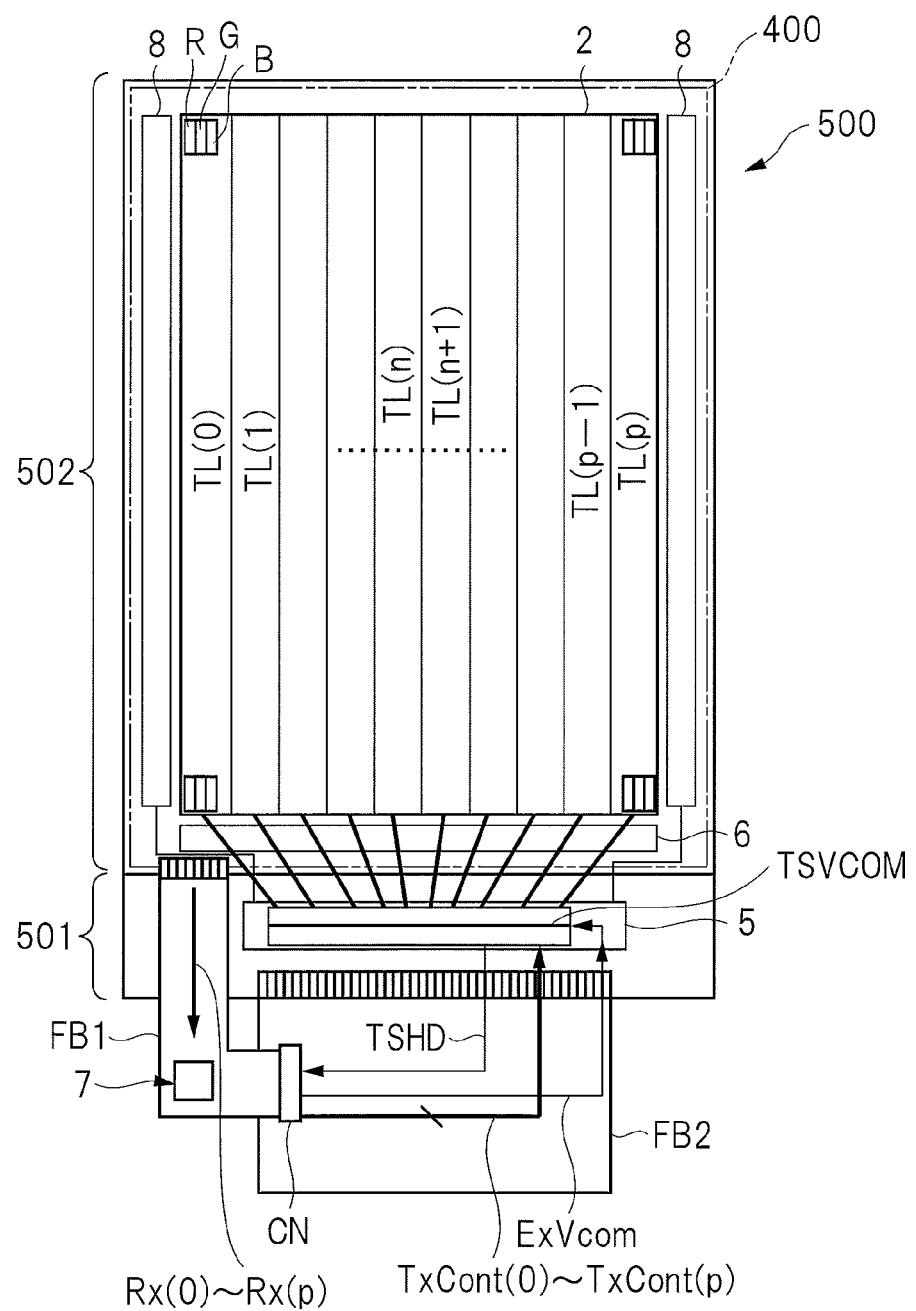
FIG. 5 is a plan view illustrating an outline of the module in which the liquid crystal display device with the touch detection function according to the first embodiment has been implemented.

FIG. 5 is a figure illustrating an entire configuration of a module 500 where the liquid crystal display device 1 with the touch detection function is implemented. The module 500 includes a region 501 of the TFT substrate 300 described in FIG. 3, and a region 502 which has the TFT substrate 300 and the CF glass substrate 400 which have been described in FIG. 4. In the module 500, the TFT substrate 300 is formed unitedly, and is formed commonly in the region 501 and the region 502, and in the region 502, as illustrated in FIG. 4, the CF glass substrate 400, the detection electrodes RL(0) to RL(p) and the polarizing plate 401, etc. are formed further on the upper surface of the TFT substrate 300.

In this region 502, the gate driver 8 illustrated in FIG. 1 is implemented along a long side direction of the module 500. In the present embodiment, gate drivers 8 are implemented along two long side directions of the module 500 in a state where a plurality of the common electrodes TL(0) to TL(p) are sandwiched. In this case, the scanning lines described in FIG. 1 extend along a short side direction of the module, and are arranged in parallel in a long side direction, and are connected to the gate driver 8. In addition, in the region 502, the signal line selector 6 described above is implemented. In the present first embodiment, the signal line selector 6 is implemented so as to extend along a short side of the module 500. On the other hand, in the region 501, the display control device 5 is implemented. In FIG. 5, the common electrodes TL(0) to TL(p) included in the display panel 2 are clearly specified, and to each of the common electrodes TL(0) to TL(p), the drive signals Tx(0) to Tx(p) are supplied from the display control device 5 via the signal line selector 6. In addition, to the gate driver 8, a timing signal is supplied from the display control device 5 in order to form the scanning signals Vso to Vsp. In FIG. 5, the region of the CF glass substrate 400 is drawn so as to be surrounded with a two-point dashed line. In the present embodiment, although the gate driver 8 and the signal line selector 6 are formed in the region of the CF glass substrate 400, the formation is not limited to this.

The detection electrodes RL(0) to RL(p) described in FIG. 4 are connected to a flexible cable FB via wirings arranged between a long side of the module 500 and a long side of the display panel 2. In this flexible cable FB1, the touch control device 7 described in FIG. 1 is implemented, and the detection signals Rx(0) to Rx(p) in the detection electrodes RL(0) to RL(p) are supplied to the touch control device 7 via wirings in the flexible cable FB1. In addition, to the region 501, a flexible cable FB2 is connected, and terminals of the display control device 5 are connected to wirings in the flexible cable FB2.

In addition, in the flexible cable FB2, a connector CN is implemented. Via this connector CN, the flexible cables FB1 and FB2 are electrically connected. Via this connector CN, transmission and reception of a plurality of signals are performed between the display control device 5 and the touch control device 7. In FIG. 5, among the plurality of signals transmitted or received, only the region specifying signal TxCont, the common drive signal ExVcom and the touch-display synchronizing signal TSHD are indicated. That is, the module 500 is provided with the flexible cable FB1, the touch control device 7 implemented in the flexible cable FB1, the flexible cable FB2 and the connector CN other than the region 502 and the region 501.

In the present first embodiment, although not restricted in particular, each of the display control device 5 and the touch control device 7 is constituted by one semiconductor integrated circuit device. In this case, the semiconductor integrated circuit device constituting the display control device 5 is formed as Chip On Glass (COG). In addition, also each of the signal line selector 6 and the gate driver 8 may be constituted by the semiconductor integrated circuit device. Also in this case, these semiconductor integrated circuit devices may be formed as COG.

In FIG. 5, R, G and B which are indicated in four sides of the liquid crystal panel 2 indicate sub-pixels constituting one pixel.

<Liquid Crystal Element Arrangement>

Figure 6:
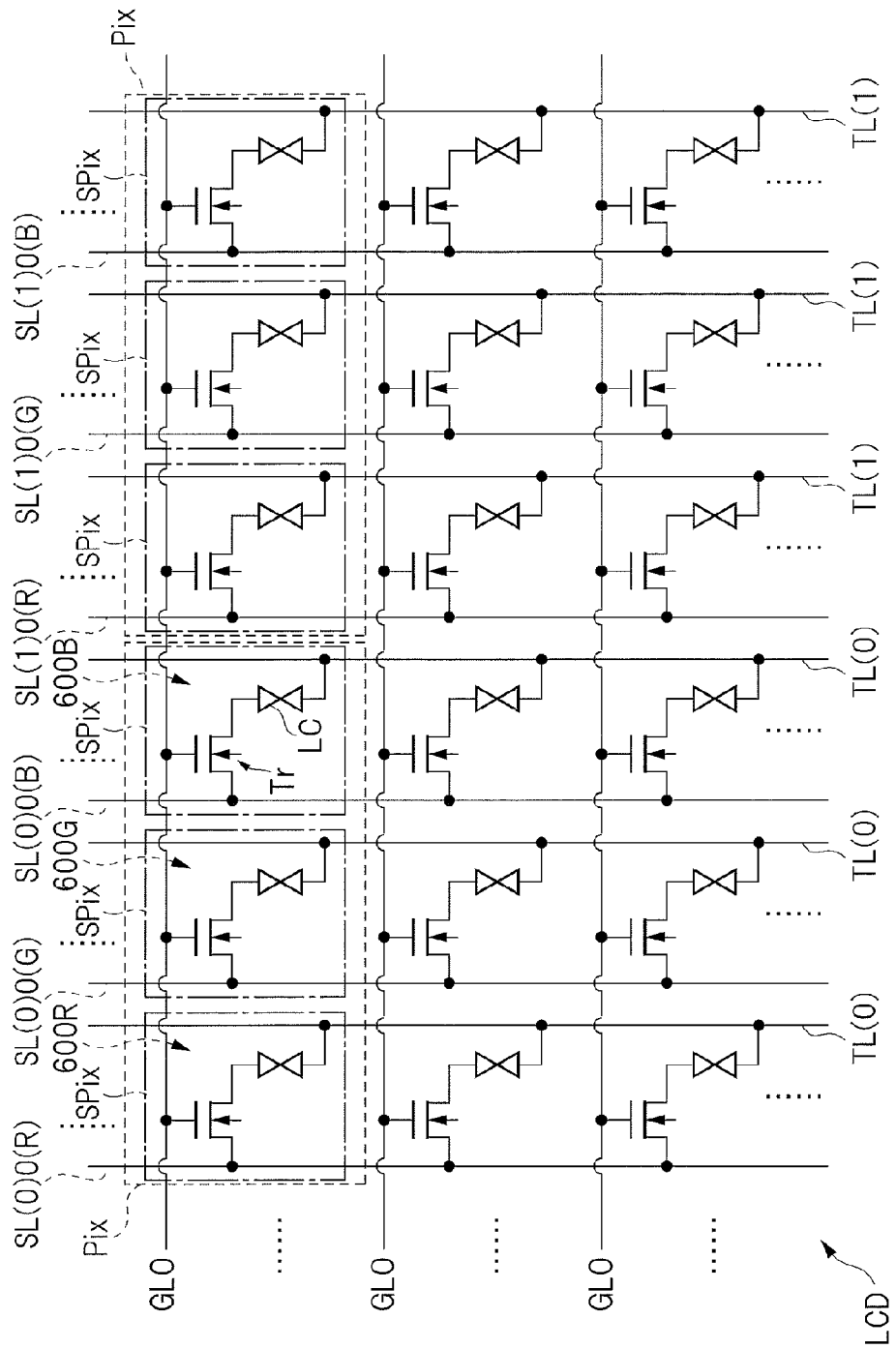
FIG. 6 is a circuit diagram illustrating a configuration of a liquid crystal element arrangement according to the first embodiment.

FIG. 6 is a circuit diagram illustrating a circuit configuration of the liquid crystal panel 2. In the same figure, each of two or more of SPix shown by a dashed dotted line denotes one liquid crystal display element. The liquid crystal display elements SPix are arranged in a matrix shape in the liquid crystal panel 2, and constitute a liquid crystal element arrangement LCD. The liquid crystal element arrangement LCD is provided with a plurality of scanning lines GL0 to GLp which are arranged in each row and extend in a row direction, and signal lines SL(0)0(R), SL(0)0(G), SL(0)0(B) to SL(p)p(R), SL(p)p(G) and SL(p)p(B) which are arranged in each column and extend in a column direction. In addition, the liquid crystal element arrangement LCD has the common electrodes TL(0) to TL(p) which are arranged in each column and extend in a column direction. In FIG. 6, illustrated is a part of the liquid crystal element arrangement related to the scanning lines GL0 to GL2, and the signal lines SL(0)0(R), SL(0)0(G), SL(0)0(B) to SL(1)0(R), SL(1)0(G) and SL(1)0(B), and the common electrodes TL(0) and TL(1).

In FIG. 6, although illustration is carried out as the common electrodes TL(0) and TL(1) are arranged in each column for making description easy to be understood, it is to be understood that one common electrode is arranged with respect to a plurality of signal lines as described in FIGS. 3A and 3B. As a matter of course, as illustrated in FIG. 6, the common electrode may be arranged in each column of the liquid crystal element arrangement LCD. In any case, each of the common electrodes TL(0) to TL(p) is arranged in a column of the liquid crystal element arrangement LCD so as to be parallel to the signal lines.

Each liquid crystal display element SPix arranged at an intersection point between a row and column of the liquid crystal element arrangement LCD is provided with a thin film transistor Tr formed on a TFT glass substrate 300, and the liquid crystal element LC whose one terminal is connected to the source of the thin film transistor Tr. In the liquid crystal element arrangement LCD, a gate of the thin film transistor Tr of a plurality of the liquid crystal display elements SPix arranged in the same row is connected to a scanning line arranged in the same row, and a drain of the thin film transistor Tr of a plurality of the liquid crystal display elements SPix arranged in the same column is connected to a signal line arranged in the same column. In other words, a plurality of the liquid crystal display elements SPix are arranged in a matrix shape, and a scanning line is arranged in each row, and to the scanning line, a plurality of the liquid crystal display elements SPix arranged in a corresponding row are connected. In addition, a signal line is arranged in each column, and to the signal line, the liquid crystal display element SPix arranged in a corresponding column is connected. In addition, the other end of the liquid crystal element LC of a plurality of the liquid crystal display elements SPix arranged in the same column is connected to a common electrode arranged in the column.

When description is carried out with an example illustrated in FIG. 6, in the same figure, a gate of each thin film transistor Tr of a plurality of the liquid crystal display elements SPix arranged in the highest row is connected to the scanning line GL0 arranged in the highest row. In addition, in the same figure, a drain of each thin film transistor Tr of a plurality of the liquid crystal display elements SPix arranged in the leftmost column is connected to the signal line SL(0)0(R) arranged in the leftmost column. In addition, the other end of each liquid crystal element of a plurality of the liquid crystal display elements SPix arranged in the leftmost column is connected to the common electrode TL(0) arranged in the leftmost side in FIG. 6. As also mentioned above, one common electrode corresponds to a plurality of signal lines. Therefore, in an example illustrated in FIG. 6, it can be regarded that the common electrode TL(0) has become a common electrode which is common to three columns.

One liquid crystal display element SPix corresponds to one sub-pixel (subpixel) mentioned above. Therefore, sub-pixels of three primary colors R, G and B are constituted by three liquid crystal display elements SPix. In FIG. 6, one pixel Pix is formed by three liquid crystal display elements SPix arranged in succession in the same row, and a color will be expressed by this pixel Pix. That is, in FIG. 6, the liquid crystal display element SPix indicated as 600R is assumed to be the sub-pixel SPix (R) of R (red), and the liquid crystal display element SPix indicated as 600G is assumed to be the sub-pixel SPix (G) of G (green), and the liquid crystal display element SPix indicated as 600B is assumed to be the sub-pixel SPix (B) of B (blue). Therefore, to the sub-pixel SPix (R) indicated as 600R, a red color filter CR is provided as a color filter, and to the sub-pixel SPix (G) indicated as 600G, a green color filter CG is provided as a color filter, and to the sub-pixel SPix (B) indicated as 600B, a blue color filter CB is provided as a color filter.

In addition, among signals showing one pixel, an image signal corresponding to R is supplied to the signal line SL(0)0(R) from the signal line selector 6, and an image signal corresponding to G is supplied to the signal line SL(0)0(G) from the signal line selector 6, and an image signal corresponding to B is supplied to the signal line SL(0)0(B) from the signal line selector 6.

The thin film transistor Tr in each liquid crystal display element SPix, although not restricted in particular, is an N-channel type transistor. To the scanning lines GL0 to GLp, the pulse-shaped scanning signals Vs0 to Vsp (FIG. 1) which will become a high level one by one in this order are supplied from the gate driver 8, for example. That is, in the liquid crystal element arrangement LCD, a voltage of a scanning line will become a high level one by one from the scanning line GL0 arranged in the upper row toward the scanning line GLp arranged in the lower row. Thereby, in the liquid crystal element arrangement LCD, the thin film transistor Tr in the liquid crystal display element SPix will be in an ON state one by one from the liquid crystal display element SPix arranged in the upper row toward the liquid crystal display element SPix arranged in the lower row. By the thin film transistor Tr being in an ON state, a pixel signal which has been supplied to the signal line at that time is supplied to the liquid crystal element LC via the thin film transistor which is in an ON state. In accordance with a value of the pixel signal supplied to the liquid crystal element LC, an electric field in the liquid crystal element LC changes, and a modulation of a light transmitted through the liquid crystal element LC changes. Thereby, in synchronization with the scanning signals Vs0 to Vsp supplied to the scanning lines GL0 to GLp, a color image in accordance with an image signal supplied to the signal lines SL(0)0(R), SL(0)0(G), SL(0)0(B) to SL(p)p(R), SL(p)p(G) and SL(p)p(B) will be displayed on the liquid crystal panel 2.

Here, a correspondence between an arrangement of the module illustrated in FIGS. 3 and 5 and the circuit diagram illustrated in FIG. 6 will be described as follows. The liquid crystal element arrangement LCD has two sides along the row and two sides along the column. The signal line selector 6 and the display control device 5 which have been illustrated in FIGS. 3 and 5 are arranged in one side among the two sides along the row. That is, in FIG. 6, the signal line selector 6 is arranged so as to extend in a horizontal direction in the lower side, and furthermore, the display control device 5 is arranged in the lower side of the signal line selector 6. In addition, the gate driver 8 illustrated in FIG. 5 is arranged each in two sides along two columns of the liquid crystal element arrangement LCD.

Although a case where the number of sub-pixels constituting one pixel is three has been described, it is not limited to this, and one pixel may be constituted of sub-pixels where in addition to the above-mentioned RGB, any one color or a plurality of colors of white (W), yellow (Y) or a complementary color of RGB (cyan (C), magenta (M), yellow (Y)) are added, for example.

<Configuration of Signal Line Selector and Drive Circuit>

Figure 7:
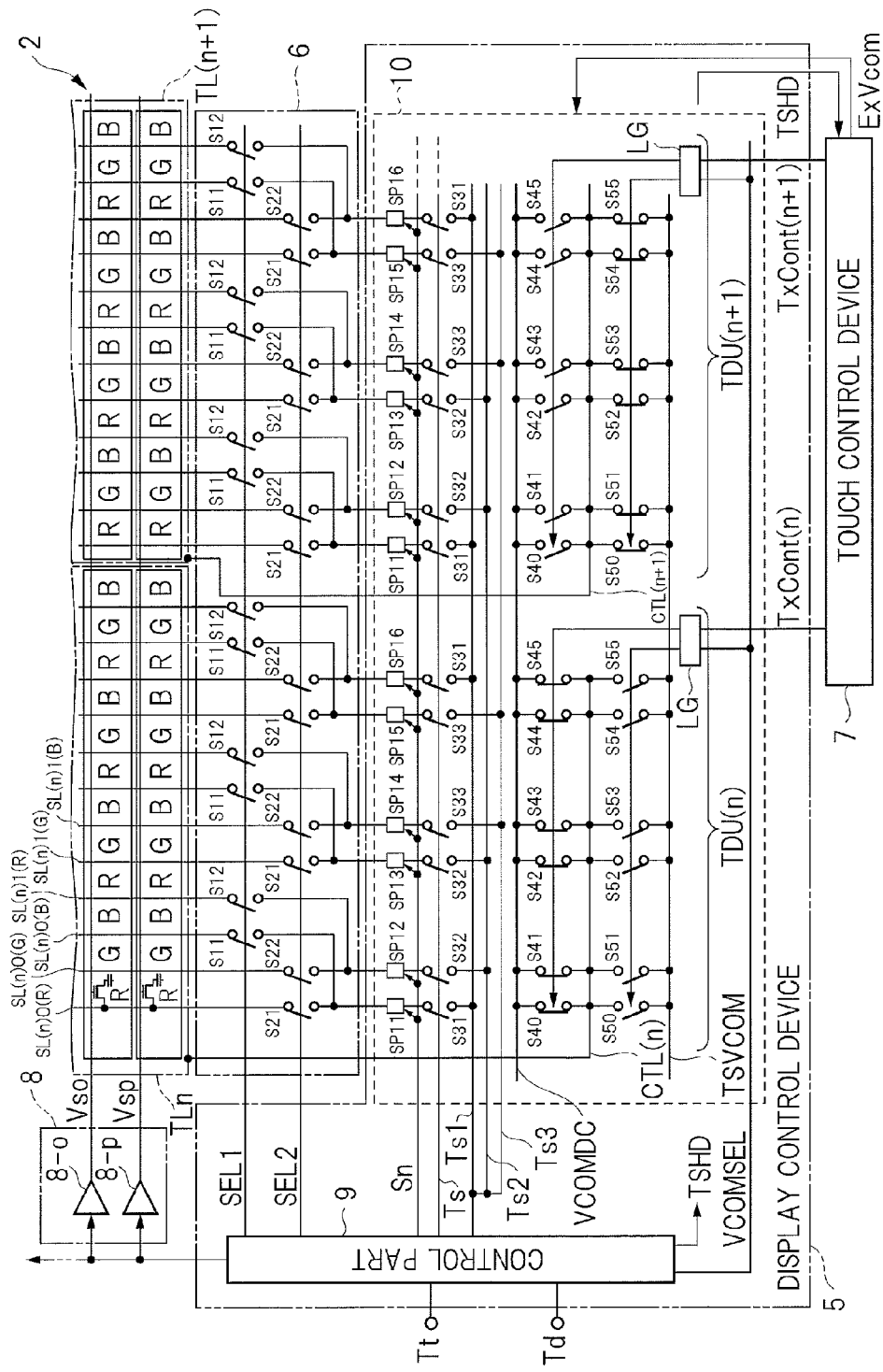
FIG. 7 is a circuit diagram illustrating a configuration of the liquid crystal display device with the touch detection function according to the first embodiment.

FIG. 7 is a circuit diagram illustrating a circuit configuration of the signal line selector 6 and the drive circuit 10 which have been illustrated in FIG. 1. In FIG. 7, a part of the liquid crystal panel 2 is illustrated schematically. In this FIG. 7, arrangements of the liquid crystal panel 2, the signal line selector 6 and the drive circuit 10 are drawn in accordance with an actual arrangement.

In the present first embodiment, when an operation of touch detection is directed by the touch-display synchronizing signal TSHD, the touch control device 7 outputs the drive region specifying signals TxCont(0) to TxCont(p) which select a common electrode specified from a plurality of the common electrodes TL(0) to TL(p), and the common drive signal Exvcom in which the voltage value changes periodically based on the detection region information DI (FIG. 1). That is, by the drive region specifying part 18 illustrated in FIG. 1, based on the detection region information DI, the drive region specifying signal corresponding to a region in which a touch is detected is made to be a high level, and the drive region specifying signal corresponding to a region in which a touch is not detected is made to be a low level. In addition, the driving signal generation part 17 illustrated in FIG. 1 generates the common drive signal ExVcom which changes periodically in response to the timing signal from the detection timing control part 19.

The drive electrode driver 12 (FIG. 1) included in the drive circuit 10 is provided with a plurality of unit drive electrode drivers (unit drive electrode driving part) TDU(0) to TDU(p). Here, the number of the unit drive electrode drivers TDU(0) to TDU(p) corresponds to the number of the common electrodes TL(0) to TL(p), and each output of the unit drive electrode drivers TDU(0) to TDU(p) is electrically connected to the corresponding common electrodes TL(0) to TL(p) via voltage wirings CTL(0) to CTL(p). In FIG. 7, among these unit drive electrode drivers TDU(0) to TDU(p), two unit drive electrode drivers TDU(n) and TDU(n+1) are illustrated. In correspondence with this, also as for the common electrode and the voltage wiring, the common electrodes TL(n) and TL(n+1) and the voltage wirings CTL(n) and CTL(n+1) which correspond to the unit drive electrode drivers TDU(n) and TDU(n+1) are illustrated.

In the first embodiment, one common electrode is arranged with respect to four pixels arranged in a horizontal direction (row direction in the liquid crystal element arrangement LCD) in FIG. 7. Each of "R", "G" and "B" described in FIG. 7 indicates a sub-pixel SPix. Therefore, the common electrode TL(n) corresponds to four sets of "R", "G" and "B" from the left-hand side in FIG. 7, and extends in a longitudinal direction (column direction in the liquid crystal element arrangement) in the same figure. In the same way, the common electrode TL(n+1) corresponds to four sets of "R", "G" and "B" of the right-hand side in FIG. 7, and extends in a longitudinal direction (column direction). These common electrodes TL(n) and TL(n+1) are connected to an output of the unit drive electrode drivers TDU(n) and TDU(n+1) via the voltage wirings CTL(n) and CTL(n+1).

Each of the unit drive electrode drivers TDU(0) to TDU(p) is mutually made to be the same configuration. When the unit drive electrode driver TDU(n) is assumed to be an example, the unit drive electrode driver TDU has switches (first switch) S40 to S45 connected in parallel between a voltage wiring VCOMDC and the voltage wiring CTL(n), switches (second switch) S50 to S55 connected in parallel between a voltage wiring TSVCOM and the voltage wiring CTL(n), and a logic circuit (control circuit) LG. The logic circuit LG receives a touch control signal VCOMSEL which indicates the touch detection period, and the drive region specifying signal TxCont(n) supplied from the touch control device 7, and outputs a switch control signal to turn on/off the switches S40 to S45 and the switches S50 to S55 complementarily.

The drive region specifying signal supplied to the logic circuit LG is different for each of the unit drive electrode drivers TDU(0) to TDU(p). That is, a drive region specifying signal which will be in a high level when the unit drive electrode driver selects a corresponding common electrode is made to be supplied to the logic circuit LG included in the unit drive electrode driver. For example, in FIG. 7, when selecting the common electrode (n+1), the drive region specifying signal TxCont(n+1) will be in a high level. Therefore, this drive region specifying signal TxCont(n+1) is inputted into the logic circuit LG of the unit drive electrode driver TDU(n+1).

The logic circuit LG, when both of the touch control signal VCOMSEL and the drive region specifying signal TxCont which are supplied are in a high level, makes each of the switches S50 to S55 in an ON state, and makes each of the switches S40 to S45 in an OFF state. On the other hand, when any of the touch control signal VCOMSEL and the drive region specifying signal TxCont are in a low level, the logic circuit LG makes each of the switches S40 to S45 in an ON state, and makes each of the switches S50 to S55 in an OFF state.

The signal line driver 11 in the drive circuit 10 has a plurality of sets of terminal groups SP11 to SP16. The terminal groups SP11 to SP16 in each set correspond to a plurality of pixel columns corresponding to one common electrode, that is, a plurality of pixels which are four pieces arranged in a row direction and extended in a column direction. For example, in FIG. 7, the terminal groups SP11 to SP16 in a set indicated in a left-hand side corresponds to a plurality of pixels corresponding to the common electrode TL(n). To the terminal groups SP11 to SP16 in these two or more of sets, image signals Sn are supplied in a time-division manner from the control part 9. Note that, in FIG. 7, although the image signal Sn is indicated as one signal in order to avoid a drawing from becoming complicated, it is to be understood that the image signal Sn are a plurality of signal lines so that a plurality of image signals can be supplied substantially concurrently.

In addition, the terminal groups SP11 to SP16 are connected to a test signal line Ts1, Ts2 and Ts3 via switches S31, S32 and S33 which are controlled in an ON/OFF manner by a test signal Ts outputted from the control part 9 in a case of test. In the case of the test, the switches S31, S32 and S33 are made to be in an ON state by the test signal Ts. In addition, at this time, a low level is supplied to the test signal lines Ts1, Ts2 and Ts3 appropriately from the control part 9. Thereby, in the case of the test, it becomes possible to supply a low level to the signal lines SL(0) to SL(p) of the liquid crystal panel 2 appropriately, and it becomes possible to perform the test.

The signal line selector 6 has a plurality of sets of switches S11 and S22, and switches S12 and S21, which are controlled in an ON/OFF manner by the selection signals SEL1 and SEL2 from the control part 9. The switches S11 and S12 and the switches S21 and S22 are controlled so as to be turned on/off complementarily when an image is displayed on the display panel 2. That is, when the switch S11 and the switch S12 is made to be in an ON state by the selection signal SEL1, the switches S21 and S22 are made to be in an OFF state by the control signal SEL2. To the contrary, when the switches S21 and S22 are made to be in an ON state, the switches S11 and S12 are made to be in an OFF state.

Image signals supplied to the terminals SP11 to SP16 in a time-division manner are supplied to appropriate signal lines by the switches S11 and S12 and the switches S21 and S22. For example, to the terminal SP11 indicated in the leftmost side in the same figure, an image signal which is to be supplied to a sub-pixel SPix(R) in one specific pixel, and an image signal which is to be supplied to a sub-pixel SPix (B) in this one pixel are supplied in a time-division manner. In addition, to the terminal SP12 next to this terminal SP11, an image signal which is to be supplied to a sub-pixel SPix (G) in this one pixel, and an image signal which is to be supplied to a sub-pixel SPix(R) in a pixel next on the right side of this one pixel are supplied in a time-division manner. When the switches S21 and S22 are made to be in an ON state by the selection signal SEL2 and at the same time, the switches S11 and S12 are made to be in an OFF state by the selection signal SEL1, an image signal which has been supplied to the terminal SP11 is supplied to the signal line SL(n)0(R), and at the same time, an image signal which has been supplied to the terminal SP12 is supplied to the signal line SL(n)0(G) via the switch S22. Next, when the switches S11 and S12 are made to be in an ON state by the selection signal SEL1 and at the same time, the switches S21 and S22 are made to be in an OFF state by the selection signal SEL2, an image signal which has been supplied to the terminal SP11 is supplied to the signal line SL(n)0(B), and at the same time, an image signal which has been supplied to the terminal SP12 is supplied to the signal line SL(n)1(R).

Thereby, to signal lines SL(n)0(R), SL(n)0(G) and SL(n)0(B), image signals of three sub-pixels corresponding to 1 pixel will be supplied. In addition, an image signal will be supplied also to signal line SL(n)1(R) next on the right side. As illustrated in FIG. 5, the signal line selector 6 is arranged close to the liquid crystal panel 2. In this way, by an image signal being made to be supplied to the signal line selector 6 from the drive circuit 10 in a time-division manner, it becomes possible that the number of signal wirings is made to be reduced. In other words, it becomes possible that a width of this signal wiring is made to be large, and a delay of an image signal in this signal wiring is made to be reduced.

Figure 8:
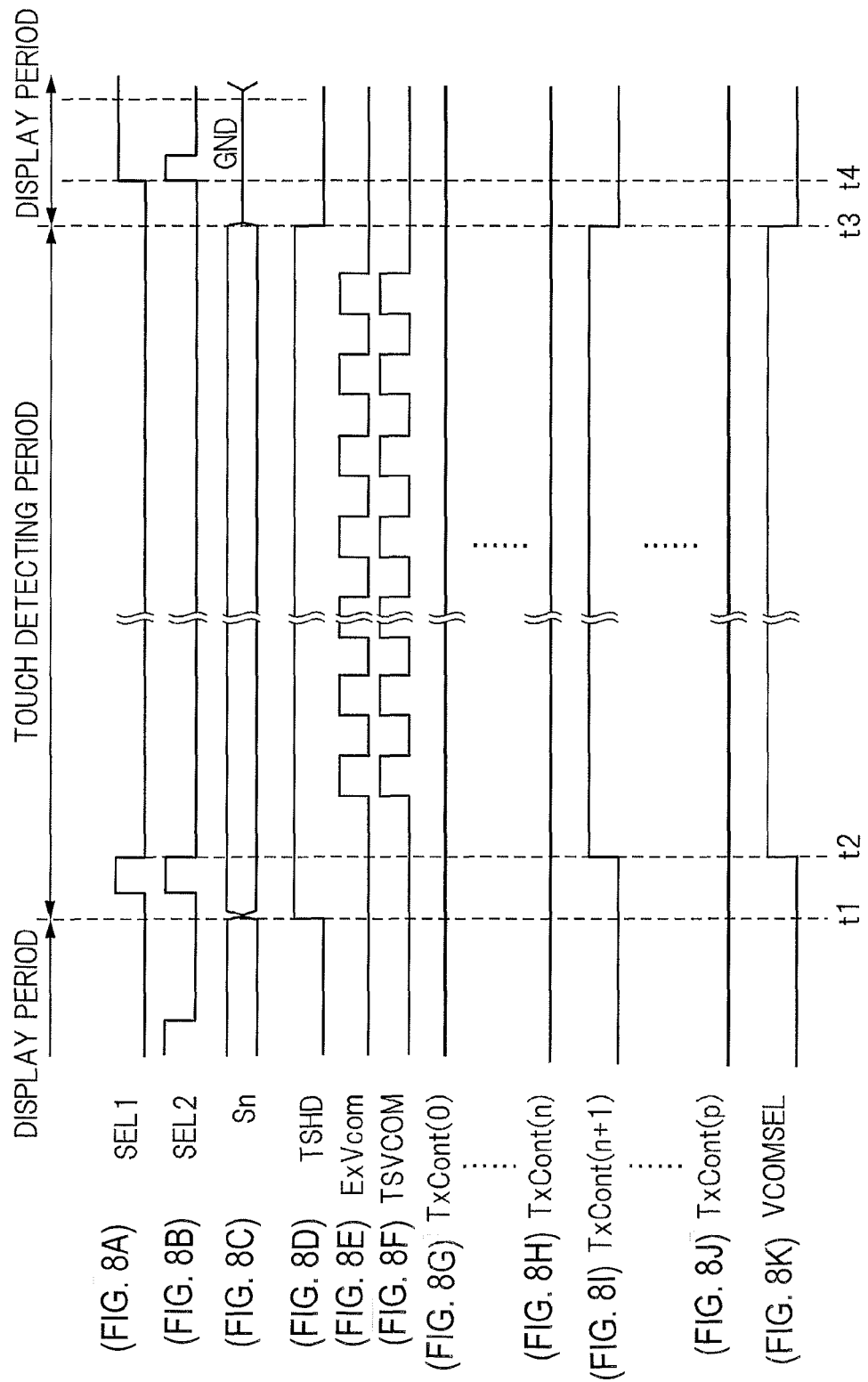
FIGS. 8A to 8K are a waveform chart of the liquid crystal display device with the touch detection function according to the first embodiment.

Note that, in FIGS. 7, 8-0 and 8-p denote examples of a plurality of unit gate drivers constituting the gate driver 8. The unit gate drivers 8-0 and 8-p receive a timing signal from the control part 9, and generate scanning signals Vso and Vsp, and supply them to scanning lines GLo and GLp. In addition, in FIG. 7, the thin film transistor Tr and the liquid crystal element LC which have been illustrated in FIG. 6 are indicated in the sub-pixel SPix (R) in the left-hand side.

<Touch Detection Operation>

FIGS. 8A to 8K are a timing chart illustrating an operation of the liquid crystal display device 1 with the touch detection function according to the first embodiment. Hereinafter, using FIGS. 1, 7 and 8 mainly, an operation of this liquid crystal display device 1 with the touch detection function will be described.

The liquid crystal display device 1 with the touch detection function operates separately in two periods. That is, the liquid crystal display device 1 with the touch detection function operates separately in a display period in which an image is displayed on the liquid crystal panel 2, and in a touch detection period in which a touch is detected. The touch-display synchronizing signal TSHD indicating whether a display period or a touch detection period is generated by the control part 9.

The liquid crystal display device 1 with the touch detection function, as illustrated in FIG. 8D, operates as a display period when the touch-display synchronizing signal TSHD is in a low level, and operates as a touch detection period when in a high level.

In a display period before time t1, the control part 9, while generating the selection signals SEL1 and SEL2 which will be in a high level alternately, supplies the image signal Sn to the signal line driver 11. In addition, at this time, the control part 9 supplies a timing signal to the gate driver 8. Thereby, the scanning signal Vsp which changes to a high level is supplied to the scanning line GLp from a prescribed unit gate driver (for example, 8-p) among a plurality of unit gate drivers which constitute the gate driver 8. Thereby, the thin film transistor Tr in a plurality of the sub-pixels SPix connected to the scanning line GLp will be in an ON state. At this time, from each of terminals SP11 to SP16 of the signal line driver 11, an image signal is outputted in a time-division manner, and the signal line selector 6 has supplied the image signal in time division to an appropriate signal line by the selection signals SEL1 and SEL2. Therefore, the image signal which has been supplied to the signal line is impressed to the liquid crystal element LC via the thin film transistor Tr in a plurality of sub-pixels SPix connected to the scanning line GLp, and displaying is performed. In this way, by carrying out supplying of the image signal Sn, selection by the selection signals SEL1 and SEL2, and successive supplying of the scanning signal in a high level to the scanning lines GL0 to GLp, an image in accordance with the image signal Sn is displayed on the liquid crystal panel 2.

At time t1, the control part 9 makes the touch-display synchronizing signal TSHD changed from a low level to a high level. Thereby, a touch detection operation is started.

The detection timing control part 19 of the touch control device 7 makes the drive region specifying part 18 and the driving signal generation part 17 operated by the touch-display synchronizing signal TSHD being in a high level. The drive region specifying part 18 generates the drive region specifying signals TxCont(0) to TxCont(p) which specify a common electrode by which a touch is detected based on the detection region information DI which has been supplied to the terminal Tc. In an example illustrated in FIG. 8, illustrated is a case where the detection region information has specified the common electrode TL(n+1) among the common electrodes TL(0) to TL(p) as the common electrode by which a touch is detected. Therefore, the drive region specifying part makes the drive region specifying signal TxCont(n+1) corresponding to this common electrode TL(n+1) changed to a high level, and maintains the remaining drive region specifying signals TxCont(0) to TxCont(n) and TxCont(n+2) to TxCont(p) in a state of a low level (FIG. 8G to 8J). On the other hand, the driving signal generation part 17 generates the common drive signal ExVcom which will be in a high level periodically as illustrated in FIG. 8E by starting an operation.

The control part 9, next, at time t2, makes the touch control signal VCOMSEL changed from a low level to a high level. By the touch control signal VCOMSEL being in a high level, the unit drive electrode driver TDU(n+1) to which the drive region specifying signal TxCont(n+1) in a high level has been supplied among a plurality of the unit drive electrode drivers constituting the drive electrode driver 12 performs an operation. That is, switches S50 to S55 in the unit drive electrode driver TDU(n+1) will be in an ON state, and switches S50 to S55 in the remaining unit drive electrode driver will be in an OFF state. Note that, at this time, switches S40 to S45 in the unit drive electrode driver TDU(n+1) will be in an OFF state, and switches S40 to S45 in the remaining unit drive electrode driver will be in an ON state.

In the present first embodiment, the common drive signal ExVcom generated in the driving signal generation part 17 has been supplied the voltage wiring TSVCOM of the drive circuit 10. Therefore, a voltage of the voltage wiring TSVCOM changes as illustrated in FIG. 8F in synchronization with the common drive signal ExVcom. In addition, a ground voltage is supplied to the voltage wiring VCOMDC of the drive circuit 10.

Therefore, from the unit drive electrode driver TDU(n+1) which has been made to be in an operational state by the drive region specifying signal TxCont(n+1), a voltage which changes periodically in the voltage wiring TSVCOM will be supplied via switches S50 to S55 and the voltage wiring CTL(n+1). That is, the common drive signal ExVcom is outputted from the unit drive electrode driver TDU(n+1) as the drive signal Tx(n+1). On the other hand, since switches S41 to S46 are in a ON state in the remaining unit drive electrode drivers, a ground voltage in the voltage wiring VCOMDC is supplied to the corresponding common electrodes TL(0) to TL(n), and TL(n+2) to TL(p) via these switches and the voltage wiring CTL.

The common drive signal ExVcom in which a voltage changes periodically is supplied as the drive signal Tx(n+1) via the voltage wiring TSVCOM to the common electrode TL(n+1), and thereby, a charge amount difference in accordance with whether the intersection position has been touched is generated in the detection electrodes RL(0) to RL(p) which intersect with this drive electrode TL(n+1), and is supplied to the touch detection signal amplifying part 13 of the touch control device 7 as the detection signals Rx(0) to Rx(p). The detection signal amplified by the touch detection signal amplifying part 13 is outputted as the coordinate information of the touched position as described in FIG. 1.

Note that, at time t3, the control part 9 makes the touch-display synchronizing signal TSHD and the touch control signal VCOMSEL changed to a low level. Thereby, after time t3, a display operation is carried out. At time t3, the control part 9 makes the image signal Sn into a ground voltage GND, and at time t4, makes each of the selection signals SEL1 and SEL2 changed to a high level. Thereby, each of the signal lines SL(0) to SL(p) is reset to a ground voltage, and operation is carried out henceforth so that an image in accordance with the image signal Sn may be displayed.

In this way, by supplying the common drive signal ExVcom only to the specified (identified) common electrode, it becomes possible to perform touch detection with respect to only a position intersecting with any of the common electrode. In addition, the common electrodes TL(0) to TL(p) extend in the same direction as the signal lines SL(0)0(R) to SL(p)3(B) to which an image signal is supplied. That is, in the liquid crystal element arrangement LCD, the common electrodes are also extended along columns in which signal lines are arranged. Therefore, the drive electrode driver 12 which drives the common electrodes TL(0) to TL(p) can be arranged in one side along a row of the liquid crystal element arrangement LCD in the same way as the signal line driver 11 to drive the signal lines SL(0)0(R) to SL(p)3(B). In other words, in FIG. 5, it is not necessary to provide the drive electrode driver 12 which drives the drive electrodes TL(0) to TL(p) between a horizontal side surface of the liquid crystal panel 2 and a horizontal side surface of the module. Therefore, it becomes possible to make short a distance between a horizontal side surface of the liquid crystal panel 2 and a horizontal side surface of the module.

Figure 20:
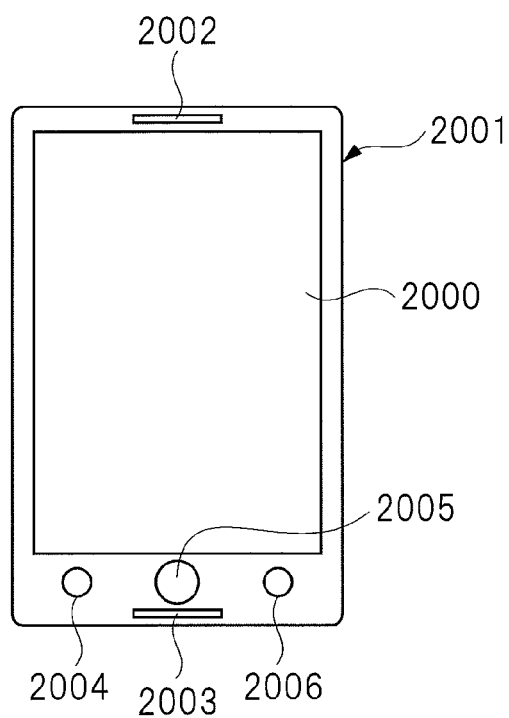
FIG. 20 is an appearance diagram illustrating a configuration of a mobile phone.

The module is mounted in a mobile phone (so-called smart phone) as illustrated in FIG. 20, for example. In this case, the module is mounted in a part of a display 2000 so that the liquid crystal panel 2 may appear. By making short a distance between a horizontal side surface of the liquid crystal panel 2 and a horizontal side surface of the module, it becomes possible to make narrow a frame area around the display 2000 of a casing 2001 of the smart phone. Alternatively, when a size of the casing 2001 is made to be the same, it becomes possible to achieve enlarging of the display 2000. Note that, in FIG. 20, 2002 denotes an ear piece, and 2003 denotes a mouth piece, and 2004 to 2006 denote manual operation buttons. As a matter of course, a configuration of the smart phone illustrated in FIG. 20 is an example, and the configuration is not limited to this.

In addition, in the first embodiment, the drive region specifying signals Txvcom(0) to TxVcom(p) outputted from the touch control device 7 are signals to determine whether to supply the common drive signal ExVcom which has been supplied to the voltage wiring TSVCOM to the common electrodes TL(0) to TL(p) as the drive signals Tx(0) to Tx(p), and are not signals to charge or discharge the common electrodes TL(0) to TL(p). Therefore, even when a driving ability of the drive region specifying signals TxCont(0) to TxCont(p) is low, it becomes possible to charge or discharge a specified common electrode. Thereby, it becomes possible to achieve a miniaturization or power-saving of the drive electrode driver 12. Note that, in the first embodiment, although the wiring TSVOM to which the common drive signal ExVcom is supplied is referred to as the voltage wiring, it can be regarded that the wiring TSVCOM is a signal wiring when seen from a viewpoint that a signal is supplied.

The common electrodes TL(0) to TL(p) do not intersect with the signal lines SL(0)0(R) to SL(p)3(B), and extend in the same direction (column direction). When one common electrode and a plurality of the signal lines intersect with each other, a parasitic capacitance will be generated between the common electrode and a plurality of signal lines in this common electrode, and it is possible that a delay arises when a voltage of the common electrode is made to be changed in accordance with a drive signal. According to the first embodiment, a common electrode is arranged in parallel without intersecting with a signal line. In this case, as illustrated in FIG. 3A for example, when seen by a plane view, although a parasitic capacitance is generated between signal lines and common electrodes which are arranged in parallel, it is possible to make the value small as compared with a parasitic capacitance generated when intersecting with a plurality of signal lines. As the result, it is possible to reduce a delay of a voltage change of the common electrode.

In addition, as illustrated in FIGS. 8A and 8B, the selection signal SEL1 and SEL2 are made into a low level in the touch detection period. Thereby, since switches S11, S12, S21 and S22 in the signal line selector 6 are made to be in an OFF state in the touch detection period, each of the signal lines SL(0)0(R) to SL(p)3(B) is made to be in a floating state. Thereby, it becomes possible to reduce a delay of a voltage change of the common electrode.

In FIG. 1, although the detection region information DI has been made to be supplied to the drive region specifying part 18 via the terminal Tc, it is not limited to this. For example, the terminal Tc is not provided, and a pre-determined common electrode may be made to be specified by the drive region specifying part 18.

In addition, in FIG. 8, although an example in which the common drive signal ExVcom is supplied to one common electrode as a drive signal is illustrated, it is not limited to this. For example, a plurality of common electrodes which are close to each other may be made to be specified by the drive region specifying part 18. In such a case as this, from each of the unit drive electrode drivers TDU(n) and TDU (n+1) which have been illustrated in FIG. 7, the common drive signal ExVcom will be supplied to the common electrodes TL(n) and TL(n+1). This is referred to as so-called batch driving. In this case, since a plurality of common electrodes are driven substantially concurrently, it becomes possible to enlarge an electric field amount generated by the common electrodes, and it becomes possible to make an accuracy of touch detection high.

In addition, the drive region specifying part 18, after outputting the drive region specifying signal which specifies a common electrode, may be made to output the drive region specifying signal which specifies a common electrode adjacent to the common electrode. For the purpose of this, a counter is provided in the drive region specifying part 18, for example, and a drive region specifying signal based on the detection region information DI is made to be set in the counter, and the drive region specifying signal may be generated one by one by counting up or counting down the counter one by one. In such a way as this, it becomes possible to supply the common drive signal ExVcom to an adjacent common electrode after the common drive signal ExVcom has been supplied to a common electrode arranged in a specific position. That is, it becomes possible to supply the common drive signal ExVcom partially from an optional common electrode to an optional common electrode, and it becomes possible to scan and detect a touch in any region.

Second Embodiment

<Entire Configuration of Module>

Figure 9:
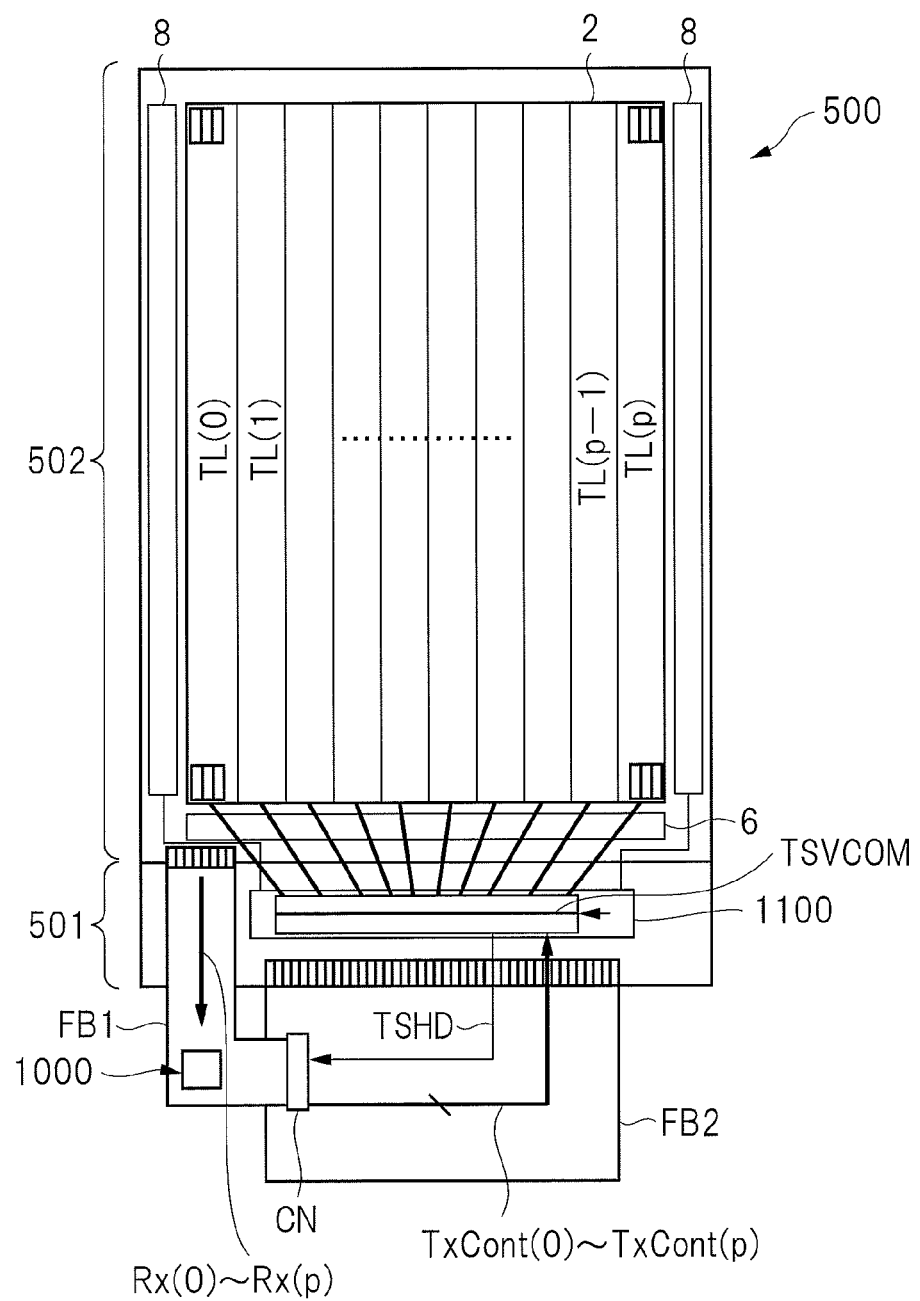
FIG. 9 illustrates a plan view of the module in which the liquid crystal display device with the touch detection function according to the first embodiment has been implemented.

FIG. 9 illustrates a configuration of a module to which applied is the liquid crystal display device 1 with the touch detection function according to a second embodiment. Since FIG. 9 is similar to a configuration of the module illustrated in FIG. 5, only a point of difference will be mainly described, here.

In the module illustrated in FIG. 5, the common drive signal ExVcom has been supplied from the touch control device 7 to the display control device 5. In contrast with this, in a module according to the second embodiment, a voltage generation circuit which generates a voltage corresponding to a high level of the common drive signal ExVcom is provided in the module. This voltage generation circuit, may be built-in in the display control device 5, and may be made to be implemented in the module while prepared separately from the display control device 5 and the touch control device 7. In the second embodiment, the drive region specifying signals TxCont(0) to TxCont(p) supplied to a specified common electrode, the voltage changes periodically, and a voltage generated by the voltage generation circuit is supplied in synchronization with this periodical voltage change to the specified common electrode. That is, a period of the drive signal supplied to the specified common electrode is determined by the drive region specifying signal. Also a configuration of the touch control device and the display control device which are implemented in the module is different from the first embodiment. A configuration of a touch control device 1000 and a display control device 1100 which are used in the second embodiment will be described later.

<Configuration of Touch Control Device>

Figure 10:
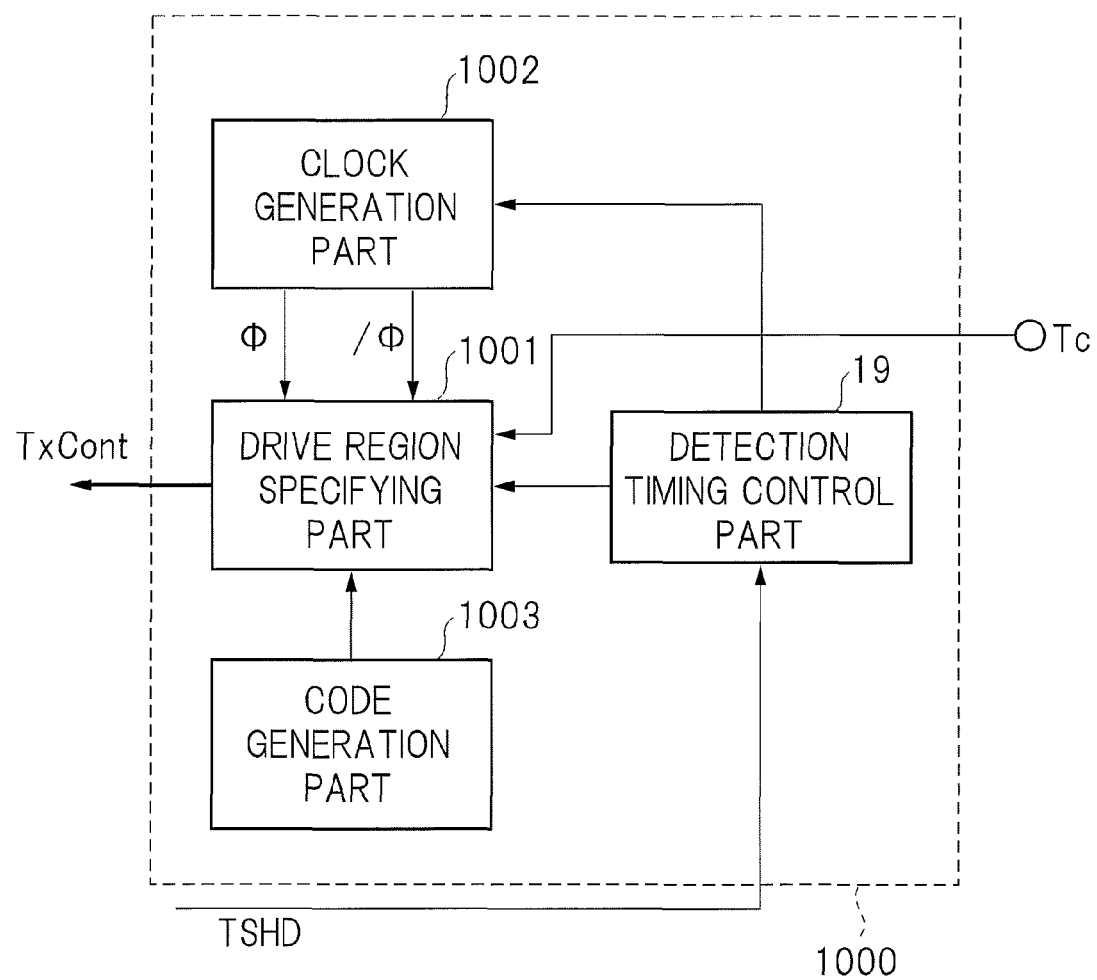
FIG. 10 is a block diagram illustrating a configuration of a touch control device according to a second embodiment.

FIG. 10 is a block diagram illustrating a configuration of the touch control device 1000 used in the second embodiment. In FIG. 10, only a different part from the touch control device 7 described in FIG. 1 is mainly illustrated. Although the touch control device 1000 has a detection signal processing part similar to the detection signal processing part TS described in FIG. 1, it has been omitted in FIG. 10 because the configuration is the same as the detection signal processing part TS described in FIG. 1, The touch control device 1000 does not have the driving signal generation part 17 and the drive region specifying part 18 which have been described in FIG. 1, and in place of them, is provided with a drive region specifying part 1001, a clock generation part 1002 and a code generation part 1003. In FIG. 10, for a convenience of description, the detection timing control part 19 which generates a control signal based on the touch-display synchronizing signal TSHD is also illustrated.

The clock generation part 1002, based on a control signal from the detection timing control part 19, generates clock signals φ and /φ corresponding to the common drive signal ExVcom described in the first embodiment. The clock signals φ and /φ is a clock signal in which the voltage changes periodically in the same way as the common drive signal ExVcom. However, since the clock signals φ and /φ are not clock signals supplied to the common electrodes TL(0) to TL(p) as a drive signal in a case of detecting a touch, a driving ability of the clock generation part 1002 may be low. In addition, the clock signal /φ indicates that it is a clock signal in which a phase is inverted against the clock signal φ.

The code generation part 1003, although described using FIGS. 12 and 14 later, generates a code for coding a drive signal supplied to the selected common electrode. For example, a code pattern for coding is stored in advance in this code generation part 1003.

The drive region specifying part 1001 receives the clock signals φ and /φ generated by the clock generation part 1002, the detection region information DI from the terminal Tc, the control signal from the detection timing control part 19 and the code pattern from the code generation part 1003, and outputs the drive region specifying signals TxCom(0) to TxCom(p) in the touch detection period in the same way as the drive region specifying part 18 (FIG. 1). In this case, the drive region specifying part 1001 supplies as the drive region specifying signal the clock signal φ or the clock signal /φ which has been supplied from the clock generation part 1002 to a common electrode specified by the detection region information DI. On the other hand, to a common electrode which is not specified by the detection region information DI, the drive region specifying part 1001 supplies as the drive region specifying signal a voltage in a low level in the same way as the drive region specifying part 18. That is, a drive region specifying signal corresponding to a specified common electrode changes in the voltage value in synchronization with the clock signal φ or a clock signal /φ during the touch detection period. On the other hand, a drive region specifying signal corresponding to a common electrode which is not specified will be in a low level during the touch detection period.

It is determined by the code pattern supplied from the code generation part 1003 whether to supply the clock signal φ or the clock signal /φ as a drive region specifying signal corresponding to the specified drive region.

In the present second embodiment, a plurality of common electrodes are specified substantially concurrently from the common electrodes TL(0) to TL(p) formed in the liquid crystal panel 2 by the detection region information DI, and a voltage synchronized with the clock signal φ or /φ is supplied to each of a plurality of the specified common electrodes.

<Configuration of Display Control Device>

Figure 11:
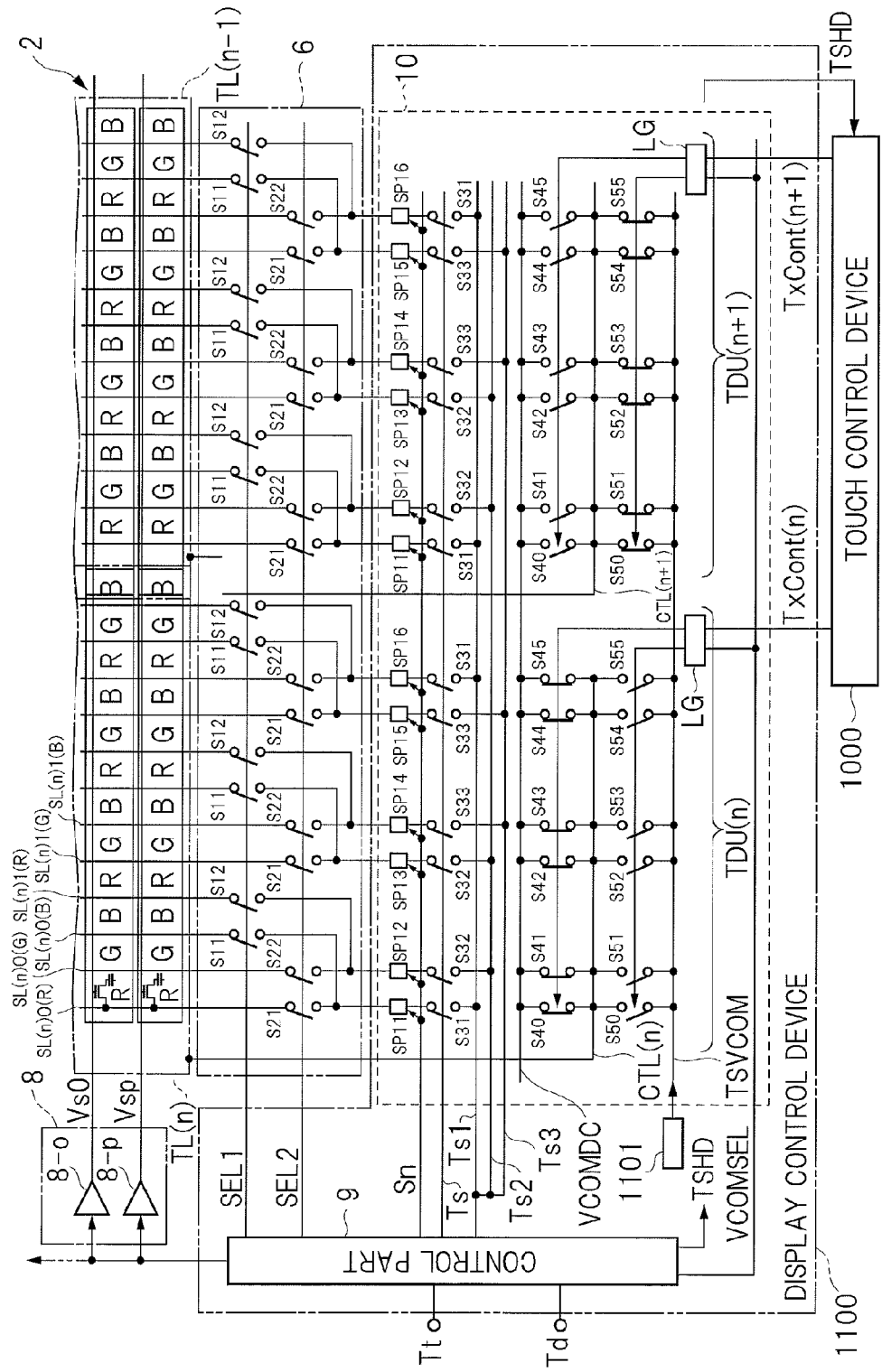
FIG. 11 is a circuit diagram illustrating a configuration of a liquid crystal display device with a touch detection function according to the second embodiment.

FIG. 11 is a circuit diagram illustrating a configuration of a display control device 1 according to the second embodiment. In FIG. 11, in the same way as FIG. 7 described in the first embodiment, a configuration of the signal line selector 6 and the drive circuit 10 is mainly illustrated. Since the configuration illustrated in FIG. 11 is similar to FIG. 7 described in the first embodiment, only a point of difference is mainly described, here. As a matter of course, in the same way as FIG. 7, arrangements of the liquid crystal panel 2, the signal line selector 6 and the drive circuit 10 are drawn in accordance with an actual arrangement.

In FIG. 11, the display control device 1100 is provided with a voltage generation circuit 1101 which generates a voltage corresponding to a high level of the common drive signal ExVcom described in the first embodiment. The voltage generation circuit 1101 supplies a generated voltage to the voltage wiring TSVCOM provided in the drive circuit 10. In FIG. 11, although the voltage generation circuit 1101 is provided in the display control device 1100, the voltage generation circuit 1101 may be mounted in the module separately from the display control device 1100 and the touch control device 1000 as already described.

To each of the unit drive electrode drivers TUD(0) to TUD(p) in the drive electrode driver 12, the corresponding drive region specifying signals TxCont(0) to TxCont(p) are supplied from the touch control device 1000.

The drive region specifying part 1001 (FIG. 10) in the touch control device 1000, as already described, in the touch detection period, makes a drive region specifying signal corresponding to a common electrode which is not specified in a low level among the drive region specifying signals TxCont(0) to TxCont(p), and makes a drive region specifying signal corresponding to a common electrode to be specified a signal synchronized with the clock signal φ or the clock signal /φ. Thereby, to a common electrode which is not specified among the common electrodes TL(0) to TL(n), a drive region specifying signal in a low level is supplied during the touch detection period to the logic circuit LG in the unit drive electrode driver corresponding to the common electrode. Thereby, switches S40 to S45 in the unit drive electrode driver are made to be in ON state during the touch detection period. As the result, during the touch detection period, a ground voltage fed to the voltage wiring VCOMDC will be supplied to a common electrode which is not specified.

In contrast with this, a drive region specifying signal corresponding to a specified common electrode changes in the voltage value in synchronization with the clock signal φ or the clock signal /φ during the touch detection period. Thereby, the logic circuit LG in the unit drive electrode driver to which this drive region specifying signal is supplied makes the switches S40 to S45 and the switches S50 to S55 in the unit drive electrode driver turned on and off alternately in synchronization with the clock signal φ or /φ. As the result, to a specified common electrode, a voltage in a high level in the voltage wiring TSVCOM and a voltage in a low level which has been supplied to the voltage wiring VCOMDC will be supplied as a drive signal during the touch detection period from the drive electrode driver 12.

In the present second embodiment, a high level voltage and a low level voltage for charging or discharging the common electrodes TL(0) to TL(p) included in the liquid crystal panel 2 are not supplied from the touch control device 1000, and as for a voltage in a high level, a voltage generated by the voltage generation circuit 1101 is used, and as for a voltage in a low level, a voltage in the display control device 1100 will be used. Therefore, even if a driving ability of a signal outputted from the touch control device 1000 is low, it becomes possible to charge or discharge the common electrodes TL(0) to TL(p) while a time delay is suppressed from becoming long. In particular, in the second embodiment, a plurality of common electrodes are driven substantially concurrently. Also in this case, a driving ability of each of the drive region specifying signals TxCont(0) to TxCont(p) may be low.

<Principle of Coding>

Next, with respect to drive signal encoding by a code outputted from the code generation part 1003, the principle will be described.

FIGS. 12A to 12C illustrate an explanatory view for describing a principle of CDM (CODE Division Multiplexing) driving applied to the second embodiment. In the CDM driving, a plurality of drive signals are supplied substantially concurrently to a plurality of common electrodes.

In FIG. 12A, illustrated are common electrodes TL(n) to TL(n+3) which extend in a longitudinal direction and are arranged in parallel in a horizontal direction, and detection electrodes RL(0) to RL(3) which extend in a horizontal direction and are arranged in parallel in a longitudinal direction so as to intersect with these common electrodes TL(n) to TL(n+3). Since viewed in a plane view, the detection electrodes RL(0) to RL(3) and the common electrode TL(n) to TL(n+3) are seen to overlap each other, however, an interval between the common electrodes TL(n) to TL(n+3) and the detection electrodes RL(0) to RL(3) is spaced and electrically separated. In addition, in the same figure, FG denotes a finger, and in this example, a state where the finger FG has touched the vicinity of an intersection between the common electrode TL(n+1) and the detection electrode RL(0) is illustrated. The drive signals Tx(n) to Tx(n+3) are supplied substantially concurrently to the common electrodes TL(n) to TL(n+3), and the detection signals Rx(0) to Rx(3) are outputted substantially concurrently from the detection electrodes RL(0) to RL(3).

In FIG. 12B, a code used at the time of coding the drive signals Tx(n) to Tx(n+3) is illustrated by a matrix (1). The matrix (1) is a matrix of 4 rows R1 to R4×4 columns C1 to C4, and the drive signals Tx(n) to Tx(n+3) are modulated in accordance with this matrix (1). In the modulation, each of rows R1 to R4 in the matrix (1) corresponds to each of the drive signals Tx(n) to Tx(n+3), and indicates a coefficient with which a drive signal is made to be modulated. A coefficient with which a drive signal is made to be modulated is changed in a column direction of C1 to C4 in the same figure along passage of time. That is, in the matrix (1), numerical values (−1, 1, 1, 1) in the row R1 of the first row are a coefficient of the corresponding drive signal Tx(n), and the coefficient given to the drive signal Tx(n) change in order of 1 (column C1), 1 (column C2), 1 (column C3) and 1 (column C4) along passage of time. In the same way, numerical values in the row R2 of the matrix (1) are a coefficient of the drive signal Tx(n+1), and a value of the coefficient changes in the direction from the column C1 to the column C4 along passage of time, and numerical values of the row R3 are a coefficient of the drive signal Tx(n+2), and changes in order in the direction from the column C1 to the column C4, and numerical values of the row R4 are a coefficient of the drive signal Tx(n+3), and changes in order in the direction of the column C1 to the column C4. At the time of coding, that is, at the time of modulating, a direction of a voltage change in each of drive signals Tx(n) to Tx(n+3) is changed in accordance with the coefficients in the matrix (1).

In FIG. 12C, a voltage change of the drive signals Tx(n) to Tx(n+3) modulated in accordance with the matrix (1) is illustrated. In addition, in the lower side of FIG. 12C, a voltage change of the detection signal Rx(0) in the detection electrode RL(0) is illustrated. In FIG. 12C, the horizontal axis indicates time. At a time t11, in accordance with coefficients (−1, 1, 1, 1), a direction of a voltage change of the corresponding drive signals Tx(n) to Tx(n+3) is determined. In the same way hereinafter, at a time t12, a direction of a voltage change of the drive signals Tx(n) to Tx(n+3) is determined in accordance with coefficients (1, −1, 1, 1) in the column C2, and at a time t13, a direction of a voltage change of the drive signals Tx(n) to Tx(n+3) is determined in accordance with coefficients (1, 1, −1, 1) in the column C3, and at a time t14, a direction of a voltage change of the drive signals Tx(n) to Tx(n+3) is determined in accordance with coefficients (1, 1, 1, −1) in the column C4. Here, a direction of a voltage change is assumed to be a voltage waveform rising up when a coefficient is 1, and is assumed to be a voltage waveform falling down when a coefficient is −1.

As described previously in FIG. 2, when a finger FG touches the vicinity of an intersection between a common electrode and a detection electrode, a charge amount between the common electrode and the detection electrode decreases when a drive signal is supplied to the common electrode. Here, for a convenience of description, by a finger FG having touched, a charge amount is assumed to decrease, and a detection voltage is assumed to decrease by 0.2 V. In addition, when a voltage change of a drive signal rises up, a detection signal of 1 V is assumed to be generated in a detection electrode, and when a voltage change of a drive signal falls down, a detection voltage of −1 V is assumed to be generated in a detection electrode. As a matter of course, since a charge amount decreases when a finger FG has touched, a voltage of a detection electrode in a case where a drive signal rises up is assumed to be 0.8 V (1−0.2V and a voltage of a detection electrode in a case where a drive signal falls down is assumed to be −0.8 V (−1+0.2 V).

At a time t11, as illustrated in FIG. 12C, the drive signal Tx(n) having a voltage change falling down is supplied to the common electrode TL(n), and to each of the common electrode TL(n+1) to TL (n+3), the drive signals Tx(n+1) to Tx(n+3) having a voltage change rising up are supplied. In this case, since the vicinity of each intersection between the detection electrode RL(0) and the common electrodes TL(n), TL(n+2) and TL(n+3) has not been touched, a voltage value of the detection electrode RL(0) in a part which intersects with the common electrode TL(n) will be −1 V, and a voltage value of the detection electrode RL(0) in a part which intersects with each of the common electrodes TL(n+2) and TL(n+3) will be 1 V. In contrast with this, since the vicinity of an intersection between the detection electrode RL(0) and the common electrode TL(n+1) has been touched, a voltage value of the detection electrode RL(0) in a part which intersects with the common electrode TL(n+1) will be 0.8 V. Therefore, the detection signal Rx(0):t11 generated in the detection electrode RL(0) at the time t11 will be a sum total voltage value of these, and will be 1.8 V.

In the same way hereinafter, at a time t12, the drive signals Tx(n) to Tx(n+3) in accordance with coefficients indicated in the column C2 of the matrix (1) are supplied to the common electrodes TL(n) to TL(n+3), and at a time t13, the drive signals Tx(n) to Tx(n+3) in accordance with coefficients indicated in the column C3 of the matrix (1) are supplied to the common electrodes TL(n) to TL(n+3), and at a time t14, the drive signals Tx(n) to Tx(n+3) in accordance with coefficients indicated in the column C4 of the matrix (1) are supplied to the common electrodes TL(n) to TL(n+3). Thereby, a voltage in each intersection part between the detection electrode RL(0) and the common electrodes TL(n) to TL(n+3), in FIG. 12C, changes like a shape at the time t12 to t13. As the result, a sum total voltage value of voltages of the detection signal Rx(0) generated in the detection electrode RL(0) changes like Rx(0):t12 to Rx(0):t14. That is, a sum total voltage value changes as 2.2 V, 1.8 V and 1.8 V.

Sum total voltage values of the detection signal Rx(0) generated in this way in the detection electrode RL(0) Rx(0):t11 to Rx(0):t14 are made to be expressed as an array (2) of 4 rows 1 column (FIG. 12B). By carrying out a matrix operation between this matrix (2) and the matrix (1), a matrix (3) is acquired (FIG. 12B). In the matrix (3), a value of the row R2 corresponding to the common electrode TL(n+1) has become low as compared with a value of other rows R1, R3 and R4 (corresponding to the common electrodes TL(n), TL(n+2) and TL(n+3)). Thereby, it is detected that the vicinity of the intersection part between the common electrode TL(n+1) and the detection electrode RL(0) has been touched. That is, when a sum total voltage has become low, the common electrode (TL(n+1)) corresponding to a drive signal in which the coefficient has become −1 (in this example, drive signal Tx(n+1)) is a common electrode which has been touched, and a detection electrode in which a sum total voltage has become low is detected as the detection electrode (in this example, detection electrode RL(0)) which has been touched.

In addition, in the matrix (3), a value of a row R2 is 3.2 V, and each value of other rows R1, R3 and R4 is 4.0 V. Although it is assumed that the value decreases by 0.2 V depending on whether a touch has been carried out, a voltage difference of 0.8 V which corresponds to the 4 times can be acquired. Therefore, even if a voltage of a drive signal supplied to a common electrode is not made to be high, it becomes possible to make large a voltage difference generated depending on whether a touch has been carried out, and it becomes possible to enhance detection accuracy.

Although descriptions are made with the electrode RL(0) as an example, also with respect to each of other detection electrodes RL(1) to RL(3), each sum total voltage value at the time t11 to t14 is calculated in the same way as the detection electrode RL(0). That is, when the drive signals Tx(n) to Tx(n+3) in accordance with coefficients indicated in the matrix (1) are supplied to the common electrodes TL(n) to TL(n+3) one by one at the time t11 to t14, the detection signals Rx(1) to Rx(3) having a sum total voltage value are generated also in each of the detection electrodes RL(1) to RL(3). With respect to each of the detection electrodes RL(1) to RL(3), a sum total voltage value at the time t11 to t14 is expressed by the matrix (2), and a matrix operation is performed between the matrix (2) and the matrix (1). Thereby, in the same way as the case of the above-mentioned detection electrode RL(0), it becomes possible to detect whether intersection parts between the detection electrodes RL(1) to RL(3) and the common electrodes TL(n) to TL(n+3) have been touched. In this case, since the detection electrodes RL(1) to RL(3) have not been touched, a voltage value calculated by a matrix operation will be 4.0 V. From this voltage value (4.0 V), it is determined that the detection electrodes RL(1) to RL(3) have not been touched.

<Touch Detection Operation>

The code generation part 1003 illustrated in FIG. 10 stores information corresponding to the matrix (1) illustrated in FIG. 12. The drive region specifying part 1001, when outputting a drive region specifying signal corresponding to the common electrode which has been specified by the detection region information DI, outputs the clock signal $\varphi$ or the clock signal $/\varphi$ of an inverted phase as a drive region specifying signal in accordance with coefficients described in FIG. 12. That is, when the coefficient is 1 as described in FIG. 12, the clock signal $\varphi$ is outputted as a drive region specifying signal, for example, and when the coefficient is −1, the clock signal $/\varphi$ of an inverted phase is outputted as a drive region specifying signal.

FIGS. 13A to 13L are a timing chart illustrating an operation of the liquid crystal display device 1 with the touch detection function according to the second embodiment. Since FIGS. 13A to 13D are the same as those of FIG. 8, descriptions of these will be omitted. In addition, since FIG. 13L is the same as FIG. 8K, the description will be omitted. In addition, since an operation in a display period in the first embodiment is the same as that of the second embodiment, the description will be omitted, here.

FIG. 13E illustrates a voltage TPH generated by the voltage generation circuit 1101. This voltage TPH has a voltage corresponding to a high level of the common drive signal ExVcom described in the first embodiment, and is supplied to the voltage wiring TSVCOM in the display period and the touch detection period. FIGS. 13F to 13K illustrate a voltage waveform of the drive region specifying signals TxCont(0) to TxCont(p) outputted by the touch control device 1000. That is, illustrated are the voltage waveforms of the drive region specifying signals Txcont(0) and TxCont(p) formed by the drive region specifying part 1001 illustrated in FIG. 10.

In FIG. 13, the common electrode TL(n) corresponding to the drive region specifying signal TxCont(n) to the common electrode TL(n+3) corresponding to the drive region specifying signal TxCont(n+3) have been specified as a region of an object of a touch detection. On the other hand, the common electrode TL(0) corresponding to the drive region specifying signal TxCont(0) to the common electrode TL(n−1) corresponding to the drive region specifying signal TxCont(n−1), and the common electrode TL(n+4) corresponding to the drive region specifying signal TxCont(n+4) to the common electrode TL(p) corresponding to the drive region specifying signal TxCont(p) are made to be a region outside of touch detection. In this case, as for the drive region specifying signals TxCont(n) to TxCont(n+3), coding has been performed by the matrix (1) illustrated in FIG. 12B. In FIGS. 13G to 13J, waveforms in the touch detection period are the waveforms at the time t11 in FIG. 12C.

In FIG. 13, at a time t1, when the touch-display synchronizing signal TSHD is made to be in a high level, the control part 9 makes the drive region specifying part 1001 (FIG. 10) operate in response to this. The drive region specifying part 1001, by the drive region specifying part 1001 (FIG. 10) receiving from the terminal Tc the detection region information DI indicating common electrodes from the common electrode TL(n) to the common electrode TL(n+3), makes drive region specifying signals corresponding to common electrodes except these common electrodes TL(n) to TL(n+3) a low level (FIGS. 13F and 13K). In addition, the drive region specifying part 1001 takes in coefficients for coding from the code generation part 1003, and in accordance with the taken-in coefficients, outputs the clock signal $\varphi$ or the clock signal $/\varphi$ of an inverted phase from the clock generation part 1002 as the drive region specifying signals Txcont(n) to TxCont(n+3) corresponding to the common electrodes TL(n) to TL(n+3), respectively.

In the touch detection period illustrated in FIG. 13, the waveforms of the drive region specifying signals TxCont(n) to TxCont(n+3) at the time t11 in FIG. 12C are illustrated (FIGS. 13G to 13J). That is, the drive region specifying signal TxCont(n) is made to be the clock signal $/\varphi$ of an inverted phase, and is supplied to the drive electrode driver 12. In contrast with this, the drive region specifying signals TxCont(n+1) to TxCont(n+3) is made to be the clock signal $\varphi$, and is supplied to the drive electrode driver 12.

At a time t2 of FIG. 13, the control part 9 in the display control device 1100 makes the touch control signal VCOMSEL a high level. Thereby, in the unit drive electrode drivers which have received the drive region specifying signals except the drive region specifying signals TxCont(n) to TxCont(n+3) among the unit drive electrode drivers TDU(0) to TDU(p) in the drive circuit 10 (FIG. 11), the logic circuit LG makes the switches S40 to S45 in the unit drive electrode drivers in an ON state, and makes the switches S50 to S55 in an OFF state. Thereby, a ground voltage will be supplied via the switches S40 to S45 to the common electrodes except the common electrodes TL(n) to TL(n+3) during the touch detection period.

On the other hand, in each of the unit drive electrode drivers TDU(n) to TDU(n+3) which have received the drive region specifying signals TxCont(n) to TxCont(n+3), the logic circuit LG makes the switches S40 to S45 or the switches S50 to S55 turned on or off in accordance with a voltage change of the drive region specifying signals TxCont(n) to TxCont(n+3). Thereby, to the common electrodes TL(n) to TL(n+3) connected to the unit drive electrode drivers TDU(n) to TDU(n+3), a ground voltage in the voltage wiring VCOMDC or the voltage TPH of a high level in the voltage wiring TSVCOM is supplied periodically in synchronization with the clock signal $\varphi$ or the clock signal $/\varphi$ of an inverted phase.

In an example illustrated in FIGS. 13G to 13J, the common electrode TL(n) is driven by a voltage in a phase opposite to the common electrodes TL(n+1) to TL(n+3). That is, when the switches S40 to S45 (or, S50 to S55) in the unit drive electrode driver TDU(n) corresponding to the common electrode TL(n) are made to be in an ON state, the switches S40 to S45 (or, S50 to S55) in the unit drive electrode drivers TDU(n+1) to TDU(n+3) corresponding to the common electrodes TL(n+1) to TL(n+3) are made to be in an OFF state.

In this case, the drive signal Tx(n) with a voltage falling down will have been supplied to the common electrode TL(n), and the drive signals Tx(n+1) to Tx(n+3) with a voltage rising up will have been supplied to each of the common electrodes TL(n+1) to TL(n+3). Thereby, as described in FIG. 12, the drive signal Tx(n) will be coded with a coefficient as −1, and each of the drive signals Tx(n+1) to Tx(n+3) will be coded with a coefficient as 1. In this way, a coded drive signal is supplied to a plurality of the common electrodes specified based on the detection region information DI.

In a subsequent touch detection period following the display period starting at a time t3 of FIG. 13, coefficients which the drive region specifying part 1001 takes in from the code generation part 1003 changes, and a drive signal in which a coefficient is 1 and a drive signal in which a coefficient is −1 will change. That is, although coefficients at the time t11 illustrated in FIG. 12 have been used in the touch detection period illustrated in FIG. 13, the coefficients at the time t12 illustrated in FIG. 12 are used in the subsequent touch detection period. Thereby, as described in FIG. 12, a coded drive signal with coefficients changed in association with time will come to be supplied to the specified common electrode.

As a matter of course, a coefficient given to each drive signal may be made to change as illustrated in FIG. 12 in the touch detection period illustrated in FIG. 13.

In the present second embodiment, although not restricted in particular, a matrix operation described in FIG. 12 is performed in the signal processing section 15 (refer to FIG. 1) which constitutes the detection signal processing part TS in the touch control device 1000. Therefore, the signal processing section 15 has information corresponding to the matrix (1) illustrated in FIG. 12.

A matrix used at the time of coding a drive signal is not limited to the matrix (1) illustrated in FIG. 12. For example, a matrix as illustrated in FIG. 14 may be made to be used at the time of coding a drive signal. In this case, Tx(0) to Tx(15) in FIG. 14 correspond to rows R1 to R16 of the matrix (1) which are used at the time of coding, and signs 1 to 16 correspond to columns C1 to C16 of the matrix (1). In addition, a coefficient P corresponds to the coefficient 1 of FIG. 12, and a coefficient N corresponds to the coefficient −1 of FIG. 12. Note that, in FIG. 14, a numerical value illustrated in a row P and a row N indicates an appearance frequency of the coefficient P in columns 1 to 16 and an appearance frequency of the coefficient N.

Third Embodiment

In a liquid crystal display device 1 with the touch detection function according to a third embodiment, a touch detection method different from the first embodiment and the second embodiment is adopted. First, with respect to the touch detection method adopted in the third embodiment, the principle will be described.

<Basic Principle of Electrostatic Capacitance Type Touch Detection (Self-Capacitance Method)>

Figure 15A:
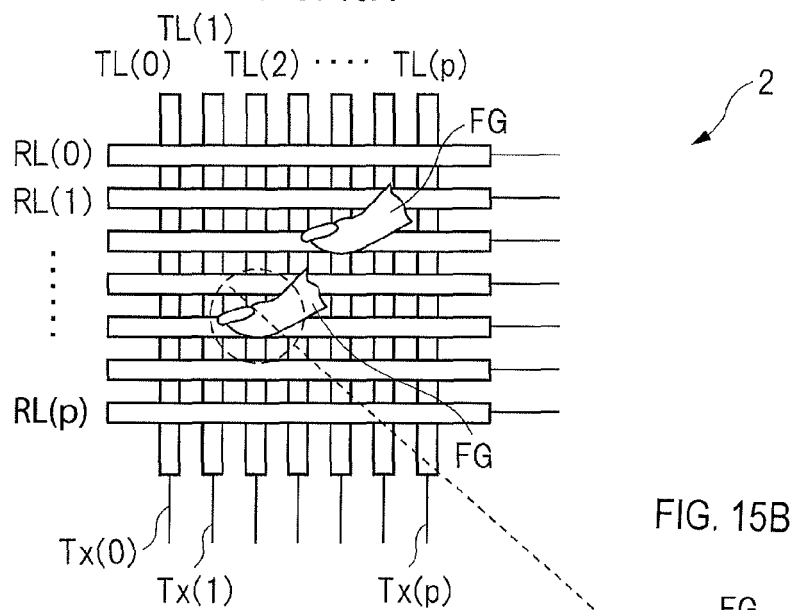
FIGS. 15A to 15C are an explanatory view for describing a basic principle of electrostatic capacitance type touch detection (self-capacitance method)
Figure 15B:
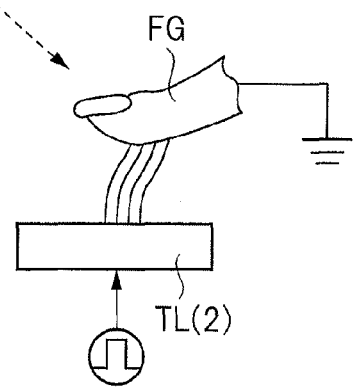
Figure 15C:
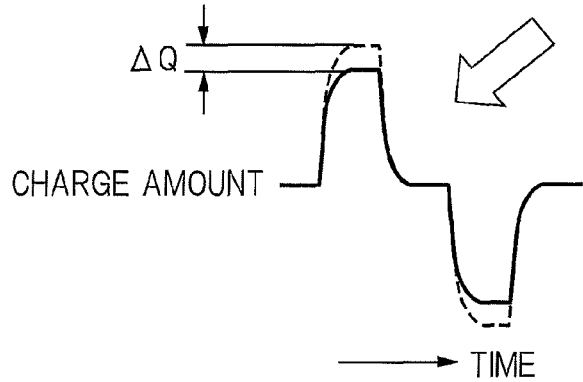

FIGS. 15A to 15C are an explanatory view for describing a basic principle of a touch detection of a self-capacitance method. In FIG. 15A, each of TL(0) to TL(p) is a common electrode which extends in a column direction, and is arranged in parallel in a row direction, and each of RL(0) to RL(p) is a detection electrode arranged so as to intersect with the common electrodes TL(0) to TL(p). Each of the detection electrodes RL(0) to RL(p) extends in row direction and is arranged in parallel in a column direction so as to intersect with the common electrodes TL(0) to TL(p). In addition, although the common electrodes TL(0) to TL(p) and the detection electrodes RL(0) to RL(p) are seen to intersect with each other in a plane view, an insulating layer is interposed between the common electrodes TL(0) to TL(p) and the detection electrodes RL(0) to RL(p) so that both electrodes may not be in contact with each other electrically.

Here, although TL(0) to TL(p) are assumed to be a common electrodes and RL(0) to RL(p) are assumed to be a detection electrode for a convenience of description, a drive signal is supplied to each of the common electrodes TL(0) to TL(p) and the detection electrodes RL(0) to RL(p), and a detection signal is outputted from the common electrodes TL(0) to TL(p) and the detection electrodes RL(0) to RL(p). Therefore, when seen from a viewpoint of detecting a touch of an external object, it can be regarded that both of the common electrodes TL(0) to TL(p) and the detection electrodes RL(0) to RL(p) are a detection electrode.

In a touch detection based on the self-capacitance method, both a detection principle in which the common electrodes TL(0) to TL(p) are used and a detection principle in which the detection electrodes RL(0) to RL(p) are used are the same. Hereinafter, in descriptions of FIGS. 15B and 15C, the common electrodes TL(0) to TL(p) and the detection electrodes RL(0) to RL(p) are made to be detection electrodes collectively.

In each of detection electrodes (the common electrodes TL(0) to TL(p) and the detection electrodes RL(0) to RL(p)), a parasitic capacitance exists between a ground voltage and the electrodes. When e.g. a finger FG as an external object touches the vicinity of the detection electrode, an electric field is generated between the detection electrode and the finger FG as illustrated in FIG. 15B. In other words, by the finger FG nearing, a capacitance connected between the detection electrode and the ground voltage increases. Therefore, in FIG. 15B, when a drive signal in which a voltage changes in a pulse shape as enclosed by a circle is supplied to the detection electrode, a charge amount accumulated between the detection electrode and the ground voltage changes depending on whether the vicinity of detection electrode is touched.

In FIG. 15C, illustrated is a change of a charge amount accumulated in the detection electrode depending on whether a finger FG has touched the vicinity of a detection electrode. Since a capacitance connected to the detection electrode increases when a finger FG has touched the vicinity of the detection electrode, a charge amount accumulated in the detection electrode increases by $\Delta Q$ compared with a case of being not touched when a pulse-shaped drive signal is supplied to the detection electrode. In FIG. 15C, a horizontal axis indicates time and a vertical axis indicates charge amount. In addition, in FIG. 15C, a dashed line indicates a change of a charge amount at the time of being touched. When a drive signal is supplied to a detection electrode, it becomes possible to detect whether the vicinity of the detection electrode has been touched by detecting the charge amount difference $\Delta Q$ accumulated in the detection electrode.

<Configuration of Touch Control Device>

Figure 16:
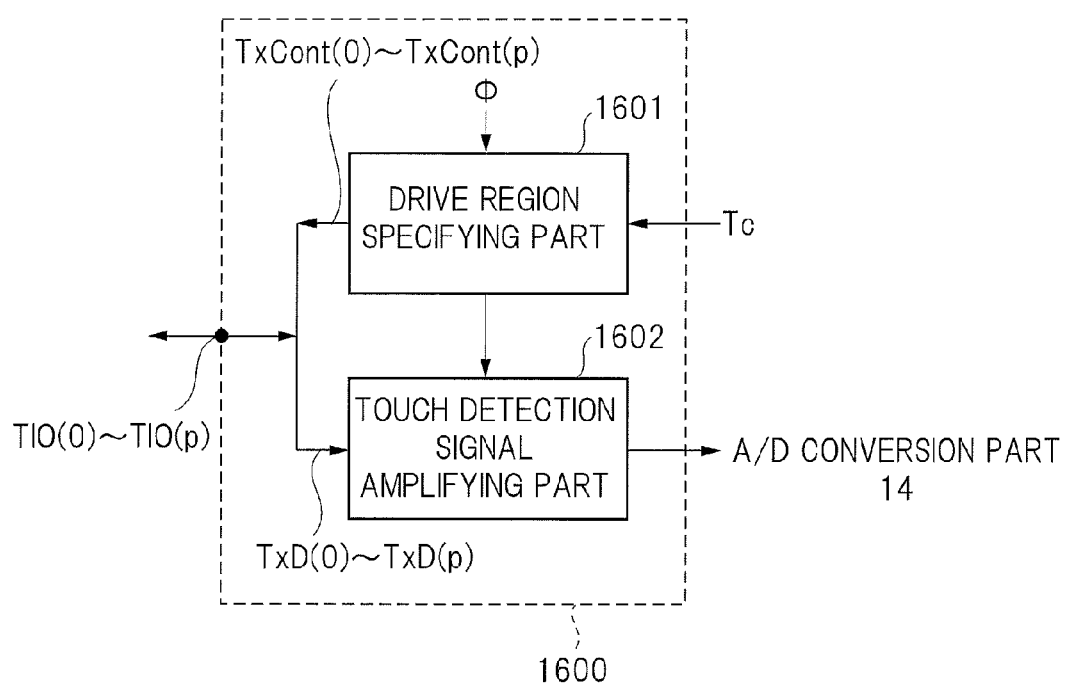
FIG. 16 is a block diagram illustrating a configuration of a touch control device according to a third embodiment.

FIG. 16 is a block diagram illustrating a configuration of a touch control device 1600. In FIG. 16, only a different part from the touch control device 7 illustrated in FIG. 1 is illustrated. In the touch control device 1600 in the third embodiment, a drive region specifying part 1601 is provided in place of the driving signal generation part 17 and the drive region specifying part 18 which have been illustrated in FIG. 1. In addition, a touch detection signal amplifying part 1602 is provided in place of the touch detection signal amplifying part 13 illustrated in FIG. 1. Although the A/D conversion part 14, the signal processing section 15, the coordinate extraction part 16 and the detection timing control part 19 which have been illustrated in FIG. 1 are provided also in the touch control device 1600 in the third embodiment, these are omitted in FIG. 16 because of being the same as those of the first embodiment.

The drive region specifying part 1601 receives the detection region information DI from the terminal Tc, and outputs the drive region specifying signals TxCont(0) to TxCont(p) to input/output terminals TIO(0) to TIO(p) in the touch detecting period. In the present embodiment, the drive region specifying part 1601 receives the clock signal φ, and outputs a signal synchronized with this clock signal φ as a drive region specifying signal corresponding to a common electrode specified by the detection region information DI from the terminal Tc. On the other hand, the drive region specifying part 1601 outputs a signal of a low level as a drive region specifying signal corresponding to a common electrode which is not specified by the detection region information DI.

The touch detection signal amplifying part 1602 receives a detection signals TxD(0) to TxD(p) from the common electrodes TL(0) to TL(p) via the input/output terminal TIO(0) to TIO(p), amplifies as a difference of voltage a charge amount difference which is generated depending on whether the vicinity of the common electrode has been touched, and outputs it to the A/D conversion part 14 illustrated in FIG. 1.

In FIG. 16, although terminals which receive the detection signals TxD(0) to TxD(p) and terminals which output the drive region specifying signals TxCont(0) to TxCont(p) have had common terminals TIO(0) to TIO(p), these may be made separated each other.

<Configuration of Display Control Device>

Figure 17:
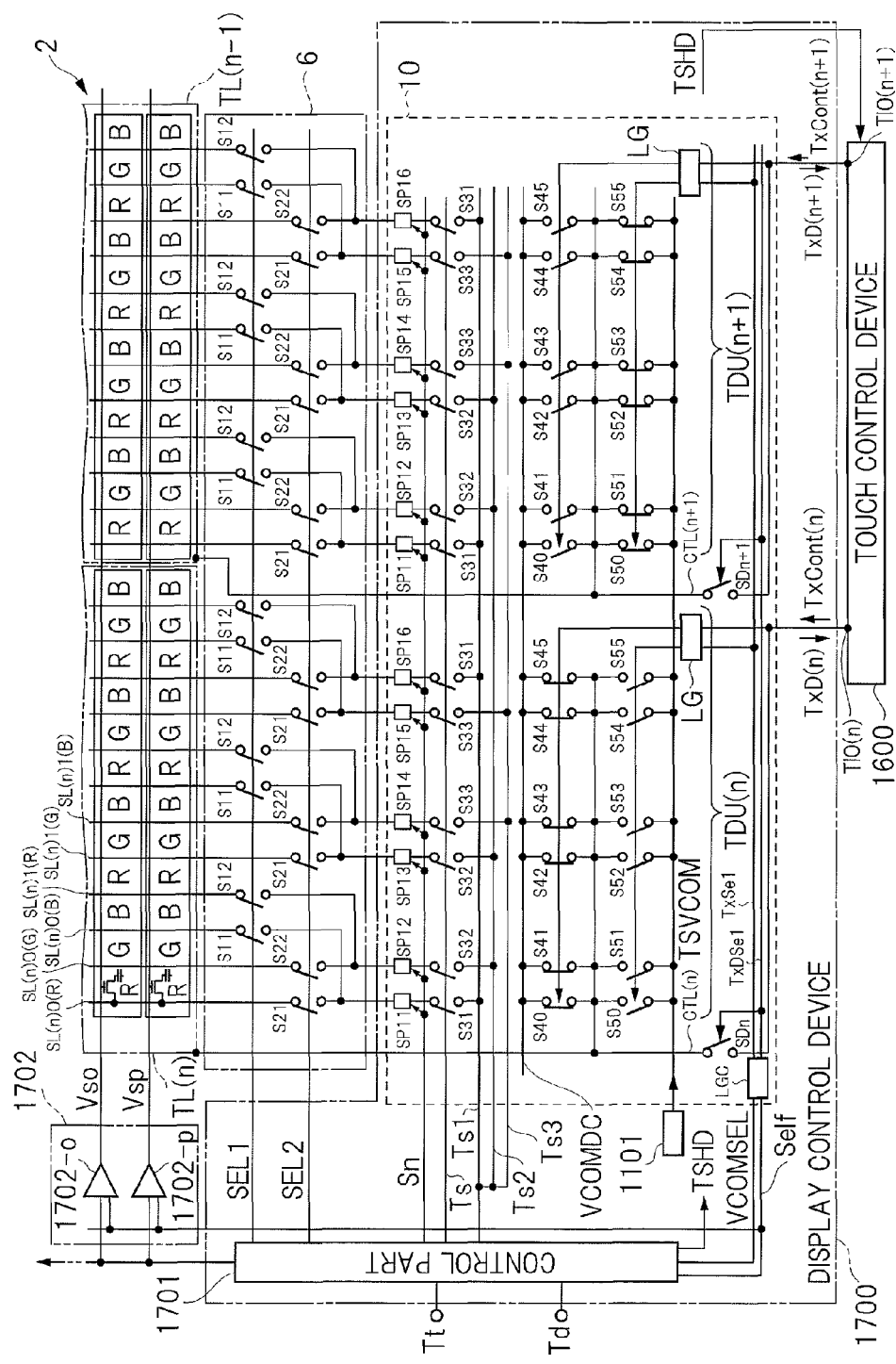
FIG. 17 is a circuit diagram illustrating a configuration of a liquid crystal display device with a touch detection function according to the third embodiment.

FIG. 17 is a circuit diagram illustrating a configuration of a display control device according to the third embodiment. In the same figure, configurations of the signal line selector 6 and the drive circuit 10 are mainly illustrated in the same way as FIGS. 7 and 11. Since the configuration of the display control device illustrated in FIG. 17 is similar to the configuration of FIG. 11, only points of difference will be mainly described here. Also in FIG. 17, arrangements of the liquid crystal panel 2, the signal line selector 6 and the drive circuit 10 are drawn in accordance with actual arrangements. In addition, since the entire configuration of a module is the same as that of the second embodiment, the description will be omitted.

In FIG. 17, 1700 denotes a display control device. As for the display control device 1700, as compares with the display control device 1100 illustrated in FIG. 11, the logic circuit LGC and a plurality of detection switches SD0 to SDp which are controlled in an ON/OFF manner by the detection switch control signal TxDSe1 outputted from the logic circuit LGC have been added to the drive circuit 10.

In addition, although control part 1701 executes the same control as the control part 9 described in the first embodiment and the second embodiment, further in addition to the controls of the control part 9, the control part 1701 outputs a self detection control signal Self which indicates whether to execute self capacitance detection. This self detection control signal Self will be, for example, in a high level in the touch detecting period when the touch detection of the self capacitance detection method described above in FIG. 15 is carried out. The self detection control signal Self is supplied to a gate driver 1702 and the logic circuit LGC in the drive circuit 10.

The gate driver 1702 in the present third embodiment is constituted of a plurality of unit gate driver circuits 1702-0 to 1702-p, and two unit gate driver circuits 1702-0 and 1702-p are illustrated in FIG. 17. Each of the unit gate driver circuits 1702-0 to 1702-p is made to have the same configuration mutually. Here, the unit gate driver circuits 1702-0 and 1702-p which are illustrated in FIG. 17 will be described as an example. The unit gate driver circuits 1702-0 and 1702-P supply scanning signals Vso and Vsp to the scanning lines GL0 and GLp in accordance with a timing signal from the control part 1701 when the self detection control signal Self is in a low level. On the other hand, each of the scanning lines GLo and GLp is made to be in a floating state when the self detection control signal Self is in a high level. That is, each of the unit gate driver circuits 1702-0 and 1702-p is a driver circuit capable of a three-state output including a high impedance state, and the output will be in a high impedance state by the self detection control signal Self being in a high level.

The logic circuit LGC provided in the drive circuit 10 receives the touch control signal VCOMSEL and the self detection control signal Self, and outputs a drive electrode selection control signal TxSel and a detection switch control signal TxDSel. This logic circuit LGC makes a high level the detection switch control signal TxDSel and the drive electrode selection control signal TxSel only when, in the touch detecting period, detecting of the self capacitance detection method is directed by the touch control signal VCOMSEL and the self detection control signal Self.

The touch control device 1600 has a configuration described above in FIG. 16. In the same way as FIG. 11, the common electrodes TL(0) to TL(p) are connected to corresponding unit drive electrode drivers TDU(0) to TDU(p). In the present third embodiment, the common electrodes TL(0) to TL(p) are connected further to the input/output terminals TIO(0) to TIO(p) of the touch control device 1600 via the detection switches SD0 to SDp (third switch). In FIG. 17, it is illustrated as an exemplification that the common electrodes TL(n) and TL(n+1) and the input/output terminals TIO(n) and TIO(n+1) have been connected via the detection switches SDn and SDn+1. In the present third embodiment, the input/output terminals TIO(0) to TIO(p) of the touch control device 1600 are made to be common between the drive region specifying signals TxCont(0) to TxCont(p) and the detection signals TxD(0) to TxD(p). For example, the input/output terminal, while used as an output terminal which outputs the drive region specifying signal TxCont(n) specifying the common electrode TL(n), is used also as an input terminal to which the detection signal TxD(n) from the same common electrode TL(n) is supplied.

In the touch detecting period in which the self capacitance detection method is specified by the self detection control signal Self, the drive electrode selection control signal TxSel supplied to the logic circuit LG in each of the unit drive electrode drivers TDU(0) to TDU(p) corresponds to the touch control signal VCOMSEL described in FIG. 11. Therefore, while the self capacitance detection method is specified and the touch detecting period is applied, the logic circuit LG in the unit drive electrode drivers TDU(0) to TDU(p) controls the switches S40 to S45, and S50 to S55 in accordance with corresponding drive region specifying signals TxCont(0) to TxCont(p).

In the touch detecting period, as for the drive region specifying signal corresponding to a common electrode specified by the detection region information DI, the voltage changes periodically, and the drive region specifying signal corresponding to a common electrode which is not specified by the detection region information DI will be in a low level. Thereby, to the common electrode specified by the detection region information DI, from the unit drive electrode driver corresponding to it, a voltage of a high level in the voltage wiring TSVCOM and a voltage of a low level in the voltage wiring VCOMDC will be supplied periodically in accordance with a periodic voltage change of the drive region specifying signal. On the other hand, to the common electrode which is not specified by the detection region information, from the unit drive electrode driver corresponding to it, a voltage in accordance with the drive region specifying signal of a low level is supplied. Also in the present third embodiment, a voltage of a low level in the voltage wiring TSVCOM will be supplied to the common electrode.

In addition, a charge amount difference described in FIG. 15, i.e., a charge amount difference in the common electrode, which is generated depending on whether the vicinity of the drive electrode has been touched, is supplied to the input/output terminals TIO(0) to TIO(p) via the detection switches SD0 to SDp which are made to be in an ON state by the detection switch control signal TxDSel in the touch detecting period. Here, for making description easy to be understood, description will be carried out while it is assumed that a charge amount difference has come out in a detection signals TxD(0) to TxD(p) as a voltage value difference. The detection signals TxD(0) to TxD(p) are supplied to the input/output terminals TIO(0) to TIO(p) of the touch control device 1600 from the display control device 1700, and a position of the common electrode which has been touched is detected in the touch control device 1600.

In FIG. 17, although a configuration in which a touch on the common electrodes TL(0) to TL(p) is detected has been described, the same configuration will be provided also in the detection electrodes RL(0) to RL(p). Thereby, which detection electrode vicinity has been touched is detected. By detecting a position of the detection electrode which has been touched in the detection electrodes RL(0) to RL(p) and a position of the common electrode which has been touched in the common electrodes TL(0) to TL(p), the intersection is extracted as a coordinate of the touched position.

<Touch Detection Operation>

Next, an operation of the liquid crystal display device 1 with the touch detection function according to the third embodiment will be described using FIGS. 16, 17 and 18. FIGS. 18A to 18J are a timing chart illustrating an operation of the liquid crystal display device 1 with the touch detection function according to the third embodiment. Since FIGS. 18A to 18D and 18I are the same as FIGS. 13A to 13D and 13L in the second embodiment, descriptions will be omitted. In addition, since an operation in the display period is the same as that of the first embodiment and the second embodiment, the descriptions will be omitted here.

At a time t1, the touch detecting period is started by the touch-display synchronizing signal TSHD changing from a low level to a high level. In addition, at a time t2, the self capacitance detection method is specified by the self detection control signal Self changing from a low level to high level. In addition, in response to the change of the touch-display synchronizing signal TSHD to a high level, the touch control signal VCOMSEL changes from a low level to a high level in (time t2).

By the self detection control signal Self changing to a high level, an output of each of the unit gate drivers 1702-0 to 1702-p in the gate driver 1702 will be in a high impedance state. Thereby, all the scanning lines GL0 to GLps will be in a floating state. In addition, since the selection signals SEL1 and SEL2 are also in a low level, each of the signal lines SL(0) to SL(p) will also be in a floating state.

At the time t2, by the touch control signal VCOMSEL and the self detection control signal Self being both in a high level, the logic circuit LGC in the drive circuit 10 makes each of the drive electrode selection control signal TxSel and the detection switch control signal TxDsel a high level. Thereby, each of the detection switches SD0 to SDp will be in an ON state. In addition, the logic circuit LG of the unit drive electrode drivers TDU(0) to TDU(p) in the drive electrode driver 12 supplies a control signal in accordance with a voltage of the drive region specifying signals TxCont(0) to TxCont(p) from the touch control device 1600 to each of the switches S40 to S45 and the switches S50 to S55.

Figure 18:
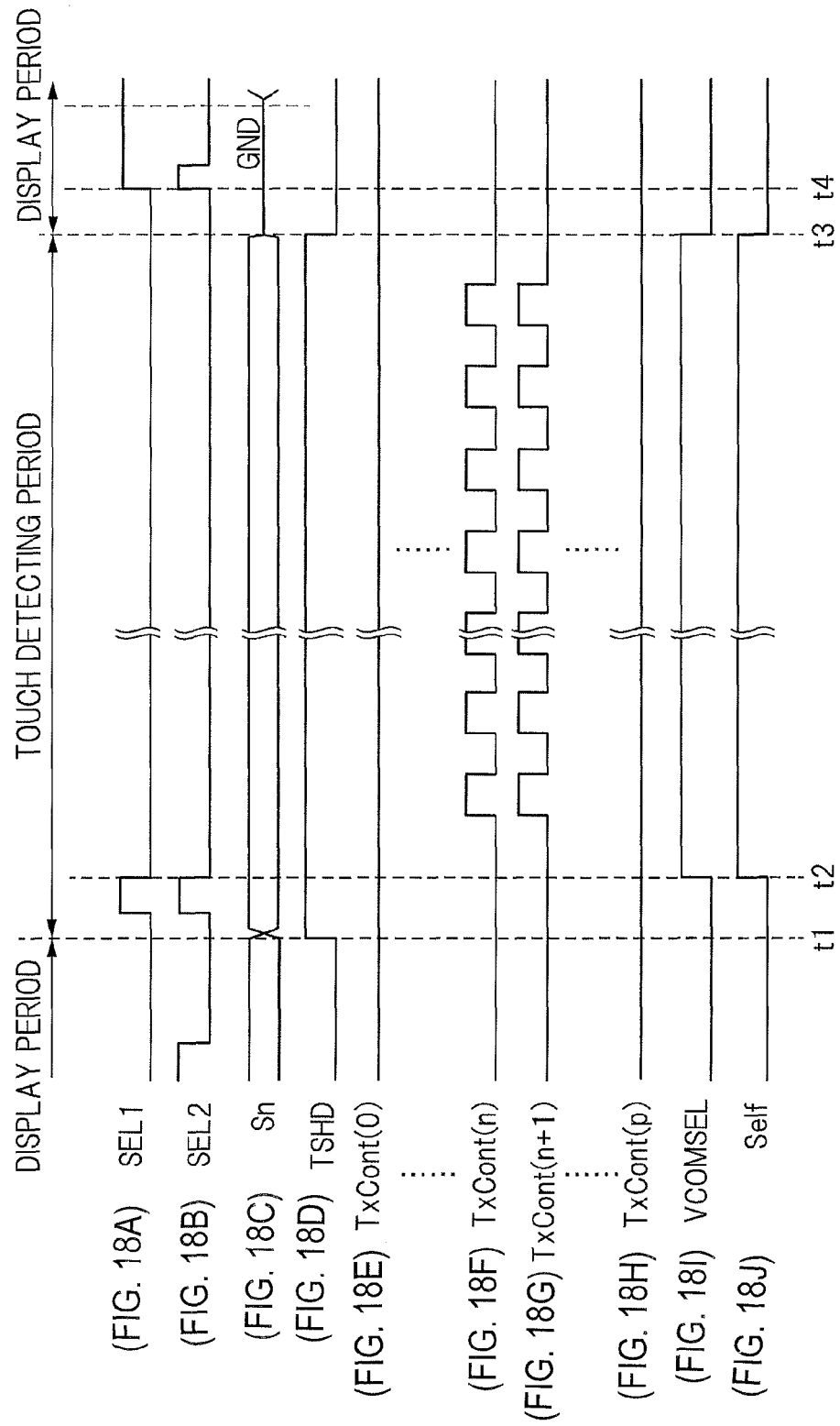
FIGS. 18A to 18J are a waveform chart of the liquid crystal display device with the touch detection function according to the third embodiment.

In FIG. 18, a case where the common electrode TL(n) to TL(p–1) are specified by the detection region information DI is illustrated. In this case, as illustrated in FIGS. 18E to 18H, a voltage of the drive region specifying signals TxCont (n) to TxCont(p–1) corresponding to the common electrode specified by the detection region information DI changes periodically. On the other hand, each of the drive region specifying signals TxCont(0) to TxCont(n–1) and TxCont (p) corresponding to the common electrodes TL(0) to TL(n–1) and TL(p) which are not specified will be in a low level. Thereby, the drive signals Tx(n) to Tx(p–1) supplied to each of the common electrodes TL(n) and TL(p–1) will be a voltage which changes periodically between a voltage of a high level in the voltage wiring TSVCOM and a voltage of a low level in the voltage wiring VCOMDC. On the other hand, the drive signals Tx(0) to Tx(n–1) and Tx(p) which are supplied to each of the common electrodes TL(0) to TL(n–1) and TL(p) will be a voltage of a low level in the voltage wiring VCOMDC, and will be supplied continuously in the touch detecting period.

Although not illustrated in FIG. 18, a voltage of a high level in the voltage wiring TSVCOM is a voltage generated by the voltage generation circuit 1101 as illustrated in FIG. 13E. In addition, also in the third embodiment in the same way as the second embodiment, the switches S40 to S45 or S50 to S55 in the unit drive electrode drivers TDU(0) to TDU(p) are turned on or off in accordance with the drive region specifying signal supplied from the touch control device 1600. Therefore, even if a driving ability of the drive region specifying signals TxCont(0) to TxCont(p) outputted from the touch control device 1600 is low, it is possible to change a voltage of the common electrodes TL(0) to TL(p).

As exemplified in FIGS. 18F and 18G, etc., a voltage of the drive region specifying signals TxCont(n) to TxCont(p–1) changes periodically. In synchronization with this periodical change, a voltage of the drive signals Tx(n) to Tx(p–1) supplied to the common electrodes TL(n) and TL(p–1) also changes periodically. That is, a drive signal which changes in a pulse shape will be supplied to the common electrodes TL(n) and TL(p–1). Thereby, as described in FIG. 15C, a charge is accumulated in each capacitance of the common electrodes TL(n) and TL(p–1). At this time, when a position close to any of these common electrodes TL(n) and TL(p–1) has been touched, a difference is generated in a charge amount as illustrated in FIG. 15C. Each charge amount of the common electrodes TL(0) to TL(p) is expressed as a voltage in the same common electrodes TL(0) to TL(p), and is outputted as the detection signals TxD(0) to TxD(p). The detection signals TxD(0) to TxD(p) are supplied to the input/output terminals TIO(0) to TIO(p) of the touch detection device 1600 via the detection switches SD0 to SDp which are made to be in an ON state in the touch detecting period, and are supplied to the touch detection signal amplifying part 1602 (FIG. 16). The detection signals TxD(0) to TxD(p) are amplified by the touch detection signal amplifying part 1602. A common electrode which has been touched is detected from a voltage value of the amplified detection signal. In an example of FIG. 18, since a pulse-shaped drive signal is supplied to the common electrodes TL(n) to TL(p–1), a common electrode which has been touched will be detected in these common electrodes TL(n) to TL(p–1).

Also with respect to the detection electrodes RL(0) to RL(p), a pulse-shaped drive signal is supplied to the detection electrode in which detecting of a touch is to be carried out in the same way as the common electrodes TL(0) to TL(p). By calculating as a voltage a charge amount in each detection electrode, which is generated in response to this drive signal, a detection electrode which has been touched is detected. A coordinate of the intersection part between the common electrode and the detection electrode, which has been detected while assumed to have been touched, will be extracted as a coordinate of the touched position.

In the present third embodiment, each of the signal lines SL(0) to SL(p) and the scanning lines GL0 to GLp has been made to be in a floating state in the touch detecting period as described above. Therefore, when a voltage of the selected common electrodes TL(n) to TL(p−1) is made to be changed, that is, when a capacitance of these common electrodes TL(n) to TL(p−1) is charged or discharged, it becomes possible to reduce a charging/discharging amount to/from a parasitic capacitance between signal lines and common electrodes, and a parasitic capacitance between scanning lines and common electrodes. Thereby, it becomes possible to reduce a driving ability requested when the common electrode is driven.

In FIG. 18, an example in which a drive signal is supplied only to a common electrode specified based on the detection region information DI is illustrated. However, all the drive electrodes TL(0) to TL(p) may be made to be driven substantially concurrently in synchronization with the clock signal φ. In this case, at the time of charging or discharging of the common electrode, charging/discharging will be carried out by the drive signal so that all the common electrodes TL(0) to TL(p) may change in the same voltage direction. In such a way as this, it becomes possible also to reduce a charge amount to charge or discharge a parasitic capacitance which exists between the common electrodes TL(0) to TL(p). As a result, it becomes possible to reduce a charge amount to charge or discharge a parasitic capacitance in each between common electrodes, between common electrodes and signal lines, and between common electrodes and scanning lines, and it becomes possible to use the drive circuit 10 which is low in a driving ability. Alternatively, it becomes possible to reduce a delay of a voltage change in the common electrode.

Fourth Embodiment

An embodiment in which a common electrode can be driven at further high speed will be described as a fourth embodiment. A configuration of a module and a configuration of a touch control device in the fourth embodiment are similar to the third embodiment. Therefore, only points of difference will be described here. In addition, a displaying operation in the display period, since being the same as that of the first to third embodiments, will be omitted. Since configured to drive a common electrode at high speed, a principle of touch detection may be the method of mutual capacitance detection illustrated in FIG. 2, or may be the method of the self capacitance detection illustrated in FIG. 15, and however, a case where the method of the self capacitance detection described in the third embodiment has been adopted will be described here.

<Configuration of Display Control Device>

Figure 19:
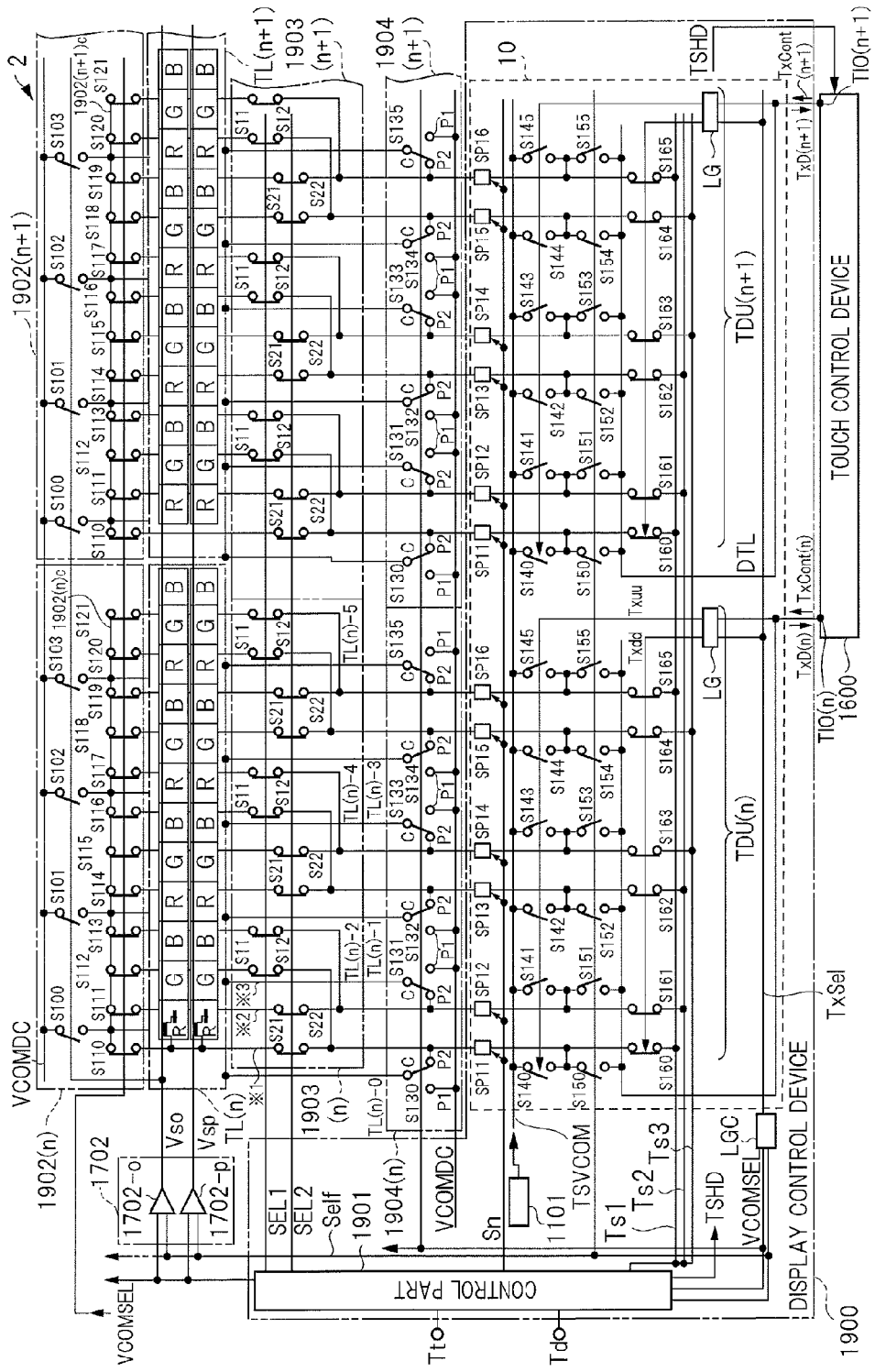
FIG. 19 is a circuit diagram illustrating a configuration of a liquid crystal display device with a touch detection function according to a fourth embodiment.

FIG. 19 is a circuit diagram illustrating a configuration of the liquid crystal display device 1 with the touch detection function according to the fourth embodiment. In FIG. 19, apart of the liquid crystal panel 2, the signal line selector 6, the gate driver 1702, the touch control device 1600 and a display control device 1900 are illustrated in the same way as FIG. 17. In addition, although described later, in the fourth embodiment, a first assist circuit 1904 and a second assist circuit 1902 are added to the liquid crystal display device 1 with the touch detection function. Also in FIG. 19, arrangements of the liquid crystal panel 2, the signal line selector 6, the drive circuit 10, the first assist circuit 1904 and the second assist circuit 1902 are drawn in accordance with the actual arrangement.

In the present fourth embodiment, the signal line selector 6 is provided with a signal line selecting circuit 1903 and the first assist circuit 1904. The first assist circuit 1904 is a circuit which connects selectively an input of the signal line selecting circuit 1903 with the common electrodes TL(0) to TL(p). Although described later, the signal line selecting circuit 1903 is constituted of a plurality of unit signal line selecting circuits 1903(0) to 1903(p) which are made to be the same configuration mutually. In the same way, the first assist circuit 1904 is also constituted of a plurality of unit first assist circuits 1904(0) to 1904(p) which are made to be the same configuration mutually. Note that, also in FIG. 19, each of the common electrodes TL(0) to TL(p), in the same figure, extends in a longitudinal direction (column direction), and is arranged in parallel in a horizontal direction (in a row direction).

In the present fourth embodiment, each of a plurality of the unit signal line selecting circuits 1903(0) to 1903 (p) and the unit first assist circuits 1904(0) to 1904 (p) corresponds one-on-one to the common electrodes TL(0) to TL(p) arranged in a horizontal direction in the same figure. In FIG. 19, the common electrodes TL(n) and TL(n+1), the unit signal line selecting circuits 1903 (n) and 1903(n+1) corresponding to each of them, and the unit first assist circuits 1904 (n) and 1904 (n+1) corresponding to each of them are illustrated.

In addition, in the present fourth embodiment, although not restricted in particular, in the opposite side to the signal line selector 6 with the liquid crystal panel 2 sandwiched, the second assist circuit 1902 which connects selectively between signal lines and common electrodes is provided. That is, in the module, the signal line selector 6 including the first assist circuit 1904 and the second assist circuit 1902 are implemented while the liquid crystal panel 2 is made to be sandwiched. Furthermore, when described with reference to FIG. 6, the signal line selector 6 including the first assist circuit 1904 is arranged along one side of two sides along rows of the liquid crystal element arrangement LCD, and the second assist circuit 1902 is arranged along the other side. Here, the other side is a side which is opposed to one side so that the liquid crystal element arrangement LCD may be sandwiched between one side and the other side.

Also the second assist circuit 1902, although described in detail later, are constituted of a plurality of the unit second assist circuits 1902(0) to 1902(p) which are made to be the same configuration mutually, and each corresponds to the common electrodes TL(0) to TL(p) one-on-one. In FIG. 19, only the unit second assist circuit 1902(n) and 1902(n+1) corresponding to the common electrodes TL(n) and TL(n+1) are illustrated.

Before describing a configuration of the unit signal line selecting circuits 1903(n) and 1903(n+1), the unit first assist circuits 1904 (n) and 1904 (n+1) and the unit second assist circuits 1902(n) and 1902(n+1), an summary of each function of the signal line selecting circuit 1903, the first assist circuit 1904 and the second assist circuit 1902 will have been described.

The signal line selecting circuit 1902, in the display period, as described in the first to third embodiment, distributes an image signal supplied in a time-division manner to an appropriate signal line by the selection signals SEL1 and SEL2. That is, the signal line selecting circuit 1902 connects between terminals SP11 to SP16 of the drive circuit 10 and the signal lines one by one in terms of time in accordance with the selection signals SEL1 and SEL2. Thereby, in the display period, image signals are supplied to the signal lines and a display is performed. On the other hand, in the touch detecting period, the terminals SP11 to SP16 of the drive circuit 10 and all the signal lines are electrically connected substantially concurrently. Thereby, each of all the signal lines SL(0) to SL(p) will be electrically connected to the terminals SP11 to SP16 of the drive circuit 10.

The first assist circuit 1904 supplies the voltage VCOMDC to each of the common electrodes TL(0) to TL(p) in the display period. Thereby, in the display period, the prescribed voltage VCOMDC will be supplied to each of the common electrodes TL(0) to TL(p) from one side (side where the display control device 1900 is implemented) of the liquid crystal panel 2. On the other hand, in the touch detecting period, the first assist circuit 1904 electrically connects inputs of the signal line selector 6, i.e. the terminals SP11 to SP16 of the drive circuit 10 to the common electrodes TL(0) to TL(p). Thereby, in the touch detecting period, outputs of the drive circuit 10 will be supplied to the common electrodes TL(0) to TL(p) from one side of the liquid crystal panel 2. That is, the first assist circuit 1904 connects the common electrodes TL(0) to TL(p) selectively to outputs of the voltage wiring VCOMDC or the drive circuit 10 depending on the display period or the touch detecting period.

Next, the second assist circuit 1902 supplies a voltage of the voltage wiring VCOMDC to the common electrodes TL(0) to TL(p) in the display period, and electrically connects signal lines and common electrodes in the touch detecting period. The second assist circuit 1902 is arranged in the opposite side to the display control device 1900 with the liquid crystal panel 2 sandwiched. That is, the second assist circuit 1902 is arranged in the other side opposed to one side of the liquid crystal panel 2. Thereby, by the second assist circuit 1902, in the display period, voltages of the voltage wiring VCOMDC are supplied to the common electrodes TL(0) to TL(p) from the other side of the liquid crystal panel 2, and in the touch detecting period, signal lines and common electrodes will be connected electrically in the other side mentioned above.

In the display period, voltages in the voltage wiring VCOMDC will be supplied from both ends of the common electrodes TL(0) to TL(p), and it becomes possible to make surely each voltage of the common electrodes TL(0) to TL(p) into a prescribed voltage. In addition, in the touch detecting period, since electrical connection with a signal line will be carried out in both ends of each of the common electrodes TL(0) to TL(p), it becomes possible to reduce a synthetic impedance between the signal line and the common electrode. As the result, even if the common electrodes TL(0) to TL(p) extend in a longitudinal direction (column direction) in the same figure, it becomes possible to make surely a voltage of a common electrode into a prescribed voltage in the display period. In addition, in the touch detecting period, it becomes possible to reduce a delay of a voltage change of the common electrode by an output from the drive circuit 10.

Although described later, the drive circuit 10 outputs drive signals for detecting a touch from the terminals SP11 to SP16 in the touch detecting period. In addition, in the touch detecting period, the terminals SP11 to SP16 of the drive circuit 10 and signal lines are electrically connected by the signal line selecting circuit 1903. Thereby, drive signals for carrying out touch detection are not only supplied to the common electrodes TL(0) to TL(p), but also are supplied to signal lines, and drive signals are transferred to common electrodes also from signal lines. That is, using signal lines, assistance for drive signal transferring is achieved and a high-speed drive will become possible.

<Configuration and Operation of Signal Line Selecting Circuit, First Assist Circuit and Second Assist Circuit>

Next, a configuration of the signal line selecting circuit 1903, the first assist circuit 1904 and the second assist circuit 1902 will be described. As described above, the signal line selecting circuit 1903 is constituted of the unit signal line selecting circuits 1903(0) to 1903($p$) which are made to be the same configuration mutually, and the first assist circuit 1904 is constituted of the unit first assist circuits 1904(0) to 1904($p$) which are made to be the same configuration mutually. In addition, the second assist circuit 1902 is constituted of the unit second assist circuits 1902(0) to 1902($p$) which are made to be the same configuration mutually. In FIG. 19, among these, the unit signal line selecting circuits 1903 ($n$) and 1903 (n+1), the unit first assist circuits 1904 ($n$) and 1904 (n+1), and the unit second assist circuits 1902($n$) and 1902($n$+1) are illustrated. Since a configuration is the same mutually, the unit signal line selecting circuit 1903($n$), the unit first assist circuit 1904($n$) and the unit second assist circuit 1902 ($n$) which correspond to the common electrode TL(n) will be described as a representative here.

<<Unit Signal Line Selecting Circuit 1903($n$)>>

In the same way as the first to third embodiments, one common electrode TL(n) is arranged with respect to four sets of pixels arranged in a horizontal direction in the same figure. This common electrode TL(n) extends in a longitudinal direction (column direction). As a matter of course, as described in FIG. 3B, it is separated electrically from other common electrode TL(n+1) arranged in the principal surface of the TFT glass substrate 300. The unit signal line selecting circuit 1903($n$) corresponding to this common electrode TL(n), in the same way as the first to third embodiments, has a plurality of sets of the switches S11 and S12 (9-th switch) which are controlled in an ON/OFF manner by the selection signal SEL1 and the switches S21 and S22 (10-th switch) which are controlled in an ON/OFF manner by the selection signal SEL2. These switches S11, S12, S21 and S22 are connected between inputs of the signal line selector 6 and the signal lines SL(0)0(R) to SL(p)3(B) in the same way as the first to third embodiments described above. In FIG. 19, only Signal line SL(n)0(R) and SL(n)0(G), SL(n)0(B) are indicated clearly as *1, *2 and *3.

In the present fourth embodiment, the control part 1901 is similar to the control part 1701 in the third embodiment, and in the display period, makes the selection signals SEL1 and SEL2 high or low in a level complementarily in the same way as the third embodiment. However, the control part 1901 in the present fourth embodiment makes both the selection signal SEL1 and SEL2 a high level in the touch detecting period. In response to a high level of the selection signals SEL1 and SEL2, the switches S11, S12, S21 and S22 will be in an ON state substantially in the touch detecting period. Thereby, inputs of the signal line selector 6 will be connected to all the signal lines SL(0)0(R) to SL(p)3(B). That is, electrical connection is carried out between the terminals SP11 to SP16 of the drive circuit 10 and the signal lines SL(0)0(R) to SL(p)3(B).

<<Unit First Assist Circuit 1904(n)>>

In the present embodiment, the common electrode TL(n) is electrically connected to the unit first assist circuit 1904 (n) by a plurality of drive wires TL(n)-0 to TL(n)-5. The first unit assist circuit 1904(n) is provided with three-terminals switches S130 to S135 (4-th switch) corresponding to the number of the drive wires TL(n)-0 to TL(n)-5. Each of the three-terminals switches S130 to S135 has a common terminal C, and connection terminals p1 and p2, and the common terminal C is connected to the connection terminal p1 or p2 depending on a voltage value of the touch control signal VCOMSEL. The touch control signal VCOMSEL, as illustrated in FIG. 18I is made to be in a low level in the display period, and becomes a high level in the touch detecting period. Each common terminal C of the three-terminals switches S130 to S135 is connected to the connection terminal p1 when the touch control signal VCOMSEL is in a low level, and is connected to the connection terminal p2 when the touch control signal VCOMSEL is in a high level.

Each common terminal C of the three-terminals switches S130 to S135 is connected to the corresponding drive wires TL(n)-0 to TL(n)-5, and the connection terminal p1 is connected to the voltage wiring VCOMDC, and the connection terminal p2 is connected to the corresponding input of the signal line selector 6. That is, the common terminal C of the three-terminals switches S130 to S135 is connected to the common electrode TL(n) via the corresponding drive wire, and the connection terminal p1 is connected to the voltage wiring VCOMDC to which a ground voltage is supplied in the touch detecting period. In addition, each connection terminal p2 of the three-terminals switches S130 to S135 is electrically connected to the corresponding terminals SP11 to SP16 of the drive circuit 10.

Among the three-terminals switches S130 to S135, when description is carried out with three-terminals switch S130 as an example, the common terminal C of this three-terminals switch S130 is connected to the common electrode TL(n) via the corresponding drive wire TL(n)-0, and the connection terminal p1 is connected to the voltage wiring VCOMDC, and the connection terminal p1 is connected to the corresponding input of the signal line selector 6. In this case, since the corresponding input of the signal line selector 6 is connected to the terminal SP11 of the drive circuit 10, the connection terminal p1 of the three-terminals switch S130 is connected to the corresponding terminal SP11 of the drive circuit. In addition, the corresponding input in the signal line selector 6 is electrically connected to the signal lines SL(n)0(R) and SL(n)0(B) in the touch detecting period via the switches S11 and S21 in the corresponding unit signal line selecting circuit 1903 (n). Also the remaining three-terminals switches S131 to S135, in the same way, are connected to the common electrode TL(n), the voltage wiring VCOMDC and the corresponding input of the signal line selector 6 via the corresponding drive wires TL(n)-1 to TL(n)-5.

<<Unit Second Assist Circuit 1902 (n)>>

The unit second assist circuit 1902 (n) is provided with a plurality of switches S100 to S103 connected in parallel between the voltage wiring VCOMDC and a common voltage wiring 190 (n) 2c, and switches S110 to S121 (5-th switch) connected between the common voltage wiring 1902(n)c and the corresponding signal lines SL(n)0(R) to SL(n)3(B). Each of switches S100 to S103 and switches S110 to S121 is controlled in an ON/OFF manner by the touch control signal VCOMSEL. In the present embodiment, in accordance with a voltage of the touch control signal VCOMSEL, the switches S100 to S103 and the switches S110 to 121 are controlled to be turned on/off complementarily. That is, when the touch control signal VCOMSEL is in a low level, the switches S100 to 103 are made to be in an ON state, and the switches S110 to S121 are made to be in an OFF state. In contrast with this, when the touch control signal VCOMSEL is in a high level, the switches S110 to S121 are made to be in an ON state, and the switches S100 to 103 are made to be in an OFF state.

In addition, the common voltage wiring 1902(n)c is electrically connected with the corresponding common electrode TL(n) at a plurality of connection parts.

Thereby, as illustrated in FIG. 18I, when the touch control signal VCOMSEL is in a low level in the display period, the switches S100 to S103 will be in an ON state, and from the voltage wiring VCOMDC, supply of a prescribed voltage is performed to the common electrode TL(n). In this case, since a plurality of switches S100 to S103 are connected in parallel, it becomes possible to make low a synthetic on-resistance of the switches S100 to S103, and it becomes possible to make small a voltage drop in the switches S100 to S103.

On the other hand, as illustrated in FIG. 18I, when the touch control signal VCOMSEL is in a high level in the touch detecting period, the signal lines SL(n)0(R) to SL(n) 3(B) and the common electrode TL(n) will be electrically connected via the switches S121 to S110. Also in this case, the switches S121 to S110 will be connected in parallel between the voltage wiring 1902(n)c and the common electrode TL(n), and while it becomes possible to reduce a voltage drop in the switches S121 to S110, it also becomes possible to reduce a signal delay because a synthetic on-resistance of the switches S121 to S110 becomes low.

<<Operation>>

In the display period, as illustrated in FIG. 18I, the touch control signal VCOMSEL has been in a low level. Therefore, the common terminal C of the three-terminals switches S130 to S135 in the unit first assist circuit 1904(n) is connected to connection terminal p1. Thereby, in the unit first assist circuit 1904 (n), a voltage from the voltage wiring VCOMDC is supplied to the common electrode TL(n) via the drive wires TL(n)-0 to TL(n)-5. At this time, since the switches S100 to S103 in the unit second assist circuit 1902 (n) will be in an ON state by the touch control signal VCOMSEL, a voltage is supplied from the voltage wiring VCOMDC via the switches S100 to S103 to the common voltage wiring 1902(n)c connected to the common electrode TL(n). Thereby, a voltage of the voltage wiring VCOMDC will be supplied from the both sides in the display period to the common electrode TL(n).

In addition, in the display period, the switches S11 and S12, and the switches S21 and S22 in the unit signal line selecting circuit 1903(n) are made to be in an ON state complementarily by the selection signals SEL1 and SEL2. Thereby, image signals in the terminals SP11 to SP16 of the drive circuit 10 are supplied to appropriate signal lines SL(n)0(R) to SL(n)3(B) via the unit signal line selecting circuit 1903(n), and are displayed.

On the other hand, in the touch detecting period, the touch control signal VCOMSEL will be in a high level as illustrated in FIG. 18I. Therefore, the common terminal C of the three-terminals switches S130 to S135 in the unit first assist circuit 1904 (n) is connected to the connection terminal p2 as illustrated in FIG. 19. Thereby, each of the drive wires TL(n)-0 to TL(n)-5 is connected to the corresponding input in the signal line selector 6 via the three-terminals switches S130 to S135. Thereby, the common electrode TL(n) is connected to the terminals SP11 to SP16 of the drive circuit 10 via the drive wires TL(n)-0 to TL(n)-5.

In addition, in the touch detecting period, both selection signals SEL1 and SEL2 will be in a high level. Thereby, each of the switches S11, S12, S21 and S22 in the unit signal line selecting circuit 1903 (n) will be in an ON state. As the result, all the signal lines SL(n)0(R) to SL(n)3(B) are connected to inputs of the signal line selector 6 via the switches S11, S12, S21 and S22. That is, all the signal lines SL(n)0(R) to SL(n)3(B) are connected to the terminals SP11 to SP16 of the drive circuit 10.

Furthermore, in the touch detecting period, the switches S110 to S121 in the unit second assist circuit 1902 (n) is made to be in an ON state by the high level of the touch control signal VCOMSEL. Thereby, all the signal lines SL(n)0(R) to SL(n)3(B) are connected to the common voltage wiring 1902 (n) c via the switches S110 to S121. Since this common voltage wiring 1902 (n) c is connected to the common electrode TL(n), all the signal lines SL(n)0 (R) to SL(n)3(B) will be connected to the common electrode TL(n).

In this way, in the touch detecting period, both ends of each of the signal lines SL(n)0(R) to SL(n)3(B) are electrically connected to both ends of the common electrode TL(n), and signals in the terminals SP11 to SP16 of the drive circuit 10 are supplied. Thereby, even if the length of the common electrode extending in a column direction becomes long, it becomes possible to suppress a delay of signals of the terminals SP11 to SP16 of the drive circuit 10 from becoming large.

Note that, in the touch detecting period, an output of the gate driver 1702 is made to be in a high impedance state in the same way as the third embodiment. Therefore, each of the scanning lines GL0 to GLp will be in a floating state. Thereby, as described in the third embodiment, it becomes possible to reduce a signal delay in the common electrode furthermore.

<Configuration of Drive Circuit>

Next, a configuration of the drive circuit 10 in the fourth embodiment will be described. The drive circuit 10 is provided with a plurality of the unit drive electrode drivers TDU(0) to TDU(p) which are made to be the same configuration mutually in the same way as the first to third embodiment described above. However, a configuration of the unit drive electrode drivers TDU(0) to TDU(p) is different from a configuration of the unit drive electrode driver described in the first to third embodiments. In FIG. 19, among the unit drive electrode drivers TDU(0) to TDU(p), a configuration of the unit drive electrode drivers TDU(n) and TDU(n+1) corresponding to the drive electrodes TL(n) and TL(n+1) is illustrated as a representative.

Since the unit drive electrode drivers TDU(0) to TDU(p) have the same configuration mutually, a configuration will be described with the unit drive electrode driver TDU(n) as a representative here.

The unit drive electrode driver TDU(n), in the same way as the unit drive electrode driver TDU(n) described in the first to third embodiment, is provided with a plurality of the terminals SP11 to SP16, and in the display period, the image signal Sn is supplied to the terminals SP11 to SP16 in a time-division manner from the control part 1901. The terminals SP11 to SP16 are connected to the corresponding inputs of the signal line selector 6. In an example illustrated in FIG. 19, the terminals SP11 to SP16 of the unit drive electrode driver TDU(n) are connected to the connection terminal p2 of the three-terminals switches S130 to S135 of the corresponding unit first assist circuit 1904(n), and the switches S11, S12, S21 and S22 of the corresponding unit signal line selecting circuit 1903(n).

The unit drive electrode driver TDU(n) is further provided with switches S140 to 145 (6-th switch), switches S160 to S165 (7-th switch), switches S150 to 155 (8-th switch) and the logic circuit LG. Here, the switches S140 to 145 are connected between the voltage wiring TSVCOM to which a voltage generated by the voltage generation circuit 1101 is supplied and the terminals SP11 to SP16, and are controlled in an ON/OFF manner by a control signal Txuu from the logic circuit LG. In addition, the switches S150 to S155 are connected between the terminals SP11 to SP16 and detection wirings DTL, and are controlled in an ON/OFF manner by the self detection control signal Self. The switches S160 to S165 are connected between the terminals SP11 to SP16 and voltage wirings Ts1 to Ts3, and are controlled in an ON/OFF manner by a control signal Txdd from the logic circuit LG. The logic circuit LG receives the drive electrode selection control signal TxSel supplied from the logic circuit LGC and the drive region specifying signal TxCont(n) supplied from the touch control device 1600, and forms the control signal Txuu which controls ON/OFF of the switches S140 to S145 and the control signal Txdd which controls ON/OFF of the switches S160 to S165.

The touch control device 1600 in the present fourth embodiment is made to have the similar configuration as the third embodiment, and the input/output terminal of the touch control device 1600 is connected to the logic circuit LG and the detection wiring DTL. Thereby, the drive region specifying signal TxCont(n) is supplied to the logic circuit LG from the input/output terminal TIO(n), and the detection signal TxD(n) is supplied to the input/output terminal TIO (n) from detection wiring DTL.

The voltage wirings Ts1 to Ts3 are wirings which supplies voltages for testing described in the first embodiment. In the present fourth embodiment, these voltage wirings Ts1 to Ts3 are used also as voltage wirings which supply a ground voltage in the touch detecting period. That is, the voltage wirings Ts1 to Ts3 are used for a double purpose between a test period and a touch detecting period. Therefore, the control part 1901 supplies the ground voltage to the voltage wirings Ts1 to Ts3 not only in the test period, but also in the touch detecting period. As a matter of course, voltage wirings for the touch detecting period may be prepared separately from the voltage wirings for test period.

To the logic circuit LGC, the touch control signal VCOMSEL in a high level and the self detection control signal Self in a high level are supplied (FIGS. 18I and 18J) when an operation of touch detection is specified. In response to this, the logic circuit LGC makes the drive electrode selection control signal TxSel change to a high level. The logic circuit LG in the unit drive electrode driver TDU(n), when receiving the drive electrode selection control signal TxSel in a high level, forms the control signals Txuu and Txdd in accordance with a voltage of the drive region specifying signal TxCont(n). For example, when a voltage of the drive region specifying signal TxCont(n) changes to a high level, the logic circuit LG makes a voltage of the control signal Txuu change to a high level, and makes a voltage of the control signal Txdd change to a low level. On the other hand, when a voltage of the drive region specifying signal TxCont (n) changes to a low level, the logic circuit LG makes the control signal Txdd change to a high level, and makes the control signal Txuu change to a low level.

Each of the switches S140 to 145 changes to an ON state by the control signal Txuu changing to a high level, and changes to an OFF state by the control signal Txuu changing to a low level. In the same way, each of the switches S160 to S165 changes to an ON state by the control signal Txdd changing to a high level, and changes to an OFF state by the control signal Txdd changing to a low level.

In the touch detecting period, as described in the third embodiment, as for the drive region specifying signal corresponding to the common electrode specified by the detection region information DI, the voltage changes periodically. Thereby, in the touch detecting period, the switches S140 to S145 and the switches S160 to S165 will be in an ON/OFF state alternately in synchronization with a voltage of the drive region specifying signal TxCont(n). By the switches S140 to S145 being in an ON state, to the terminals SP11 to SP16, a voltage in the voltage wiring TSVCOM is supplied via these switches S140 to S145. On the other hand, when the switches S160 to S165 are in an ON state, a ground voltage in the voltage wirings Ts1 to Ts3 is supplied via each of these switches S160 to S165 to the terminals SP11 to SP16. As the result, in the touch detecting period, in each of the terminals SP11 to SP16 of the unit drive electrode driver TDU(n) which receives the drive region specifying signal TxCont(n) corresponding to the common electrode specified by the detection region information DI, the drive signal Tx(n) whose voltage value changes periodically in accordance with the drive region specifying signal TxCont(n) is generated.

Note that the drive region specifying signal corresponding to the common electrode which is not specified by the detection region information DI will be in a low level. Therefore, each voltage of the terminals SP11 to SP16 of the unit drive electrode driver which receives the drive region specifying signal like this will be a ground voltage.

The switches S150 to S155 in the unit drive electrode driver TDU(n) will be each in an ON state by the self detection control signal Self being in a high level. Thereby, each of the terminals SP11 to SP16 is connected to the detection wiring DTL via the switches S150 to S155, and the detection signal TxD(n) is supplied to the input/output terminal TIO of the touch control device 1600(n) via this detection wiring DTL.

<Entire Operation>

Next, an operation of the liquid crystal display device 1 with the touch detection function according to the fourth embodiment will be described mainly using FIGS. 18 and 19. Also in the present fourth embodiment, the liquid crystal display device 1 with the touch detection function carries out a display operation in a display period, and carries out a touch detection operation in the touch detecting period in the same way as the first to third embodiments. Here, descriptions will be carried out while separated into an operation in the display period and a touch detecting operation in the touch detecting period.

<<Display Period>>

As illustrated in FIGS. 18D, 18I and 18J, in the display period, the touch-display synchronizing signal TSHD, the touch control signal VCOMSEL and the self detection control signal Self will be in a low level. By the touch control signal VCOMSEL and the self detection control signal Self being in a low level, the gate driver 1702 supplies the Scanning signals Vso and Vsp to the scanning lines GL0 to GLp in accordance with a timing signal from the control part 1901.

At this time, since the touch control signal VCOMSEL in a low level and the self detection control signal Self in a low level are supplied to the logic circuit LGC of the display control device 1900, the drive electrode selection control signal TxSel in a low level is outputted. Thereby, the logic circuit LG in each of the unit drive electrode drivers TDU(0) to TDU(p) outputs the control signals Txdd and Txuu in a low level irrespective of voltages of the drive region specifying signals TxCont(0) to TxCont(p). The switches S140 to S145 and S160 to S165 will be in an OFF state by the control signals Txdd and Txuu in a low level. In addition, the switches S150 to S155 are made to be in an OFF state by the self detection control signal Self in a low level. Thereby, the terminals SP11 to SP16 of each of the unit drive electrode drivers TDU(0) to TDU(p) are separated electrically from the voltage wiring TSVCOM, the voltage wirings Ts1 to Ts3 and the detection wiring DTL. Therefore, the terminals SP11 to SP16 will output the image signal Sn supplied from the control part 1901.

Since the touch control signal VCOMSEL is in a low level, the three-terminals switches S130 to S135 in the first assist circuit 1904 connect the common terminal c and the connection terminal p1. In addition, by the touch control signal VCOMSEL in a low level, each of the switches S100 to S103 in the second assist circuit 1902 will be in an ON state, and each of the switches S110 to S121 will be in an OFF state. Thereby, common electrodes and signal lines are separated electrically in the second assist circuit 1902, and to common electrodes, a voltage is supplied from the voltage wiring VCOMDC via the switches S100 to S103 and the common voltage wiring 1902(n)c in an ON state.

The control part 1901 makes the selection signals SEL1 and SEL2 a high level alternately in synchronization with the timing in which the image signal Sn is supplied to the drive circuit 10. Thereby, voltages in accordance with the image signal Sn are transferred to the signal lines SL(0)0(R) to SL(p)3(B), and are displayed.

<<Touch Detecting Period>>

As illustrated in FIGS. 18D, 18I and 18J, in the touch detecting period, the touch-display synchronizing signal TSHD, the touch control signal VCOMSEL and the self detection control signal Self will be in a high level.

By the touch control signal VCOMSEL being in a high level, the common terminal c of the three-terminals switches S130 to S135 in the first assist circuit 1904 is connected to the connection terminal p2. In addition, the switches S100 to S103 in the second assist circuit 1902 will be in an OFF state, and the switches S110 to S121 will be in an ON state. In addition, the control part 1901 makes the selection signals SEL1 and SEL2 a high level in the touch detecting period. Thereby, in the signal line selector 6 (including the signal line selecting circuit 1903 and the first assist circuit 1904) arranged in the side of one side of the liquid crystal panel 2, the common electrodes TL(0) to TL(p) and the signal lines SL(0)0(R) to SL(p)3(B) are electrically connected. In addition, also in the second assist circuit 1902 arranged in the side of the other side of the liquid crystal panel 2, the common electrodes TL(0) to TL(p) and the signal lines SL(0)0(R) to SL(p)3(B) will be connected electrically.

By the touch control signal VCOMSEL and the self detection control signal Self being both in a high level, the drive electrode selection control signal TxSel in a high level is outputted from the logic circuit LGC. Thereby, the logic circuit LG in the drive circuit 10 supplies the control signals Txdd and Txuu in accordance with a voltage of the drive region specifying signals TxCont(0) to TxCont(p) supplied from the touch control device 1600 to the switches S140 to S146, and S160 to S166. The touch control device 1600, as described in the third embodiment, makes a voltage of the drive region specifying signal corresponding to the common electrode specified by the detection region information DI change periodically.

When the common electrodes Tx(n) and Tx(n+1) are specified by the detection region information DI, for example, a voltage of the drive region specifying signals TxCont(n) and TxCont(n+1) corresponding to this common electrode Tx(n) and Tx(n+1) changes periodically. Thereby, the switches S140 to S146 and the switches S160 to S166 are turned on/off periodically. As the result, in the terminals SP11 to SP16 of the drive circuit 10 connected to the common electrode Tx(n) and Tx(n+1) in the signal line selector 6, a drive signal whose voltage value changes periodically between a voltage in a high level in the voltage wiring VCOMDC and a ground voltage in the voltage wiring Ts1 to Ts3 is generated. At this time, in the signal line selector 6 and the second assist circuit 1902, the common electrode Tx(n) is electrically connected in parallel with a plurality of the signal lines SL(n)0(R) to SL(n)3(B). In the same way, also the common electrode Tx(n+1) is electrically connects with a plurality of signal lines in parallel in the signal line selector 6 and the second assist circuit 1902.

In other words, in a position close to the signal line selector 6 and a distant position apart from the signal line selector 6, the common electrode and a plurality of the signal lines will be connected in parallel. Thereby, it becomes possible to reduce a delay until the drive signal reaches the distant position of the common electrode.

By the drive signal Tx(n) and Tx(n+1) whose voltage change periodically being supplied to the drive electrodes TL(n) and TL(n+1), as described in FIG. 15, a change in accordance with whether a position close to these common electrodes has been touched is generated in the common electrodes Tx(n) and Tx(n+1). At this time, since each of the switches S150 to S155 is made to be in an ON state by the self detection control signal Self, the change in the common electrodes TL(n) and TL(n+1) is transferred to the detection wiring DTL via the switch S150 to S155, and is supplied to the input/output terminals TIO(n) and TIO(n+1) of the touch control device 1600 as the detection signals TxD(n) and TxD(n+1).

The touch control device 1600 detects a touched position as described in the third embodiment based on the detection signals RxD(0) to RxD(p) supplied to the input/output terminals TIO(0) to TIO(p).

Also in the detection electrodes RL(0) to RL(p) arranged so as to intersect with the common electrodes TL(0) to TL(p), in the same way as the third embodiment, a detection signal is supplied to the touch control device 1600 from the detection electrode, and a touched position is detected in the touch control device 1600, and a coordinate of the touched position is extracted.

Although it has been described that a drive signal is supplied to the common electrode specified by the detection region information DI, a drive signal may be made to be supplied to all the common electrodes TL(0) to TL(p) substantially concurrently. Since each of the scanning lines GL0 to GLp is in a floating state in the touch detecting period also in the fourth embodiment in the same way as the third embodiment, it becomes possible to achieve further a speed enhancement of charging/discharging of the common electrode by the common electrodes TL(0) to TL(p) being concurrently driven by the drive signal.

In the first to fourth embodiments, although an example in which one common electrode is provided with respect to a plurality of signal lines has been described, one common electrode may be made to be provided with respect to one signal line.

In addition, since various configurations of the signal line driver 11 are considered in the first to fourth embodiments, as the signal line driver 11, only wirings which supplies the image signal Sn to the terminals SP11 to SP16 are illustrated. In addition, as for a switch, a switch of various configurations can be adopted. For example, a thin film transistor which has a gate, a source and a drain can be used as the switch.

A person skilled in the art can think up various kinds of modification examples and correction examples in the category of concept of the present invention, and it is understood that those modification examples and correction examples also belong to the scope of the present invention.

For example, with respect to each of embodiments mentioned above, ones where a person skilled in the art executes appropriately addition and deletion of a constituent element, or design change, or ones where a person skilled in the art executes appropriately addition and deletion of a process, or condition change are also included within the scope of the present invention as long as those are provided with the substance of the present invention.

What is claimed is:

1. A liquid crystal display device, comprising:
a plurality of liquid crystal display elements in a matrix arrangement that includes rows and columns;
a plurality of scanning lines respectively arranged for each of the rows;
a plurality of signal lines respectively arranged for the columns;
a plurality of drive electrodes arranged for at least one of the columns;
a drive electrode driver configured to drive the drive electrodes as common electrodes in a display period and as touch detection drive electrodes in a touch period, the drive electrode driver being located at a first side of the matrix arrangement, a width of the drive electrode driver being smaller than a total width of the plurality of the drive electrodes;
a signal line selector located between the matrix arrangement and the drive electrode driver;
a plurality of lines connecting the plurality of the drive electrodes to the drive electrode driver, the plurality of lines passing over the signal line selector and inclined toward the drive electrode driver;
a first substrate having the scanning lines, the signal lines, the drive electrodes, the drive electrode driver, the signal line selector, and the lines; and
a second substrate facing the first substrate, wherein
the first substrate has a first area covering the second substrate and a second area uncovering the second substrate,
the drive electrodes are located in the first area and the drive electrode driver is located in the second area, and
the lines are arranged from the first area to the second area.

2. The liquid crystal display device according to claim 1, wherein inclination angles of respective ones of the plurality of lines are different each other.

3. The liquid crystal display device according to claim 1, wherein the plurality of signal lines and the plurality of drive electrodes extend in parallel.

4. The liquid crystal display device according to claim 3, wherein the lines cross an edge of the second substrate.

5. The liquid crystal display device according to claim 3, wherein a plurality of touch detection electrodes are located on the second substrate, and face the drive electrodes.

6. The liquid crystal display device according to claim 1, further comprising:

a touch controller that specifies at least two or more drive electrodes that are adjacent to each other by controlling the drive electrode driver, wherein in the touch period, the touch controller controls the drive electrodes by driving at least one of the drive electrodes based on a clock signal and driving, simultaneously, one or more remaining ones of the drive electrodes based on an inverted clock signal of the clock signal.

7. The liquid crystal display device according to claim 6, wherein the touch controller drives each of the drive electrodes in accordance with a plurality of combinations of the clock signal and the inverted clock signal, wherein the combinations are different each other.

8. A liquid crystal display device, comprising:
a plurality of scanning lines arranged in a row direction;
a plurality of signal lines arranged in a column direction that is transverse to the row direction;
a plurality of liquid crystal display elements, each liquid crystal display element arranged in an area comparted by the scanning lines and the signal lines;
a plurality of drive electrodes arranged in the column direction;
a drive electrode driver configured to drive the drive electrodes as common electrodes in a display period and as touch detection drive electrodes in a touch period, the drive electrode being located at a first side of the area of the liquid crystal display elements, a width of the drive electrode driver being smaller than a total width of the plurality of the drive electrodes;
a signal line selector located between ends of the drive electrodes and the drive electrode driver;
a plurality of lines connecting the plurality of the drive electrodes to the drive electrode driver, the plurality of lines passing over the signal line selector, wherein each of the lines are inclined from the column direction;
a first substrate having the scanning lines, the signal lines, the drive electrodes, the drive electrode driver, the signal line selector, and the lines;
a second substrate facing the first substrate, wherein
the first substrate has a first area covering the second substrate and a second area uncovering the second substrate,
the drive electrodes are located in the first area and the drive electrode driver is located in the second area, and
the lines are arranged from the first area e second area.

9. The liquid crystal display device according to claim 8, wherein inclination angles of respective ones of the plurality of lines are different each other.

10. The liquid crystal display device according to claim 8, wherein the plurality of signal lines and the plurality of drive electrodes extend in parallel.

11. The liquid crystal display device according to claim 10, wherein the lines cross an edge of the second substrate.

12. The liquid crystal display device according to claim 10, wherein a plurality of touch detection electrodes are located on the second substrate, and face the drive electrode.

13. The liquid crystal display device according to claim 8, further comprising:
a touch controller that specifies at least two or more drive electrodes that are adjacent to each other by controlling the drive electrode driver, wherein
in the touch period, the touch controller controls the drive electrodes by driving at least one of the drive electrode based on a clock signal and driving, simultaneously, one or more remaining ones of the drive electrodes based on an inverted clock signal of the clock signal.

14. The liquid crystal display device according to claim 13, wherein the touch controller drives each of the drive electrodes in accordance with a plurality of combinations of the clock signal and the inverted clock signal, wherein the combinations are different each other.

* * * * *